US009083568B2

(12) United States Patent
Ma et al.

(10) Patent No.: US 9,083,568 B2
(45) Date of Patent: Jul. 14, 2015

(54) METHOD AND APPARATUS FOR BANDWIDTH ALLOCATION FOR COGNITIVE RADIO NETWORKS

(75) Inventors: Liangping Ma, San Diego, CA (US); Athmane Touag, Laval (CA); Martino M. Freda, Laval (CA); Jean-Louis Gauvreau, La Prairie (CA); Chunxuan Ye, Wayne, PA (US); Alpaslan Demir, East Meadow, NY (US); Amith V. Chincholi, West Babylon, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 39 days.

(21) Appl. No.: 13/270,438

(22) Filed: Oct. 11, 2011

(65) Prior Publication Data

US 2012/0163309 A1 Jun. 28, 2012

Related U.S. Application Data

(60) Provisional application No. 61/391,901, filed on Oct. 11, 2010, provisional application No. 61/412,189, filed on Nov. 10, 2010, provisional application No. 61/413,137, filed on Nov. 12, 2010.

(51) Int. Cl.
*H04W 16/10* (2009.01)
*H04W 16/14* (2009.01)
(Continued)

(52) U.S. Cl.
CPC .......... *H04L 27/0006* (2013.01); *H04B 7/2606* (2013.01); *H04L 5/0037* (2013.01);
(Continued)

(58) Field of Classification Search
USPC .......................................... 370/310, 431, 464
See application file for complete search history.

(56) References Cited

U.S. PATENT DOCUMENTS 8,139,506 B2  3/2012 Nabetani et al.
8,279,767 B2  10/2012 Kang et al.
(Continued)

FOREIGN PATENT DOCUMENTS

EP  1 601 219  11/2005
EP  2 200 385  6/2010
(Continued)

OTHER PUBLICATIONS

Baykas et al., "IEEE P802.19 Wireless Coexistence System Design Document," IEEE 802.19-10/0055r3, Mar. 2010.
(Continued)

*Primary Examiner* — Omar Ghowrwal
(74) *Attorney, Agent, or Firm* — Condo Roccia Koptiw LLP

(57) ABSTRACT

Described herein are methods, metrics and apparatus for bandwidth allocation for cognitive radio. Information that needs to be passed between different components of a dynamic spectrum management (DSM) system for dynamic bandwidth allocation along with the corresponding interfaces is identified. Methods and associated metrics for measuring network performance, evaluating channel sensing results and handling various bandwidth allocation scenarios are presented. Also provided is an admission control mechanism for quality of service support. Alternate channel monitoring may be performed in the background so that when a new channel is needed, an alternate channel may be immediately allocated and service disruption to the DSM system is reduced. A channel may be dynamically assigned as the primary channel in multiple channel scenarios to support tasks such as transmission of acknowledgment frames. Hybrid mode devices that may access a television white space (TVWS) database and perform spectrum sensing are also described.

16 Claims, 43 Drawing Sheets

(51) Int. Cl.
| | |
|---|---|
| H04W 72/08 | (2009.01) |
| H04L 12/917 | (2013.01) |
| H04L 27/00 | (2006.01) |
| H04B 7/26 | (2006.01) |
| H04L 5/00 | (2006.01) |
| H04W 72/02 | (2009.01) |
| H04W 72/04 | (2009.01) |
| H04W 24/00 | (2009.01) |
| H04W 24/10 | (2009.01) |
| H04W 28/04 | (2009.01) |

(52) U.S. Cl.
CPC ............ *H04L5/0058* (2013.01); *H04W 16/10* (2013.01); *H04W 16/14* (2013.01); *H04W 72/02* (2013.01); *H04W 72/0453* (2013.01); *H04W 24/00* (2013.01); *H04W 24/10* (2013.01); *H04W 28/04* (2013.01)

(56) References Cited

U.S. PATENT DOCUMENTS

| | | | |
|---|---|---|---|
| 2004/0233888 A1* | 11/2004 | Bonta et al. | 370/350 |
| 2006/0009231 A1* | 1/2006 | Emami et al. | 455/452.2 |
| 2008/0153506 A1* | 6/2008 | Yin et al. | 455/452.2 |
| 2009/0259991 A1* | 10/2009 | Mu | 717/121 |
| 2009/0268649 A1* | 10/2009 | Krishnaswamy | 370/310 |
| 2010/0081449 A1 | 4/2010 | Chaudhri et al. | |
| 2010/0124254 A1* | 5/2010 | Wu et al. | 375/131 |
| 2010/0233963 A1 | 9/2010 | Harada et al. | |
| 2011/0028148 A1 | 2/2011 | Lee et al. | |
| 2011/0096679 A1 | 4/2011 | Hayashino et al. | |
| 2011/0098005 A1 | 4/2011 | Selen et al. | |
| 2011/0164186 A1 | 7/2011 | Sadek et al. | |
| 2011/0228693 A1 | 9/2011 | Larsson et al. | |
| 2012/0058790 A1 | 3/2012 | Junell et al. | |

FOREIGN PATENT DOCUMENTS

| | | |
|---|---|---|
| EP | 2302975 A1 | 3/2011 |
| JP | 2009-512326 A | 3/2009 |
| JP | 2009-159406 A | 7/2009 |
| JP | 2009-246875 | 10/2009 |
| JP | 2010-213243 A | 9/2010 |
| WO | 03/081925 | 10/2003 |
| WO | WO 2010/007738 A1 | 1/2010 |
| WO | WO 2010/114640 A1 | 10/2010 |

OTHER PUBLICATIONS

Comsearch, "Comsearch Proposal to be Designated as a TV Band Device Database Manager," DA 09-2479, ET Docket No. 04-186, ET Docket No. 02-380, Jan. 4, 2010.

Gregory Deangelis, "Attila Technologies DPCC (Dynamic Polymorphic Capacity Concatenation) Developer Reference Implementation for v1.0 Release," Jun. 6, 2010.

Federal Communications Commission, "Office of Engineering and Technology Invites Proposals from Entities Seeking to be Designated TV Band Device Database managers," ET Docket No. 04-186, DA-09-2479, Nov. 25, 2009.

Federal Communications Commission, "Second Report and Order and Memorandum Opinion and Order," FCC 08-260, ET Docket No. 04-186, ET Docket No. 02-380, Nov. 14, 2008.

Federal Communications Commission, "Second Memorandum Opinion and Order," FCC 10-174, ET Docket No. 04-186, ET Docket No. 02-380, Sep. 23, 2010.

Google, Inc., "Proposal by Google Inc. to Provide a TV Band Device Database Management Solution," DA 09-2479, ET Docket No. 04-186, Jan. 4, 2010.

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications," ANSI/IEEE Std 802.11, 1999 Edition (R2003), Mar. 18, 1999, reaffirmed on Jun. 12, 2003.

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 8: Medium Access Control (MAC) Quality of Service Enhancements," IEEE Std 802.11e, Nov. 11, 2005.

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Higher Throughput," IEEE Std 802.11n, Sep. 11, 2009.

Neustar, Inc., "Proposal for Designated TV Band Device Database Manager," ET Docket No. 04-186, Jan. 4, 2010.

Spectrum Bridge, Inc., "Spectrum Bridge Response to PN DA-09-2479 Proposals for Designated TV Band Database Manager ET Docket No. 04-186," Jan. 4, 2010.

Telcordia Technologies, Inc., "Comments of Telcordia Technologies Proposal Seeking to be Designated as a TV Band Device Database Manager," ET Docket No. 04-186, Jan. 4, 2010.

Aiache et al., "COgnitive Radio Systems for Efficient Sharing of TV White Spaces in EUropean Context", COGEU FP7 ICT-2009.1.1, D3.1-Use-Cases Analysis and TVWS Systems Requirements, Aug. 2010, 137 pages.

Ishizu et al., "Link Aggregation Platform Enabling Flexible Traffic Control in Cognitive Wireless Networks", Technical Report of Institute of Electronics, Information and Communication Engineers, vol. 110, No. 175, Aug. 2010, pp. 165-170 (English abstract included).

Jabbari et al., "Dynamic Spectrum Access and Management", IEEE Wireless Communications, vol. 17, No. 4, Aug. 2010, pp. 6-15.

Yamamoto et al., "A Proposal of Adaptive Traffic Route Control in QoS Provisioning for Cognitive Radio Technology with Heterogeneous Wireless Systems", Technical Report of Institute of Electronics, Information and Communication Engineers, vol. 109, No. 380, Jan. 2010, pp. 63-68 (English abstract included).

\* cited by examiner

| MESSAGE | SENDER | RECEIVER | PARAMETERS / NOTES |
|---|---|---|---|
| CHANNELSENSINGQUERY | BAC | SENSING TOOLBOX | SENSING_TYPE: A SCALAR<br>THE TYPE OF SENSING, WHICH MAY TAKE VALUES<br>– INIT_CONFIG_SENSING:<br>    SENSING FOR A CHANNEL TAKES PLACE ONLY ONCE ASSUMED TO BE ABLE TO DO BOTH FINE SENSING AND COARSE SENSING<br>    FOR CHANNELS REPORTED AS AVAILABLE BY THE TVWS DB<br>– PERIODIC_SENSING:<br>    – SENSING FOR A CHANNEL OCCURS PERIODICALLY<br>    – BOTH COARSE SENSING AND FINE SENSING ARE RUN<br>    – FOR BOTH ACTIVE CHANNELS AND ALTERNATE CHANNELS<br>    – ACTIVE CHANNELS HAVE HIGHER PRIORITY THAN ALTERNATE CHANNELS<br>– TARGETED_CHANNELS_SENSING:<br>    HIGH PRIORITY (REQUIRE LESS RESPONSE TIME)<br>    FOR ALTERNATE CHANNELS ONLY<br>CHANNEL_LIST: A NX3 ARRAY, WHERE N IS THE NUMBER OF CHANNELS<br><br>INFO ON THE CHANNELS FOR WHICH SENSING NEEDS TO BE DONE. SU SENSING (VIA COARSE SENSING) IS REQUIRED FOR EACH LISTED CHANNEL. PU SENSING IS SPECIFIED FOR EACH LISTED CHANNEL.<br><br>FOR EACH LISTED CHANNEL, THERE ARE 3 FIELDS: CHANID, CHANTYPE, PU_SENSING_TYPE<br>    – CHANID: AN INTEGER<br>    – CHANTYPE, WHICH MAY TAKE VALUES<br>    – ACTIVE<br>    – ALTERNATE<br>    – NULL: DUE TO LIMITATION OF THE |

FROM FIG. 5A

| | | | SENSING TOOLBOX, NOT ALL CHANNELS MAY BE MARKED AS EITHER ACTIVE OR ALTERNATE. THOSE UNMARKED CHANNELS ARE GROUPED AS NULL.<br>- PU_SENSING_TYPE, TYPE OF PU SENSING, WHICH MAY TAKE VALUES<br>- NOT NEEDED: THIS CHANNEL IS CONSIDERED AS VACANT BY THE TVWS DB, AND THERE IS NO NEED TO DO PU SENSING<br>- DTV: DTV DETECTION IS NEEDED<br>- MIC: WIRELESS MICROPHONE DETECTION IS NEEDED<br>- DTV AND MIC: BOTH DETECTIONS ARE NEEDED |
|---|---|---|---|
| CHANNELSENSINGQUERY ACK | SENSING TOOLBOX | BAC | NO PARAMETERS<br>THE PURPOSE OF THIS MESSAGE IS TO CONFIRM THAT THE CORRESPONDING CHANNELSENSINGQUERY MESSAGE IS SUCCESSFULLY RECEIVED |
| CHANNELSENSINGRESULT | SENSING TOOLBOX | BAC | CHANNEL_LIST: A NX3 ARRAY, WHERE N IS THE NUMBER OF CHANNELS<br>FOR EACH CHANNEL, THERE 3 FIELDS: CHANID, PU_DETECTED, SU_USAGE<br>- CHANID: AN INTEGER<br>- PU_DETECTED, WHICH MAY TAKE VALUES<br>DETECTED<br>NOT_DETECTED<br>-SU_USAGE, NX1 ARRAY, MAY BE SNR VALUES OR RSSI VALUES<br><br>NOTE: THIS MESSAGE MAY BE SENT<br>- IN RESPONSE TO CHANNELSENSINGQUERY<br>- WHEN THE SENSING TOOLBOX DETECTS PUS<br>- PERIODICALLY (TENTATIVELY EVERY 2 SECONDS) |

FROM FIG. 5B

| | | | |
|---|---|---|---|
| CHANNELSENSINGQUERY ACK | BAC | SENSING TOOLBOX | NO PARAMETERS<br>PURPOSE: TO CONFIRM THAT THE CORRESPONDING CHANNELSENSINGRESULT MESSAGE IS SUCCESSFULLY RECEIVED |
| SILENTPERIOD REQUIREMENTS QUERY | BAC | SENSING TOOLBOX | NO PARAMETERS<br>PURPOSE: TO GET THE REQUIREMENTS ON THE SILENT PERIOD CONFIGURATION. |
| SILENTPERIOD REQUIREMENTS QUERY CONF | SENSING TOOLBOX | BAC | DTVDETECTIONCYCLE: SCALAR, REQUIRED DUTY CYCLE (ON TIME AND OFF TIME AND/OR PERIODICITY) NEEDED FOR ACCURATE DTV DETECTION WITHIN TIMING REQUIREMENTS<br><br>WMDETECTIONCYCLE: SCALAR, REQUIRED DUTY CYCLE NEEDED FOR ACCURATE WIRELESS MICROPHONE DETECTION WITHIN TIMING REQUIREMENTS<br><br>CHANNELQUALITYDUTYCYCLE: SCALAR, REQUIRED DUTY CYCLE NEEDED FOR CHANNEL QUALITY MEASUREMENTS |

FIG. 5C

| MESSAGE | SENDER | RECEIVER | MESSAGE CONTENTS | BITS |
|---|---|---|---|---|
| DEVICE_ASSOC_REQUEST | MAC | BAC | MACADDRESS<br>DESCRIPTION: MAC ADDRESS OF THE AP (THE SENDER OF THIS MESSAGE) | 48 |
| DEVICE_ASSOC_ACK | BAC | MAC | MACADDRESS<br>DESCRIPTION: MAC ADDRESS OF THE AP THAT SENT THE ASSOCIATION_REQUEST MESSAGE | 48 |
| ATTACH_REQUEST | MAC | BAC | DEVICE_RAT_INFO<br>DESCRIPTION: '0' IMPLIES 802.11 ONLY; '1' IMPLIES 802.11 AND CELLULAR; '2' IMPLIES 802.11, CELLULAR AND OTHER TECHNOLOGIES | 2 |
| | | | DEVICE_RAT_INFO<br>DESCRIPTION: '0' IMPLIES 802.11 ONLY; '1' IMPLIES 802.11 AND CELLULAR; '2' IMPLIES 802.11, CELLULAR AND OTHER TECHNOLOGIES | 4 |
| | | | MACADDRESS<br>DESCRIPTION: MAC ADDRESS OF THE STA | 48 |
| | | | DL_CAPABILITY<br>DESCRIPTION: INDICATES IF THE STA HAS THE CAPABILITY OF SUPPORTING AGGREGATED DIRECT LINKS | 1 |
| | | | SERVICE_CAPABILITY<br>DESCRIPTION: INDICATES TO DLME, WHAT SERVICES (E.G., PRINTING SERVICE) THE NON-AP STA OFFERS. | 8 |
| | | | SERVICE_REQUEST<br>DESCRIPTION: INDICATES TO DLME, WHAT SERVICES (E.G., PRINTING SERVICE, FILE SERVER) THE NON-AP STA EXPECTS. | 8 |

FROM FIG. 6A

| | | | | |
|---|---|---|---|---|
| ATTACH_RESPONSE | BAC | MAC | MACADDRESS<br>DESCRIPTION: MAC ADDRESS OF THE STA | 48 |
| INITIAL_BA_REQUEST | MAC | BAC | APADDRESS<br>DESCRIPTION: THE IP ADDRESS OF THE AP THAT SENDS THIS MESSAGE | 32 |
| | | | APLOCATION<br>DESCRIPTION: THE GPS LOCATION OF THE REQUESTING AP | 56 |
| | | | BWREQUEST<br>DESCRIPTION: THE REQUESTED BANDWIDTH IN MHZ | 7 |
| INITIAL_BA_REQUEST_ACK | BAC | MAC | APADDRESS<br>DESCRIPTION: THE IP ADDRESS OF THE AP THAT SHOULD RECEIVE THIS MESSAGE | 32 |
| BA_RECONFIG | BAC | MAC | APADDRESS<br>DESCRIPTION: THE IP ADDRESS OF THE AP THAT SHOULD RECEIVE THIS MESSAGE | 32 |
| | | | NUMOFOLDCHANS<br>DESCRIPTION: THE NUMBER OF OLD CHANNELS THAT THE AP SHOULD STOP USING | 4 |
| | | | OLDCHANS<br>DESCRIPTION: THE LIST OF OLD CHANNELS THAT THE AP SHOULD STOP USING | 8 FOR EACH OLD CHANNEL |
| | | | NUMOFNEWCHANS<br>DESCRIPTION: THE NUMBER OF NEW CHANNELS THAT THE AP SHOULD START USING | 4 |

FROM FIG. 6B

| | | | NEWCHANS<br>DESCRIPTION: THE LIST OF NEW CHANNELS THAT THE AP CAN USE AND THE MAXIMUM TX POWER FOR EACH CHANNEL<br>CHANNEL ID: 8 BITS, MAX TX POWER: 7 BITS | 15 FOR EACH NEW CHANNEL |
|---|---|---|---|---|
| BA_RECONFIG_ACK | MAC | BAC | APADDRESS<br>DESCRIPTION: THE IP ADDRESS OF THE AP THAT SENDS THIS MESSAGE. THIS MESSAGE IS SENT RIGHT AFTER THE AP AND THE NON-AP STAS SUCCESSFULLY SWITCH TO THE NEW CHANNELS. | 32 |
| CHANNEL_STATUS_INDICATION | MAC | BAC | APADDRESS<br>DESCRIPTION: THE ADDRESS OF THE AP THAT SENDS THIS MESSAGE | 32 |
| | | | NUMOFFAILEDCHANS<br>DESCRIPTION: THE NUMBER OF CHANNELS THAT FAILED BASED ON MAC LAYER STATISTICS | 4 |
| | | | FAILEDCHANS<br>DESCRIPTION: THE LIST OF THE IDS OF THE FAILED CHANNELS | 8 FOR EACH FAILED CHANNEL |
| | | | NUMMETRICSBLOCKS<br>DESCRIPTION: HOW MANY BLOCKS OF METRICS THE AP IS REPORTING | 4 |
| | | | TYPEOFMETRICS<br>DESCRIPTION: TYPE OF METRIC, WHICH TAKES VALUES<br>— 0 FOR AVERAGE RSSI<br>— 1 FOR MINIMUM RSSI<br>— 2 FOR AVERAGE FRAME LOSS RATE<br>— 3 FOR MAXIMUM FRAME LOSS RATE | 3 |

GO TO FIG. 6D   FIG. 6C

FROM FIG. 6C

| | | | | |
|---|---|---|---|---|
| | | | − 4 FOR AVERAGE QUEUE SIZE<br>− 5 FOR MAXIMUM QUEUE SIZE<br>− 6 FOR AVERAGE BACKOFF TIME<br>− 7 FOR MAXIMUM BACKOFF TIME<br>NOTE: THE AVERAGE AND MIN/MAX OPERATION IS PERFORMED OVER STAS (BOTH AP AND NON-AP STAS). | |
| | | | NUMBEROFCHANS<br><u>DESCRIPTION</u>: HOW MANY CHANNELS FOR WHICH THE AP IS REPORTING THE METRICS | 4 |
| | | | METRICVALUES<br><u>DESCRIPTION</u>: THE VALUES (RSSI VALUES OR FRAME_LOSS_RATE) FOR THIS SPECIFIC METRIC | 10 FOR EACH METRIC |
| | | | NOTE: THE ABOVE THREE FIELDS CAN REPEAT (FOR DIFFERENT TYPES OF METRICS), AS INDICATED BY THE NUMMETRICSBLOCKS | |
| CHANNEL_STATUS_<br>INDICATION_ACK | BAC | MAC | APADDRESS<br><u>DESCRIPTION</u>: THE IP ADDRESS OF THE AP THAT SHOULD RECEIVE THIS MESSAGE | 32 |
| REQT_INDICATION | BAC | MAC | NUM_TID<br><u>DESCRIPTION</u>: NUMBER OF TOTAL TIDS THAT WILL BE SUPPORTED<br>THE 802.11E STANDARD DEFINES 16 TIDS SO THAT WE NEED 4 BITS. | 4 |
| | | | TP_TID1<br><u>DESCRIPTION</u>: THROUGHPUT REQUIREMENT FOR TID 1 IN MBPS | 7 |
| | | | TP_TID2<br><u>DESCRIPTION</u>: THROUGHPUT REQUIREMENT FOR TID 2 IN MBPS | 7 |

GO TO FIG. 6E   FIG. 6D

FROM FIG. 6D

| | | | | |
|---|---|---|---|---|
| | | | • • • • | |
| | | | TP_NUM_CHAN<br>DESCRIPTION: THROUGHPUT REQUIREMENT FOR TID NUM_CHAN IN MBPS | 7 |
| | | | LATENCY_TID1<br>DESCRIPTION: LATENCY REQUIREMENT FOR TID 1 IN MILLISECONDS | 7 |
| | | | LATENCY_TID2<br>DESCRIPTION: LATENCY REQUIREMENT FOR TID 2 IN MILLISECONDS | 7 |
| | | | • • • • | |
| | | | LATENCY_ NUM_TID<br>DESCRIPTION: LATENCY REQUIREMENT ON CHANNEL NUM_TIDIN MILLISECONDS | 7 |
| REQT_INDICATION_ACK | MAC | BAC | MACADDRESS<br>DESCRIPTION: MAC ADDRESS OF THE AP | 48 |
| CHANNELSENSING QUERY | BAC | MAC | NUM_SENSING_STAS<br>DESCRIPTION: NUMBER OF STAS WHOSE SENSING TOOLBOXES ARE USED FOR DISTRIBUTED SENSING | 5 |
| | | | SENSING_TYPE<br>DESCRIPTION: TYPE OF SENSING TO BE PERFORMED. COULD BE ONE OF 3 POSSIBILITIES.<br>'0' INDICATES INIT_CONFIG_SENSING<br>'1' INDICATES PERIODIC_SENSING<br>'2' INDICATES TARGETED_CHANNELS_SENSING | 2 FOR EACH STA |
| | | | | |

GO TO FIG. 6F   FIG. 6E

FROM FIG. 6E

| | |
|---|---|
| MACADDRESS<br><br>DESCRIPTION: MAC ADDRESS OF THE STA | 48 FOR EACH STA |
| NUM_CHAN<br><br>DESCRIPTION: NUMBER OF TOTAL CHANNELS TO BE SENSED | 4 FOR EACH STA |
| CHANID_CH1<br><br>DESCRIPTION: CHANNEL ID (21-51) OF CHANNEL 1 ON TV WS | 8 FOR EACH STA |
| CHANTYPE_CH1<br><br>DESCRIPTION: CHANNEL TYPE FOR CHANNEL 1. CAN TAKE THE FOLLOWING VALUES<br><br>-ACTIVE<br><br>-ALTERNATE<br><br>-NULL: DUE TO LIMITATION OF THE SENSING TOOLBOX, NOT ALL CHANNELS CAN BE MARKED AS EITHER ACTIVE OR ALTERNATE. THOSE UNMARKED CHANNELS ARE GROUPED AS NULL. | 2 FOR EACH STA |
| PU_SENSING_TYPE_CH1<br><br>DESCRIPTION: TYPE OF PU SENSING ON CHANNEL 1, WHICH CAN TAKE THE FOLLOWING VALUES<br><br>-NOT NEEDED: THIS CHANNEL IS CONSIDERED AS VACANT BY THE TVWS DB, AND THERE IS NO NEED TO DO PU SENSING<br><br>-DTV: DTV DETECTION IS NEEDED<br><br>-MIC: WIRELESS MICROPHONE DETECTION IS NEEDED<br><br>-DTV AND MIC: BOTH DETECTIONS ARE NEEDED | 3 FOR EACH STA |

GO TO FIG. 6G  FIG. 6F

FROM FIG. 6F

| | | | | |
|---|---|---|---|---|
| | | | CHANID_CH2<br><u>DESCRIPTION:</u> CHANNEL ID (21-51) OF CHANNEL 2 ON TV WS | 8 FOR EACH STA |
| | | | CHANTYPE_CH2<br><u>DESCRIPTION:</u> CHANNEL TYPE FOR CHANNEL 2. | 2 FOR EACH STA |
| | | | PU_SENSING_TYPE_CH2<br><u>DESCRIPTION:</u> TYPE OF PU SENSING ON CHANNEL 2 | 3 FOR EACH STA |
| | | | CHANID_CH3<br><u>DESCRIPTION:</u> CHANNEL ID (21-51) OF CHANNEL 3 ON TV WS | 8 FOR EACH STA |
| | | | CHANTYPE_CH3<br><u>DESCRIPTION:</u> CHANNEL TYPE FOR CHANNEL 3. | 2 FOR EACH STA |
| | | | PU_SENSING_TYPE_CH3<br><u>DESCRIPTION:</u> TYPE OF PU SENSING ON CHANNEL 3 | 3 FOR EACH STA |
| | | | . . . | |
| | | | CHANID_NUM_CHAN<br><u>DESCRIPTION:</u> CHANNEL ID (21-51) OF CHANNEL NUM_CHAN ON TV WS | 8 FOR EACH STA |
| | | | CHANTYPE_NUM_CHAN<br><u>DESCRIPTION:</u> CHANNEL TYPE FOR CHANNEL NUM_CHAN. | 2 FOR EACH STA |
| | | | PU_SENSING_TYPE_NUM_CHAN<br><u>DESCRIPTION:</u> TYPE OF PU SENSING ON CHANNEL NUM_CHAN | 3 FOR EACH STA |
| CHANNELSENSING QUERYACK | MAC | BAC | NONE<br><u>DESCRIPTION:</u> INDICATES ACK/NACK. '1' INDICATES ACK. '0' INDICATES NACK. A NACK HAPPENS IF THE MAC IS BUSY WITH SOME OTHER TASKS AND CANNOT | 1 |

GO TO FIG. 6H   FIG. 6G

FROM FIG. 6G

| | | | | |
|---|---|---|---|---|
| | | | SATISFY THIS QUERY IN TIME OR IF THE STA DID NOT RECEIVE THE CHANNELSENSING QUERY SIGNAL BEFORE A TIMER EXPIRES. | |
| | | | MACADDRESS<br>DESCRIPTION: MAC ADDRESS OF THE STA | 48 |
| CHANNELSENSING RESULT | MAC | BAC | NUM_CHAN<br>DESCRIPTION: NUMBER OF TOTAL CHANNELS TO BE SENSED | 4 |
| | | | MACADDRESS<br>DESCRIPTION: MAC ADDRESS OF THE STA | 48 |
| | | | CHANID_CH1<br>DESCRIPTION: CHANNEL ID (21-51) OF CHANNEL 1 ON TV WS | 8 |
| | | | PU_DETECTED_CH1<br>DESCRIPTION: PU DETECTED FOR CHANNEL 1.<br>IT CAN TAKE VALUES<br>   -DETECTED<br>   -NOT_DETECTED<br>NOTE: THIS MESSAGE WILL BE SENT EITHER IN RESPONSE TO CHANNELSENSINGQUERY, OR, WHEN THE SENSING TOOLBOX DETECTS PUS PERIODICALLY (TENTATIVELY EVERY 2 SECONDS) | 1 |
| | | | SU_USAGE_CH1<br>DESCRIPTION: % TIME UTILIZATION OF THE CHANNEL 1 ROUNDED TO THE NEAREST INTEGER | 7 |
| | | | | |

GO TO FIG. 6I    FIG. 6H

FROM FIG. 6H

| | |
|---|---|
| CHANID_CH2<br><u>DESCRIPTION:</u> CHANNEL ID (21–51) OF CHANNEL 2 ON TV WS | 8 |
| PU_DETECTED_CH2<br><u>DESCRIPTION:</u> PU DETECTED FOR CHANNEL 2. | 1 |
| SU_USAGE_CH2<br><u>DESCRIPTION:</u> % TIME UTILIZATION OF THE CHANNEL 2 ROUNDED TO THE NEAREST INTEGER | 7 |
| CHANID_CH3<br><u>DESCRIPTION:</u> CHANNEL ID (21–51) OF CHANNEL 3 ON TV WS | 8 |
| PU_DETECTED_CH3<br><u>DESCRIPTION:</u> PU DETECTED FOR CHANNEL 3. | 1 |
| SU_USAGE_CH3<br><u>DESCRIPTION:</u> % TIME UTILIZATION OF THE CHANNEL 3 ROUNDED TO THE NEAREST INTEGER | 7 |
| . . . | |
| CHANID_NUM_CHAN<br><u>DESCRIPTION:</u> CHANNEL ID (21–51) OF CHANNEL NUM_CHAN ON TV WS | 8 |
| PU_DETECTED_ NUM_CHAN<br><u>DESCRIPTION:</u> PU DETECTED FOR CHANNEL NUM_CHAN. | 1 |

FROM FIG. 6I

| | | | | |
|---|---|---|---|---|
| | | | SU_USAGE_ NUM_CHAN<br>DESCRIPTION: % TIME UTILIZATION OF THE CHANNEL NUM_CHAN ROUNDED TO THE NEAREST INTEGER | 7 |
| CHANNELSENSING RESULTACK | BAC | MAC | NONE<br>DESCRIPTION: INDICATES THE SUCCESSFUL RECEPTION OF THE CHANNELSENSINGRESULT MESSAGE.<br>MAC DETECTS THE LOSS AND CORRUPTION OF THE CHANNELSENSINGRESULT MESSAGE VIA A TIMER. | 1 |
| | | | MACADDRESS<br>DESCRIPTION: MAC ADDRESS OF THE STA | 48 |
| SILENT_PERIOD_ REQUIRMENTS_QUERY | BAC | MAC | NONE<br>DESCRIPTION: '1' INDICATES QUERY. '0' NO ACTION<br>THIS MESSAGE IS FORWARDED TO SENSING TOOLBOX ON STAS. MAC HERE ACTS AS A PROXY ONLY. | 1 |
| | | | MACADDRESS<br>DESCRIPTION: MAC ADDRESS OF THE STA | 48 |
| SILENT_PERIOD_ REQUIRMENTS_QUERY _ACK | MAC | BAC | MACADDRESS<br>DESCRIPTION: MAC ADDRESS OF THE STA | 48 |
| | | | DTVDETECTIONDUTYCYCLEONTIME<br>DESCRIPTION: SILENT PERIOD DUTY CYCLE ON TIME FOR DTV DETECTION | 5 |
| | | | | |

GO TO FIG. 6K   FIG. 6J

FROM FIG. 6I

| | | | SU_USAGE_ NUM_CHAN<br><u>DESCRIPTION:</u> % TIME UTILIZATION OF THE CHANNEL NUM_CHAN ROUNDED TO THE NEAREST INTEGER | 8 |
|---|---|---|---|---|
| CHANNELSENSING RESULTACK | BAC | MAC | NONE<br><u>DESCRIPTION:</u> INDICATES THE SUCCESSFUL RECEPTION OF THE CHANNELSENSINGRESULT MESSAGE.<br>MAC DETECTS THE LOSS AND CORRUPTION OF THE CHANNELSENSINGRESULT MESSAGE VIA A TIMER. | 1 |
| | | | <u>MACADDRESS</u><br><u>DESCRIPTION:</u> MAC ADDRESS OF THE STA | 48 |
| SILENT_PERIOD_ REQUIRMENTS_QUERY | BAC | MAC | NONE<br><u>DESCRIPTION:</u> '1' INDICATES QUERY. '0' NO ACTION<br>THIS MESSAGE IS FORWARDED TO SENSING TOOLBOX ON STAS. MAC HERE ACTS AS A PROXY ONLY. | 1 |
| | | | <u>MACADDRESS</u><br><u>DESCRIPTION:</u> MAC ADDRESS OF THE STA | 48 |
| SILENT_PERIOD_ REQUIRMENTS_QUERY _ACK | MAC | BAC | <u>MACADDRESS</u><br><u>DESCRIPTION:</u> MAC ADDRESS OF THE STA | 48 |
| | | | DTVDETECTIONDUTYCYCLEONTIME<br><u>DESCRIPTION:</u> SILENT PERIOD DUTY CYCLE ON TIME FOR DTV DETECTION | 5 |
| | | | DTVDETECTIONDUTYCYCLEOFFTIME<br><u>DESCRIPTION:</u> SILENT PERIOD DUTY CYCLE OFF TIME FOR DTV DETECTION | 7 |

GO TO FIG. 6L   FIG. 6K

FROM FIG. 6K

| | | |
|---|---|---|
| WMDETECTIONDUTYCYCLEONTIME<br>DESCRIPTION: SILENT PERIOD DUTY CYCLE ON TIME FOR WM DETECTION | 5 |
| WMDETECTIONDUTYCYCLEOFFTIME<br>DESCRIPTION: SILENT PERIOD DUTY CYCLE OFF TIME FOR WM DETECTION | 7 |
| CHANNELQUALITYDUTYCYCLEONTIME<br>DESCRIPTION: SILENT PERIOD DUTY CYCLE ON TIME FOR SU DETECTION | 5 |
| CHANNELQUALITYDUTYCYCLEOFFTIME<br>DESCRIPTION: SILENT PERIOD DUTY CYCLE OFF TIME FOR SU DETECTION | 7 |

FIG. 6L

| NOTATION | DESCRIPTION | TYPE | DEFAULT/INITIAL VALUE |
|---|---|---|---|
| N_APS | NUMBER OF APS (EQUAL TO THE NUMBER OF BSS'S) | INTEGER | 0 |
| M_AG | MAXIMUM NUMBER OF CHANNELS A DEVICE MAY AGGREGATE | INTEGER | 4 |
| BW_ALLOC_TABLE | RECORD THE CHANNELS ASSIGNED TO EACH AP (OR BSS) | A TABLE | NULL ARRAY FOR EACH AP (OR BSS) |
| CH_POL_DB | THE CHANNELS ALLOWED TO BE USED BY POLICIES | AN ARRAY | NULL ARRAY |
| CH_TVWS_DB | THE CHANNELS THAT A DEVICE HAS THE CAPABILITY OF USING | AN ARRAY | NULL ARRAY |
| VACANT_CH_DB | THE CHANNELS DEEMED VACANT BY CONSIDERING THE TVWS DATABASE, THE POLICY DATABASE, AND THE DEVICE CAPABILITY DATABASE, I.E., VACANT_CH_DB = CH_DEV_DB ∩ CH_POL_DB ∩ CH_TVWS_DB | AN ARRAY | NULL ARRAY |
| VACANT_CH_STBOX | THE CHANNELS CONSIDERED VACANT BY THE SENSING TOOLBOX | AN ARRAY | NULL ARRAY |
| SU_USAGE[n] | SU USAGE (E.G., SNR) SAMPLES FOR CHANNEL N REPORTED BY THE SENSING TOOLBOX | AN ARRAY | NULL ARRAY |
| SU_USAGE_TH | SU USAGE THRESHOLD TO BE APPLIED TO SU_USAGE | SCALAR | 10 dB |
| CHAN_UT[n] | CHANNEL UTILIZATION FOR CHANNEL N, EQUAL TO THE PERCENT OF THE SAMPLES OF SU_USAGE[N] THAT ARE GREATER THAN SU_USAGE_TH. THE RANGE IS FROM 0 TO 100 PERCENT. | SCALAR | 0 |
| CHAN_QUAL_NWK | CHANNEL QUALITY BASED ON THE STATISTICS SENT FROM THE NETWORK | | NULL ARRAY |
| T_CH_QUAL_RPT_NWK | THE PERIOD AT WHICH THE CHANNEL QUALITY METRICS REPORTED FROM THE NETWORK | SCALAR | 2 SECONDS |
| RPT_MISS_COUNT | HOW MANY TIMES THE CHANNEL QUALITY METRICS REPORT MAY BE MISSED WITHOUT CONSIDERING THE CHANNEL QUALITY THE WORST | SCALAR | 3 |

FIG. 8A

| TIMER_CH_QUAL[k] | HOW MUCH TIME HAS ELAPSED SINCE THE LAST QUALITY METRICS REPORT IS RECEIVED FOR CHANNEL K | SCALAR | 0 SECONDS |
|---|---|---|---|
| RANKED_AVAIL_CHANS_UT | RANKED AVAILABLE CHANNELS IN DECREASING ORDER OF CHANNEL UTILIZATION INDEX | AN ARRAY | NULL ARRAY |
| RANKED_ACT_CHANS_NWK | RANKED ACTIVE CHANNELS IN DECREASING ORDER OF CHANNEL QUALITY REPORTED BY THE NETWORK | AN ARRAY | NULL ARRAY |
| INDEP_CH_SILENT_EN | INDICATOR ON WHETHER CHANNEL INDEPENDENT SILENT PERIOD OPERATION IS ENABLED OR NOT | SCALAR (1 FOR ENABLED, 0 FOR DISABLED) | 0 |
| LOSS_RATE_TH | FRAME LOSS RATE THRESHOLD | SCALAR | 0.6 (TENTATIVE) |
| RSSI_TH | RSSI THRESHOLD | SCALAR | −85dBm (TENTATIVE) |
| QUEUE_TH | QUEUE SIZE THRESHOLD | SCALAR | 20 KB (TENTATIVE) |
| UT_GAP | THE MINIMUM GAP IN CHAN_UT VALUE THAT JUSTIFIES A CHANNEL SWITCH | SCALAR | 10% (TENTATIVE) |
| T_NWK_BA | MINIMUM TIME BETWEEN CONSECUTIVE NETWORK PERFORMANCE TRIGGERED BANDWIDTH ALLOCATIONS | SCALAR | 4 SECOND (TENTATIVE) |
| TIMER_BA | TIMER COUNTING DOWN FROM T_NWK_BA TO 0 EVERY TIME IT IS RESET | SCALAR | T_NWK_BA |
| T_QUERY | MAXIMUM WAIT TIME FOR A SENSING QUERY RESPONSE | SCALAR | 2 SECONDS |
| TIMER_QUERY | TIMER | | |
| T_EVAC | MAXIMUM TIME FOR EVACUATING FROM A CHANNEL WHERE PUS ARE DETECTED. THE VALUE IS DETERMINED BY THE SPECTRUM ACCESS POLICY, HOW OFTEN PU SENSING IS DONE, AND HOW MUCH TIME A BSS NEEDS TO EXECUTE THE EVACUATION. | SCALAR | 1 SECOND |
| TIMER_EVAC | TIMER COUNTING DOWN FROM T_EVAC TO 0 EVERY TIME IT IS RESET | SCALAR | T_EVAC |
| CHAN_UT[N] = 100 * SIZE(X)/SIZE(SU_USAGE[N]), WHERE X={X|X ∈ SU_USAGE[N], X > SU_USAGE_TH} | | | |

FIG. 8B

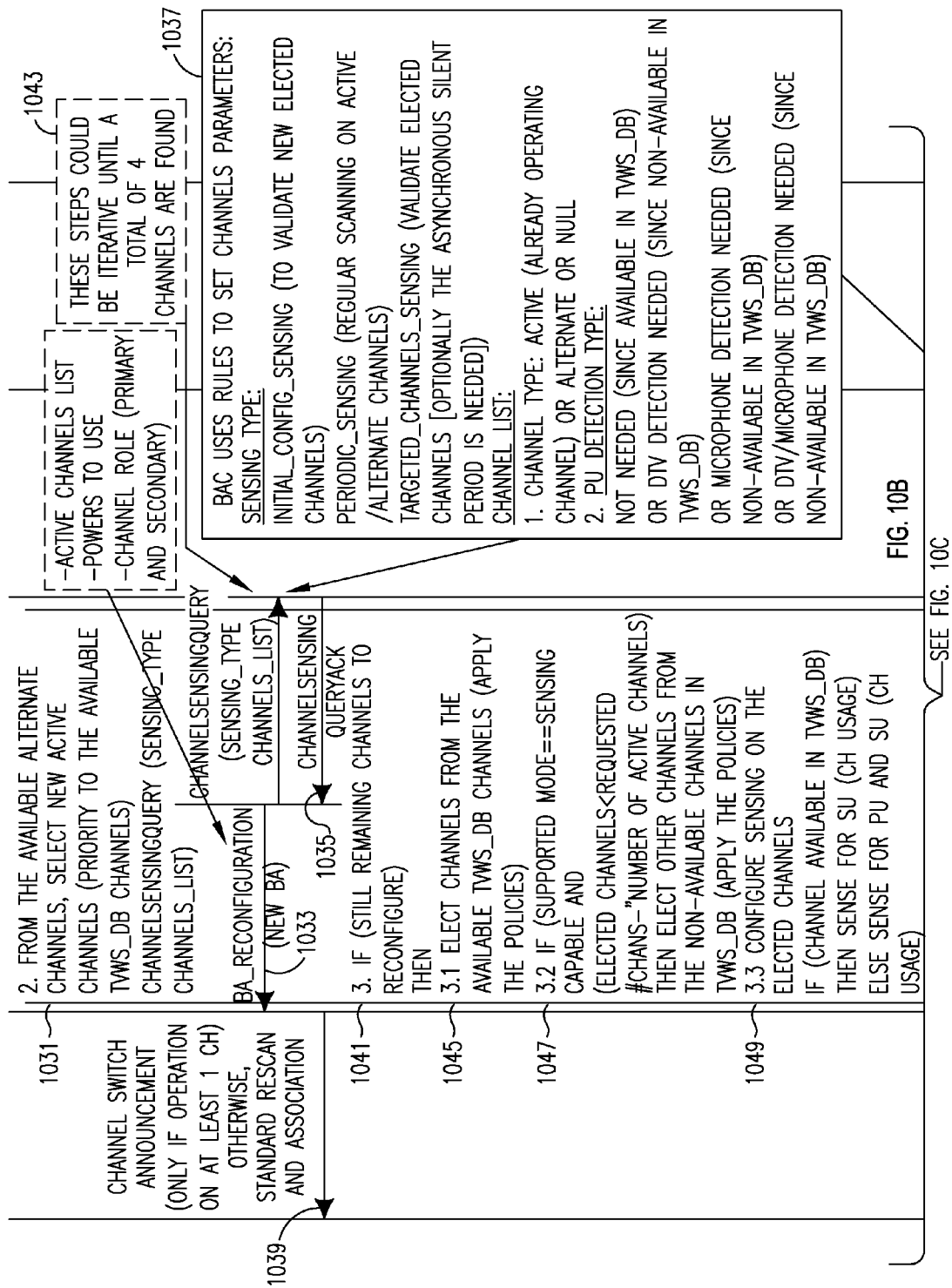

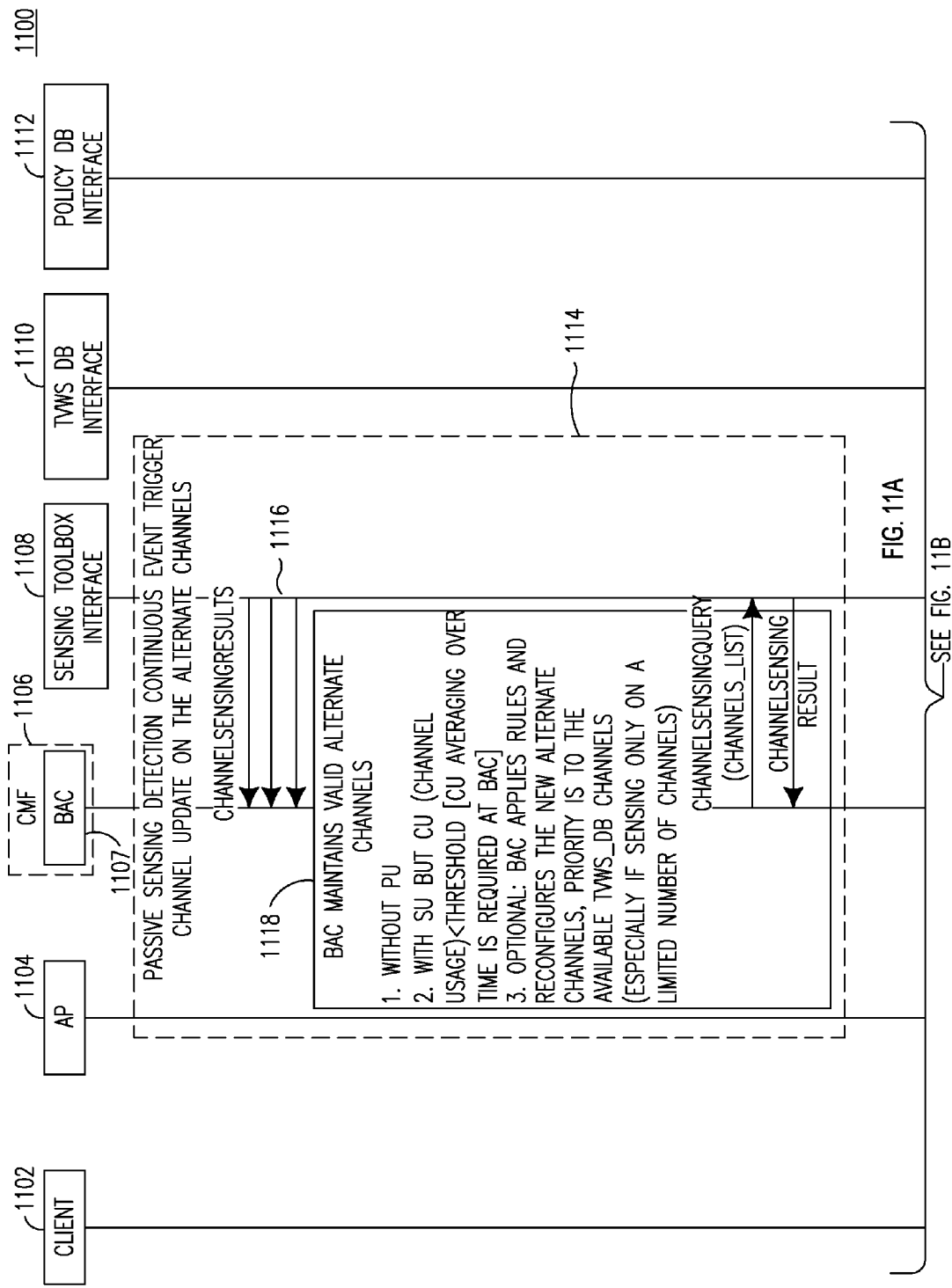

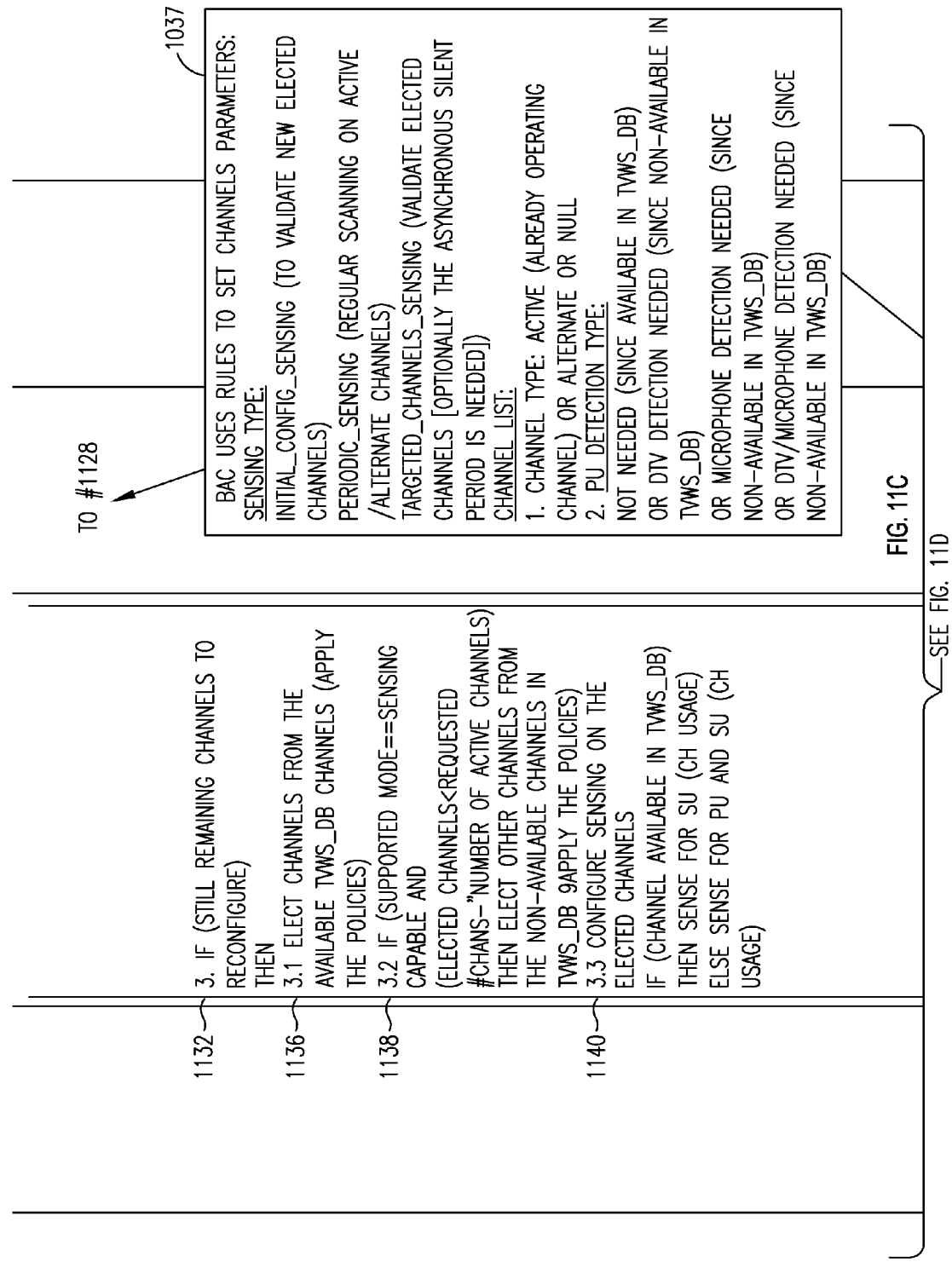

METHOD AND APPARATUS FOR BANDWIDTH ALLOCATION FOR COGNITIVE RADIO NETWORKS

CROSS REFERENCE TO RELATED APPLICATIONS

This application claims the benefit of U.S. provisional application No. 61/391,901, filed Oct. 11, 2010, U.S. provisional application No. 61/412,189, filed Nov. 10, 2010, and U.S. provisional application No. 61/413,137, filed Nov. 12, 2010, the contents of which are hereby incorporated by reference herein.

FIELD OF INVENTION

This application is related to wireless communications.

BACKGROUND

Dynamic Spectrum Management (DSM), which may also be known as Dynamic Spectrum Access, may allow spectrum access by cognitive radios when primary spectrum users (PUs) do not use the spectrum, resulting in better spectrum utilization and improved system performance. The devices in the DSM system that may access the spectrum of the PUs when the PUs do not use the spectrum are called secondary spectrum users (SUs).

SUMMARY

Described herein are methods, metrics and apparatus for bandwidth allocation for cognitive radio. Information that needs to be passed between different components of a dynamic spectrum management (DSM) system for dynamic bandwidth allocation along with the corresponding interfaces are identified. Methods and associated metrics for measuring network performance, evaluating channel sensing results and handling various bandwidth allocation scenarios are presented. Also provided is an admission control mechanism for quality of service support. Alternate channel monitoring may be performed in the background so that when a new channel is needed, an alternate channel may be immediately allocated and service disruption to the DSM system is reduced. A channel may be dynamically assigned as the primary channel in multiple channel scenarios to support tasks such as transmission of acknowledgment frames. Hybrid mode devices that may access a television white space (TVWS) database and perform spectrum sensing are also described.

BRIEF DESCRIPTION OF THE DRAWINGS

FIGS. 5A-5C show an example table of messages between a bandwidth allocation control and a sensing toolbox;

FIGS. 6A-6L show an example table of messages from a bandwidth allocation control and an access point;

FIGS. 8A and 8B show an example table of the notations used in FIG. 7;

FIGS. 10A-10C show an example call flow of network performance degradation triggered bandwidth allocation algorithm;

FIGS. 11A-11D show an example call flow of primary user (PU) detection triggered bandwidth allocation;

DETAILED DESCRIPTION

Described herein are example communication systems that may be applicable and may be used with the description herein below. Other communication systems may also be used.

Figure 1A:
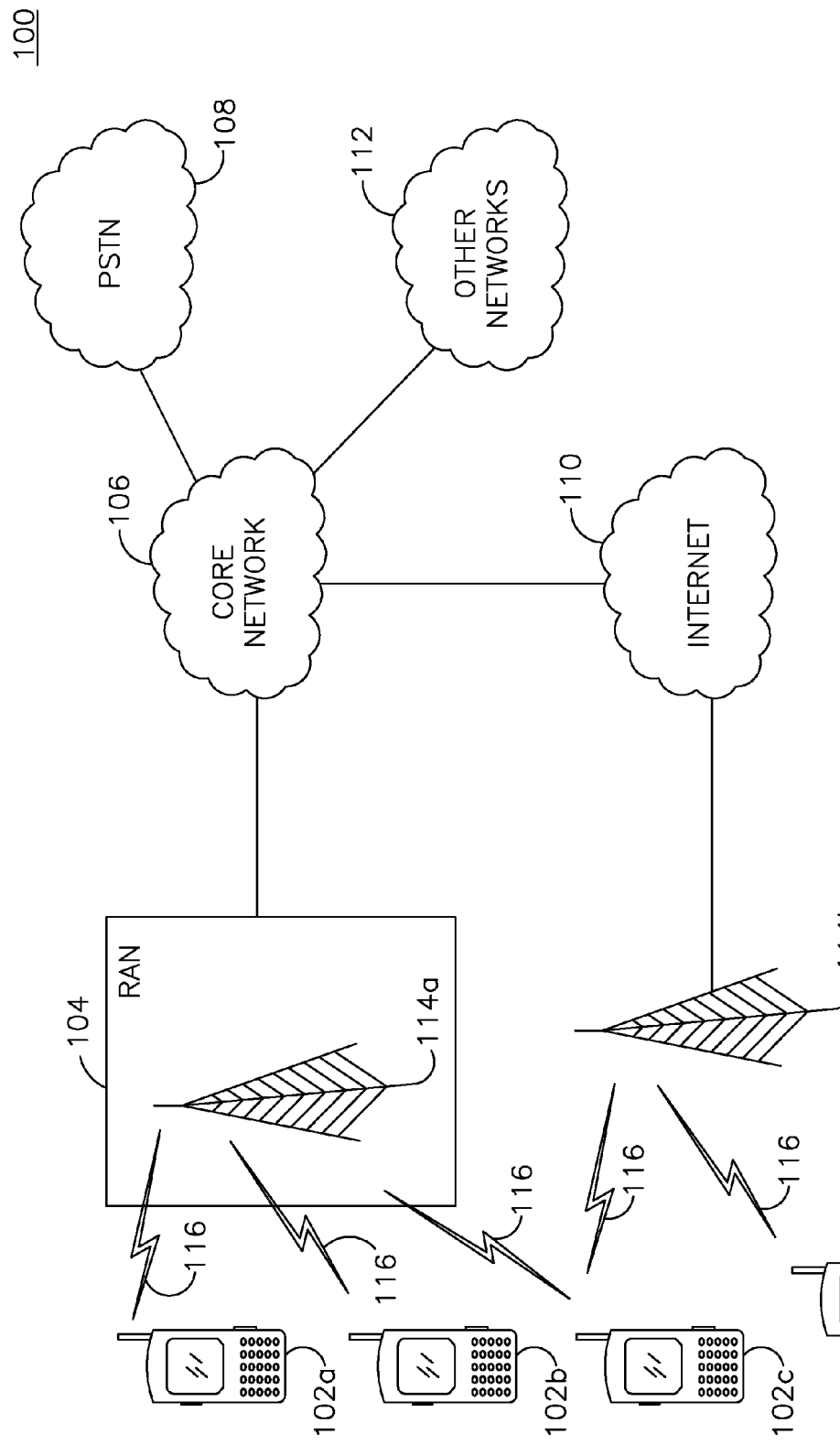
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it may be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it may be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it may be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
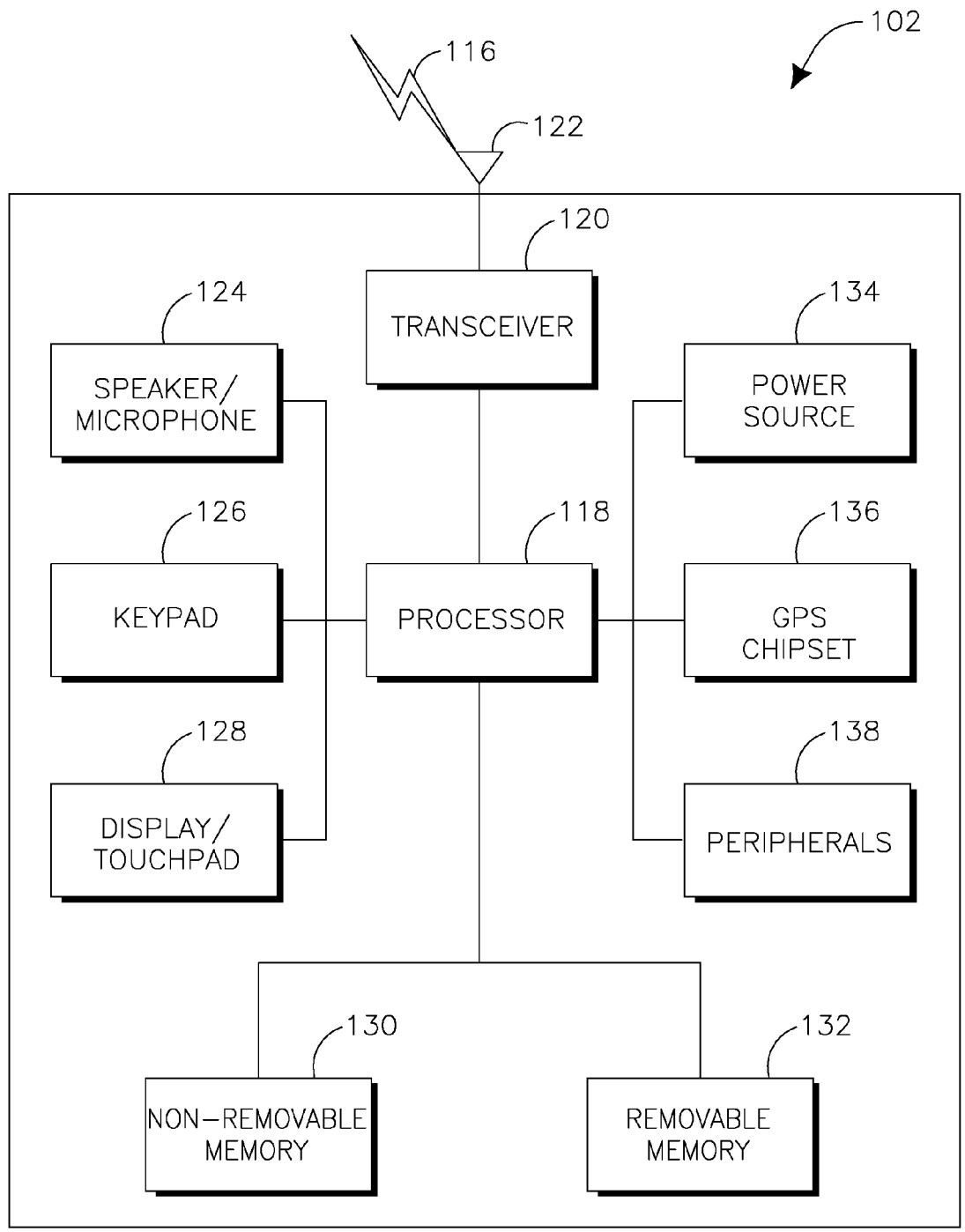
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It may be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It may be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It may be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
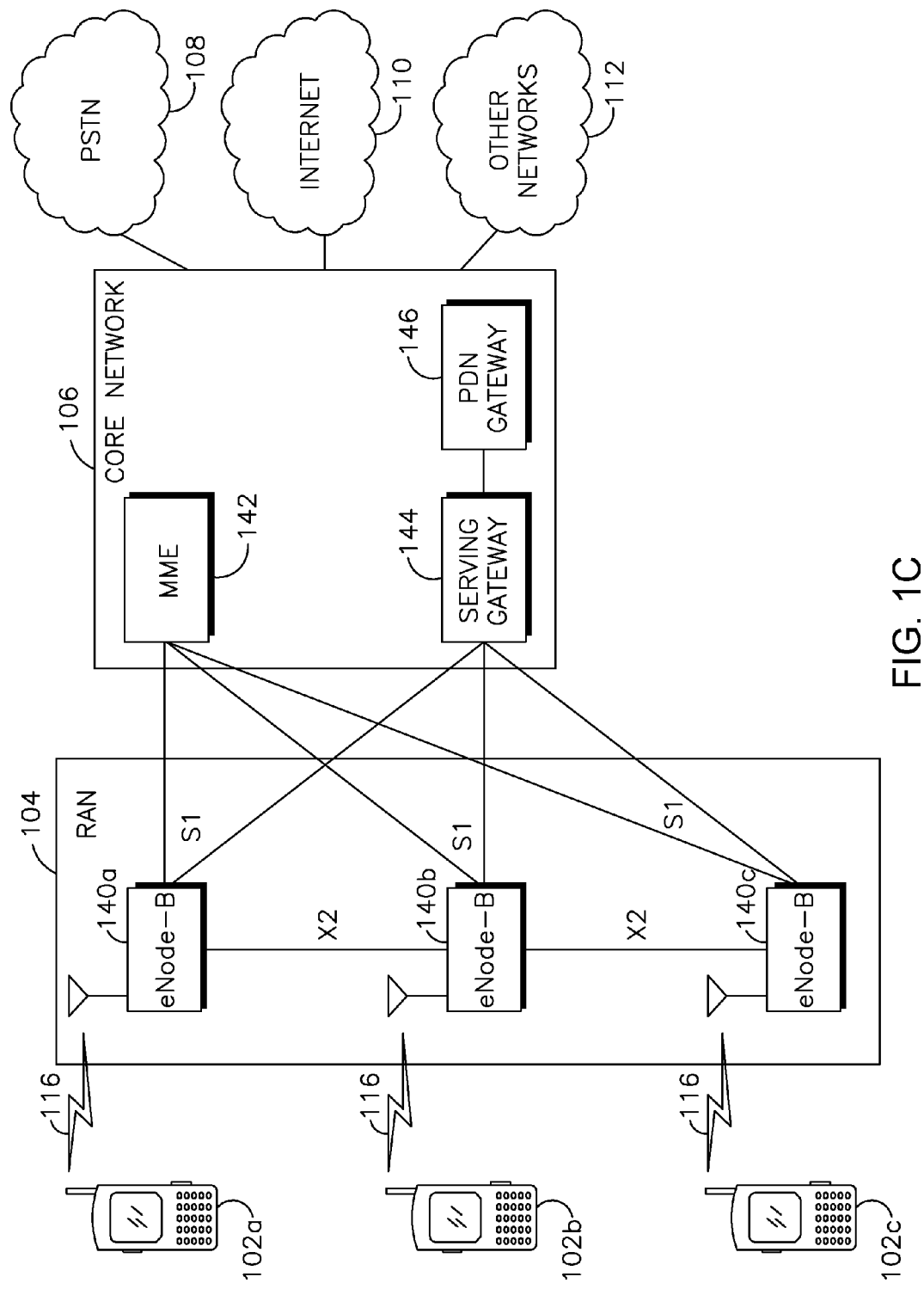
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it may be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it may be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Described herein is a Dynamic Spectrum Management (DSM) system including an example system architecture, interface definitions, metrics, bandwidth allocation algorithms, and call flows. Also described herein are hybrid devices used with the DSM system. For example, information may be identified that may need to be passed between different components of a DSM system for successful dynamic bandwidth allocation along with defining the corresponding interfaces. Various scenarios are presented in which bandwidth allocation may be needed. Metrics for measuring network performance and evaluating channel sensing results, and algorithms for handling the various bandwidth allocation scenarios are presented. Admission control mechanisms for quality of service support are also provided.

Alternate channel monitoring may be performed in the background so that when a new channel is needed, an alternate channel may be immediately allocated, therefore greatly reducing service disruption to the DSM system. In cases where a device may use multiple channels simultaneously, a channel may be assigned as the primary channel to support critical tasks such as the transmission of ACK frames for data transmissions on all channels being used. There is a need to assign a good channel (e.g., with channel qualities above a threshold) as the primary channel. However, the qualities of channels may vary over time, and a channel with relatively good qualities may degrade over time. Therefore, for optimal bandwidth allocation results, the best channel is dynamically selected as the primary channel among the channels that may be simultaneously used.

In general, hybrid devices may access a television white space (TVWS) database and perform spectrum sensing. For example, if a channel is indicated by the TVWS Database as unavailable, a device that has no other channels to use may sense the channel and may use the channel if no PU is detected on the channel. This may significantly increase the spectrum availability in places such as urban areas. Although TVWS is used herein, other spectrum may be used or be applicable such as leased spectrum, sublicensed spectrum, and other unlicensed spectrum.

DSM systems may use four types of personal/portable devices: 1) a Mode I device may operate on channels identified by either a fixed or Mode II personal/portable device; 2) a Mode II device may rely on geographic location and database access to determine available channels at its location; 3) a sensing-only device may use spectrum sensing to determine a list of available channels; and 4) a hybrid device that may know its location, has access to the television white space (TVWS) database and is capable of sensing.

Both Mode I and Mode II devices rely on geographic location and access to the TVWS database to determine available channels. A Mode II device has its own location information and has direct access to the TVWS database, while a Mode I device depends on Mode II devices in order to determine the available channels. Sensing-only devices do not have access to the TVWS database, nor the ability to determine their respective location. The only means by which sensing-only devices may access a TV channel is through spectrum sensing. That is, a sensing-only device may access a TV channel if the spectrum sensing results indicate the absence of primary users (Pus) on that TV channel.

A drawback of Mode I and Mode II devices is that they may miss spectrum access opportunities. For example, when a TV station is registered with the TVWS database, the TV station may transmit only part of the time in which it is registered to transmit. That is, even if a channel is unavailable at certain locations in the TVWS database, there still may be spectrum access opportunities at these locations.

A drawback of a sensing-only device is that it has to do spectrum sensing on every channel that it intends to access. Spectrum sensing may take excessive amounts of time, and may consume too much energy.

Hybrid mode devices may be used to avoid the drawbacks of Mode I and Mode II devices and of sensing-only devices while taking advantage of their merits. A hybrid device is a device that is able to determine its location, access the TVWS database and is capable of spectrum sensing. Embodiments describing such hybrid devices are discussed herein below.

Figure 2:
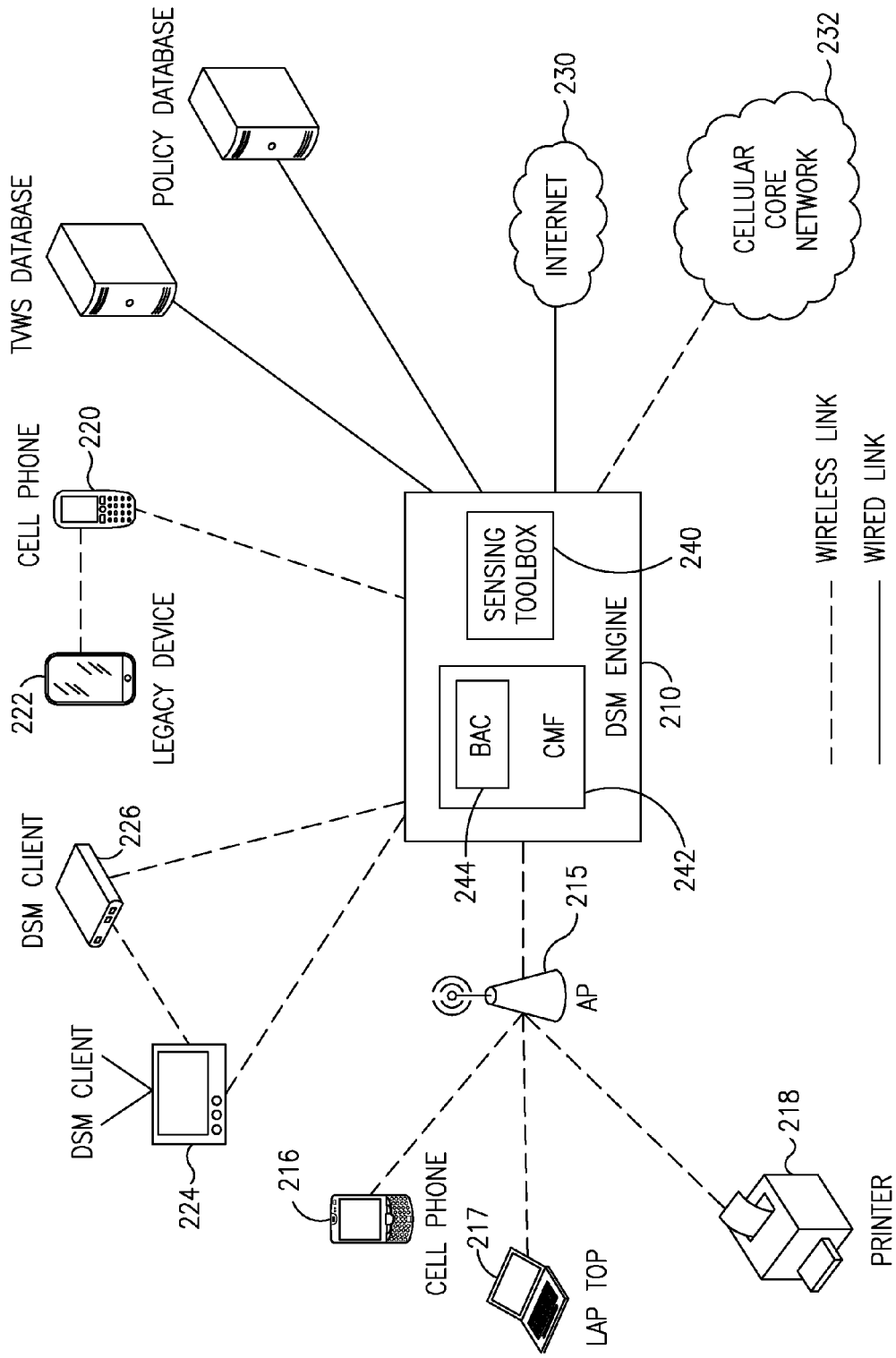
FIG. 2 is an example DSM system architecture (from 10830)

Described herein is a DSM system architecture. An example DSM architecture 200 is shown in FIG. 2. A DSM engine 210 may perform bandwidth allocation for each DSM Client, (which may be a cellular mobile device 220, a legacy device 222, generic DSM client 224 and 226, an 802.11 based device 215 having devices connected to it such as a cellular phone 216, laptop 217 and printer 218, an access point or the like), and may act as a gateway to the Internet 230 and cellular networks 232. The DSM engine 210 may contain a sensing toolbox 240, a channel management function (CMF) 242, which in turn may contain a Bandwidth Allocation Control (BAC) entity 244 that may manage bandwidth allocation. The functionality of the sensing toolbox 240, CMF 242 and BAC 244 are described herein below. The embodiments described herein below may refer to the DSM architecture shown in FIG. 2, but may be applicable to alternative architectures.

Figure 3:
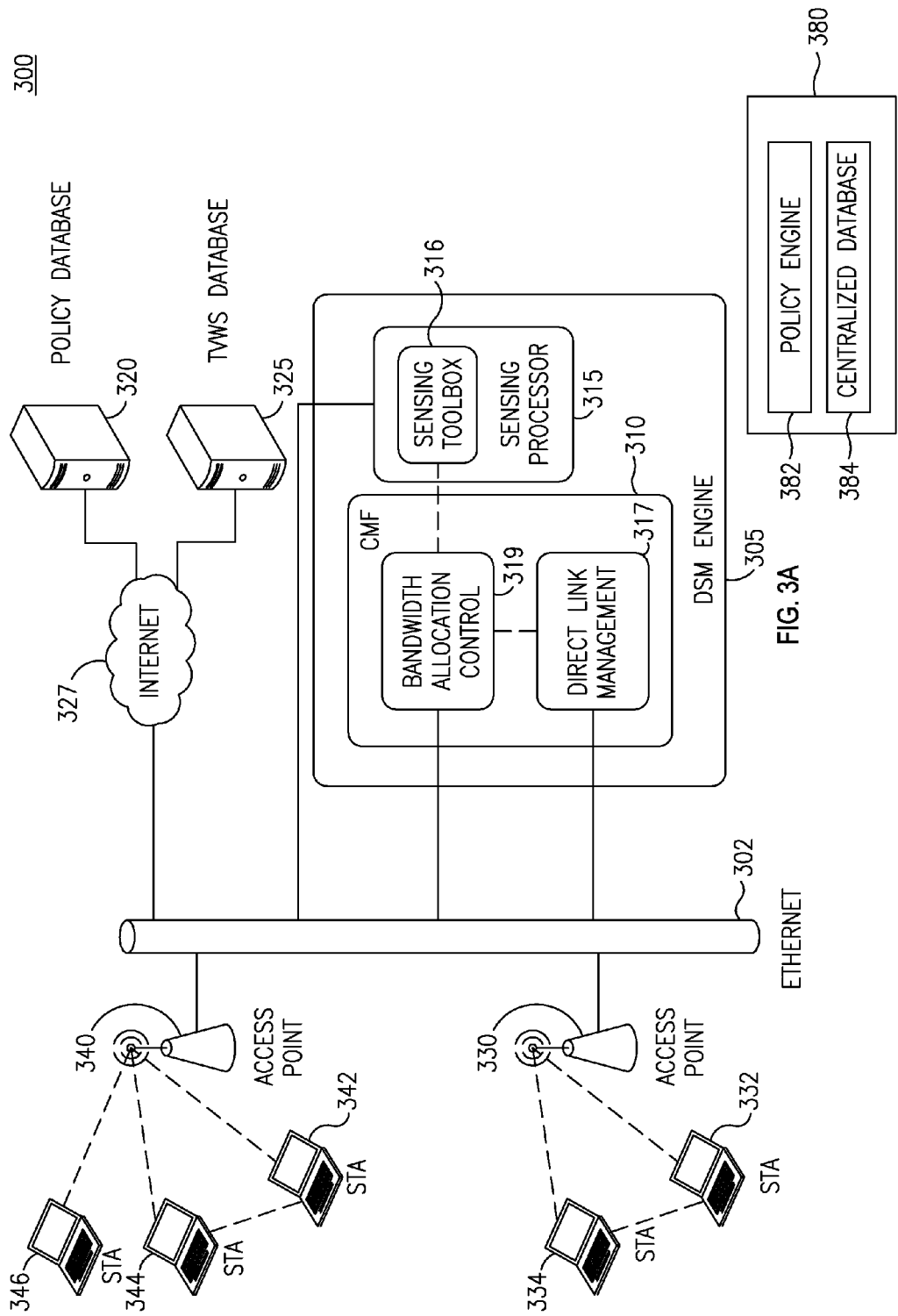
FIG. 3A is an example system architecture from the perspective of a bandwidth allocation control block.
FIG. 3B is an example block diagram of bandwidth allocation control.

FIG. 3(a) is an example system architecture where each task in a DSM system 300 is identified as a block inside a DSM engine 305. The connections or communications described herein below between the various entities may be done via an Ethernet 302. The DSM system 300 may include the DSM engine 305, which in turn may include a CMF 310 and a sensing processor 315. The CMF 310 may include a BAC 317 and direct link management (DLM) entity 319. The DSM engine 305 may be connected to or be in communication with a policy database 320 and a TVWS database 325 via Internet 327. The DSM engine may be also connected to or be in communication with multiple access points (AP) such as AP 330 and AP 340. AP 330 may be further connected to or be in communications with stations (STA) such as STA 332 and STA 334. STA 332 and STA 334 may be in direct link communications. AP 340 may by further connected to or be in communications with STA 342, STA 344 and STA 346. In particular, the BAC 319, sensing processor 315 and the DLM entity 317 may be connected to or be in communications with the other entities via Ethernet 302. FIG. 3(b) is an example functional and/or operational BAC block diagram 380. BAC 380 may include a policy engine 382 and a centralized database 384 as described herein below. For illustrative purposes only, a reference to DSM client may refer to AP 330, AP 340, and STAs 332, 334, 342, 344 and 346. However, DSM client may refer to any number and type of devises capable of interacting with and communicating in the DSM system.

The DSM engine 305 may be divided into the following logical functions including CMF 310, mobile node control (MNC) server (not shown), policy engine 382, access point (AP) functions (not shown), sensing processor (SP) 315, centralized device database 384, and Home node B function (not shown).

The CMF 310 is the central resource controller responsible for managing the radio resources and allocating them efficiently to each of the DSM clients or devices such as STAs 332, 334, 342, 344 and 346 and APs such as AP 330 and 340. This logical function also manages admission control of the DSM clients and maintains the centralized device database 384. The CMF 310 may directly handle bandwidth requests by the DSM clients. In order to satisfy these bandwidth requests, the CMF 310 may maintain a common pool of spectrum resources which it identifies and updates continuously using information provided by the sensing processor 315 and the policy engine 382. Once bandwidth is allocated to a given AP and its associated DSM clients, a control message mechanism as described herein may inform the DSM clients of the aggregated spectrum to be used. Since the spectrum utilization is expected to change with time, a control channel may be used to dynamically update or change the resources to be utilized by each of the DSM clients.

The CMF 310 may include a control channel management function which manages the delivery of control messages for channel change, beaconing and failure case handling. This function may also ensure the delivery of advanced control messages such as paging, service discovery and direct link setup. For example, based on the client requests, client capabilities, client locations and the radio resource availability, the CMF 310 may decide to handle the requests by establishing a direct link between two or more DSM clients. The enhanced control channel ensures that the DSM system 300 operates reliably and efficiently under uncoordinated and heavy interference and under constant spectrum usage change. The CMF 310 may identify and maintain a pool of available spectrum with the help of the sensing processor 315.

Radio resource allocation by the CMF 310 may conform to rules generated by the DSM policy engine 382. The DSM policy engine 382 may generate the policy rules based on inputs from the TVWS database 325 and additional system wide rules that a network operator or an enterprise customer would typically define and additional rules from the local multi radio access technology (RATs) policy engine where the network operator may define spectrum management rules such as preferred operating channels, blacklisted channels and system wide power consumption configuration. The CMF 310 may collect performance inputs from the DSM system 300 including buffer occupancy, overall latency, delivery success rate, channel utilization, and medium access delay.

User specific policies generated from a decision engine, (e.g., an Attila decision engine), may be sent through a network manager interface specific for the DSM link and then the policies may be transferred to the CMF client as described herein below. The CMF client may inform the CMF in the DSM engine 305 of the user preferences.

The CMF 310 may manage one or more AP functions. The AP function may provide the basic medium access control/physical (MAC/PHY) functionality to initiate and maintain connectivity to a group of DSM clients. Multiple groups of DSM clients may be supported in a DSM system 300. The AP function may be enhanced to support the new control channel schemes as well as non-contiguous spectrum aggregation by the MAC layer. An AP may typically be assigned a dedicated aggregated channel pool to handle both control and data messages by the CMF 305.

The sensing processor 315 may also control the sensing operation of the DSM clients operating in sensing only mode in the network.

The centralized device database 384 may store device-specific information for all the DSM clients and/or devices in the network that have been associated to the DSM engine 305.

The logical functions are meant to operate independently and perform well-defined tasks while maintaining a modular interface with the other functions. Implementation of the DSM engine 305 may allow for some logical entities to not be collocated. For example, multiple AP functions may be distributed in the local area.

The correspondence between the blocks in the DSM engine 305 and the functional blocks may be summarized where: 1) the CMF 310 may be implemented by or corresponds with the BAC 319 and DLM 317; 2) the sensing processor may be implemented by or corresponds with a sensing toolbox 316; 3) the policy engine 382 may be implemented in BAC 319; 4) the AP function may be implemented across the BAC 319 and DLM 317; and 5) the centralized device database may be implemented in BAC 319.

As shown in FIG. 3(a), the BAC 319 may communicate with the TVWS database 325 through the Ethernet 302 and the Internet 327. The BAC 319 may communicate with the sensing toolbox 316 by sending a list of channels to be sensed, and receiving reports on channel availability. To ensure that freshest information on the available channels is captured, when the BAC 319 allocates the channels, it may check with the sensing toolbox 316 to confirm that the allocated channels are still available.

The BAC 319 may communicate with medium access control (MAC) protocol instances, (on both Stations (STA) and Access Points (AP)). The information passed to the MAC protocol instances may include silent period duration and periodicity, and allocated channels. The information sent to the BAC 319 by the MAC protocol instances may include the perceived quality of service (QoS) performance and MAC-layer and physical (PHY)-layer statistics, (e.g., frame loss rate, received signal and received signal strength indicator (RSSI)), at the STAs and the APs, and may be used as a trigger for new channel assignment.

The BAC 319 may communicate with the DLM 317 to inform the latter of the channels that may be used for setting up direct links. The DLM 317 may determine which channels may be used for each direct link. The call flows for the DSM system 300 are available in U.S. application No. 61/391,901, which is incorporated by reference herein.

The method described herein provides TVWS database 325 information to devices operating in sensing only mode as well as devices operating in hybrid mode. In hybrid mode, a device may utilize channels that are specified to be free based on the TVWS database 325 information. However, if the required number of channels needed by a hybrid device (or hybrid system) is not satisfied, the device may act as a sensing only device and determine free channels based on sensing results only. Sensing only devices and hybrid devices acting in sensing only mode may be equipped with the ability to vacate a channel that was selected in this mode when a primary user is detected.

Described herein is the interface with the TVWS database 325. The interface may allow the BAC 319 to fetch relevant spectrum access policies for channel allocation and deallocation. The TVWS databases 325 may provide information on possible available channels based on the geographic locations of the TV band devices and may have three basic functions: a data repository, data registration process, and a query process. For purposes of illustration, the TVWS database 325 may be similar to the ones proposed in Google Inc., "Proposal by Google Inc. To provide a TV band device database management solution", Jan. 4, 2010; Spectrum Bridge Inc., "Spectrum Bridge response to PN DA-09-2479: Proposals for Designated TV Band Database Manager, ET Docket No. 04-186", Jan. 4, 2010; Neustar Inc., "Proposal for Designated TV band device database manager", Jan. 4, 2010; Comsearch, "Comsearch proposal to be designated as a TV band device database manager", Jan. 4, 2010; and Telcordia Technologies, Inc., "Comments of Telcordia Technologies: Proposal seeking to be designated as a TV band device database manager", Jan. 4, 2010, all of which are incorporated by reference herein.

The DeviceInfo message may include the following information: 1) Device type: fixed or personal/portable; 2) White Space Device (WSD) FCC ID: the FCC ID of the WSD; 3) WSD Serial number: the manufacturers' serial number of the WSD; and 4) WSD location: the location of the WSD, which is expressed in the latitude/longitude format. The messages between the DSM engine 305, (the BAC 319 may be involved), and the TVWS database 325 are shown in Table 1 below.

TABLE 1

| Message | Sender | Receiver | Message Contents |
|---|---|---|---|
| ChannelQuery | BAC | TVWS Database | WSD_Location<br>Description: Latitude, longitude, and altitude<br>WSD_deviceType<br>Description: Fixed or personal/portable<br>WSD_FCC_ID<br>Description: FCC ID of the WSD<br>WSD_Serial_Num<br>Description: Manufacturers' serial number of the WSD |
| ChannelReply | TVWS Database | BAC | num_chan<br>Description: Number of vacant channels<br>ch_id_ch1<br>Description: Vacant channel ID, range between 21 and 51<br>ch_id_ch2<br>Description: Vacant channel ID, range between 21 and 51<br>ch_id_ch3<br>Description: Vacant channel ID, range between 21 and 51<br>. . .<br>ch_id_num_chan<br>Description: Vacant channel ID, range between 21 and 51<br>Max_power_ch1<br>Description: FCC specification for max power on channel 1. 2 bits to identify the max TX power: 40 mW, 100 mW, or 4 W.<br>Max_power_ch2<br>Description: FCC specification for max power on channel 2. 2 bits to identify the max TX power: 40 mW, 100 mW, or 4 W.<br>Max_power_ch3<br>Description: FCC specification for max power on channel 3. 2 bits to identify the max TX power: 40 mW, 100 mW, or 4 W.<br>Max_power_ch4<br>Description: FCC specification for max power on channel 4. 2 bits to identify the max TX power: 40 mW, 100 mW, or 4 W.<br>. . .<br>Max_power_num_chan<br>Description: FCC specification for max power on channel num_chan. 2 bits to identify the max TX power: 40 mW, 100 mW, or 4 W.<br>Actual_power_ch1<br>Description: Actual max power on channel 1. 7 bits to identify the actual max TX power in dB<br>Note: A device can transmit with power at this value or below.<br>Actual_power_ch2<br>Description: Actual max power on channel 2. 7 bits to identify the actual max TX power in dB<br>Actual_power_ch3<br>Description: Actual max power on channel 3. 7 bits to identify the actual max TX power in dB<br>. . . |

TABLE 1-continued

| Message | Sender | Receiver | Message Contents |
|---------|--------|----------|------------------|
| | | | Actual_power_num_chan
Description: Actual max power on channel num_chan. 7 bits to identify the actual max TX power in dB |

Described herein in the interface with the policy database 320. The messages between the BAC 319 and the policy database 320 are shown in Table 2 below.

TABLE 2

| Message Types | sender | receiver | Parameters/Information |
|---------------|--------|----------|------------------------|
| PolicyQuery | DSM Engine | Policy Database | Location: latitude, longitude, and altitude
deviceType: fixed or personal/portable (for this project, always use personal/portable) |
| PolicyReply | Policy Database | DSM Engine | Source of policy
Policy for each channel
Channel ID
Channel definition
Policy for each device type |

Figure 4:
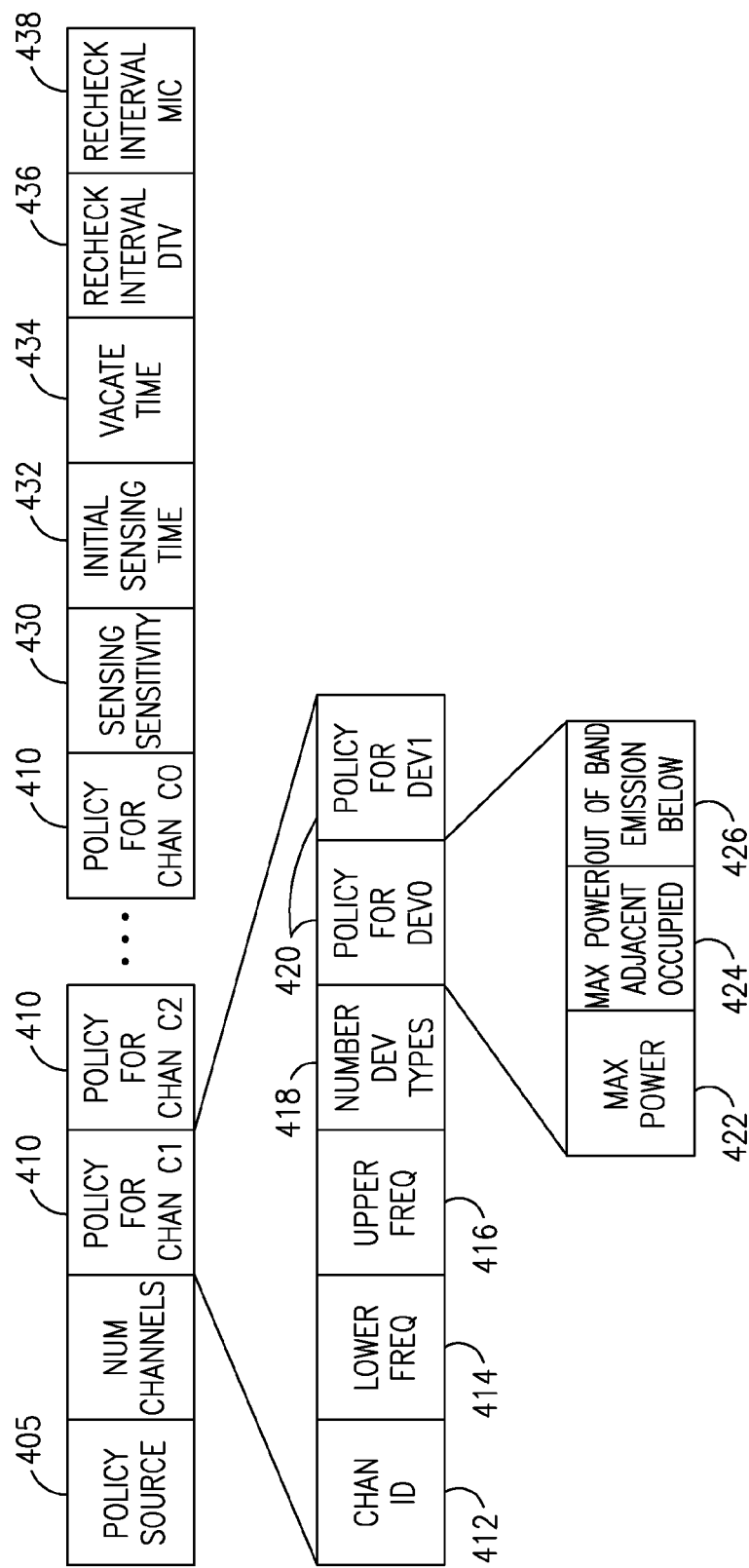
FIG. 4 is an example packet format for the policy reply message.

The policy database 320 may return a PolicyReply message to the DSM engine 305. This message may carry the relevant policy to the DSM engine 305. An example of the packet (segment) format 400 is shown in FIG. 4. The packet 400 may contain a source 405 of the policy: FCC, Office of Communications (OFCOM) or any other regulator, or user, (for user defined policies). The packet 400 may also contain the policy for each channel 410 including the channel ID 412, the channel definition as defined by the frequency range between LowerFreq 414 and UpperFreq 416, and the number of device types 418. The policy for each channel 410 for each channel may also include the policy for each device type 420 which may include: 1) MaxPower 422—the maximum effective or equivalent isotropic radiated power (EIRP) when not adjacent an occupied channel; 2) MaxPowerAjacentOccupied 424—the Maximum EIRP when adjacent an occupied channel; and 3) OutOfBandEmissionBelow 426—the out-of-band emission requirement, which specifies how many dB the power of the out-of-band emission to the adjacent channel should be below the power in the channel being used by the DSM device.

The policy of each channel 420 may further include: 1) the SensingSensitivity 430, which is a value tied to the fact that the DSM system needs to be able to sense the signal of primary users (PU) less than or equal to this value, (in the current FCC TVWS rules, the value is −114 dBm); 2) the InitialSensingTime 432, which is the time for spectrum sensing when the DSM system is first powered up, (in the current FCC TVWS rules, the value is 30 seconds); 3) the VacateTime 434, which is how quick the DSM system needs to vacate from a channel that has been determined to be used by a PU; 4) the ReCheckIntervalDTV 436, which is how often the DSM system needs to check the presence of DTV signals; and 5) the ReCheckIntervalMic 4348, which is how often the DSM system needs to check the presence of wireless microphone signals.

Table 3 shows an example spectrum access policy from an example FCC TVWS policy. In this example, Device Type 0 is for personal/portable devices, and Device Type 1 is for fixed devices.

TABLE 3

| | Device Type 0 | | | Device Type 1 | | |
|---|---|---|---|---|---|---|
| Channel ID | MaxPower (EIRP in mw) | MaxPowerAjacentOccupied (EIRP in mW) | OutOfBandEmissionBelow (dB) | MaxPower (EIRP in mw) | MaxPowerAjacentOccupied (EIRP in mW) | OutOfBandEmissionBelow (dB) |
| 21 | 100 | 40 | 55 | 1000 | 0 | 55 |
| ... | ... | ... | ... | ... | ... | ... |
| 35 | 100 | 40 | 55 | 1000 | 0 | 55 |
| 36 | 40 | 40 | 60 (?) | 0 | 0 | 55 |
| 37 | N/A | N/A | N/A | N/A | N/A | N/A |
| 38 | 40 | 40 | 60 (?) | 0 | 0 | 55 |
| 39 | 100 | 40 | 55 | 1000 | 0 | 55 |
| ... | ... | ... | ... | ... | ... | ... |
| 51 | 100 | 40 | 55 | 1000 | 0 | 55 |

Described herein is an interface for the sensing toolbox 316. The BAC 319 may need to pass the instructions for spectrum sensing to the sensing toolbox 316, and receive the spectrum sensing results from the sensingtToolbox 316. The messages exchanged between the BAC 319 and the sensing toolbox 316 are shown in FIGS. 5A-5C. The coarse sensing may be used to detect wireless microphone and digital TV/secondary user (DTV/SU), (may not always distinguish between DTV and SU), in a TV band. The information in the SilentPeriodRequirementsQueryConf may be sent from the BAC 319 to the Silent Period Management Entity, (which is located on or implemented in the AP), via the message Network_Config_Request. The BAC 319 acts as a relay between the sensing toolbox 316 and the Silent Period Management Entity. The message Network_Config_Request may also contain other information, such as the metrics for network performance. For the prototype, the PU detection may be for wireless microphones. In that case, the ChannelSensingResult may be changed according to Table 4, which shows the format of the ChannelSensingResult message in the prototype.

TABLE 4

| Message | Sender | Receiver | Parameters/Notes |
|---|---|---|---|
| ChannelSensingResult | Sensing Toolbox | BAC | Channel_List: a nx3 array, where n is the number of channels<br>For each channel, there 3 fields: chanID, PU_detected, SU_usage<br>   chanID: an integer<br>   Mic_detected, whether wireless microphones are detected. It may take values<br>     detected<br>     not_detected<br>   DTV_SU_usage, nx1 array, may be SNR values or RSSI values. The prototype may not make a distinction between DTV and SUs<br>Note: This message may be sent<br>   in response to<br>ChannelSensingQuery<br>   when the Sensing Toolbox detects<br>PUs (wireless microphones only)<br>   periodically (tentatively every 2 seconds) |

Described herein is the interface with the AP, which may be for example, AP 330 and/or 340. An example table is shown in FIGS. 6A-6L. The BAC 319 may initially interact with the TVWS database 325, policy database 320 and sensing toolbox 316 to allocate up to 4 channels for a specific AP. The assignment may be sent to the AP. When a channel currently allocated to an AP has bad conditions as reported by the AP, the AP may inform the BAC 319, which may find a replacement channel for the AP. The BAC 319 may send the channel re-assignment to the AP. When a channel currently allocated to the network becomes unavailable as reported by the sensing toolbox 316 or the TVWS database, the BAC 319 may find a replacement channel. The BAC 319 may send the channel re-assignment to the proper AP.

The message types may include: 1) Initial_BA_Request—the AP sends a request to the BAC 319, asking for a list of new channels to be assigned to it; 2) Initial_BA_Request_ACK—an acknowledge of the Initial_BA_Request message sent from BAC 319 to AP; 3) Channel_Status_Indication—report of channel failure, (when the MAC layer statistics on a device indicates that a certain channel is down, the AP may initiate a Channel_Status_Indication message to the BAC 319); 4) Channel_Status_Indication_ACK—an acknowledgement of the Channel_Status_Indication message sent from BAC 319 to AP; 5) BA_Reconfiguration—the BAC 319 may send this message to tell the AP a replacement of old channels by new channels; and 6) BA_Reconfiguration_ACK—an acknowledgement of the BA_Reconfiguration message sent from AP to BAC 319.

The Initial_BA_Request message may include the following information: 1) AP's device information, e.g. sensing capability; and 2) AP's location. The Channel_Status_Indication message may include the following information: up to) 4 sets of parameters including: Channel ID; Channel definition: the frequency range between LowerFreq and UpperFreq; MAC layer statistics type, (e.g., ACK percentage, average delivery time, etc.); and MAC layer statistics. The BA_Reconfiguration message may include the following information: (Up to) 4 sets of parameters including: Old channel ID; Old channel definition—the frequency range between LowerFreq and UpperFreq; New channel ID; New channel definition—the frequency range between LowerFreq and UpperFreq; New channel EIRP; Primary channel indicator—1 means primary channel and 0 means non-primary channel; and additional channel details, if any.

Note that it may be possible that in the BA_Reconfiguration message, the old channel(s) and the new channel(s) are not paired. Specifically, the BA_Reconfiguration message may inform starting using new channel(s) initially as there are no channels assigned yet. The BA_Reconfiguration message may only inform stopping using old channel(s), while new channel(s) are not assigned yet, or it may inform starting using new channel(s). This case may happen when there are not enough available channels, or the BAC 319 has not figured out the replacement channels when it detects some currently used channels are occupied by primary users. In this case, the unavailable entries may be set to all 0's.

Described herein are bandwidth allocation algorithms. In general, there are four types of bandwidth allocation needs: 1) initial bandwidth allocation; 2) network performance triggered bandwidth allocation; 3) sensing triggered bandwidth allocation; and 4) network performance degradation triggered bandwidth allocation.

With respect to initial bandwidth allocation, the BAC may allocate channels on a per basic service set (BSS) basis for the AP and the associated STAs. That is, the AP and the associated STAs within a BSS use the same set of channels. This type of bandwidth allocation applies to infrastructure links, (links between the AP and STAs), but not direct links, (links from STA to STA directly without going through an AP), since the requests for bandwidth allocation for direct links need to go through the AP(s) and this may not happen before the bandwidth allocation for infrastructure links is complete.

With respect to bandwidth request, (or more advanced QoS), triggered bandwidth allocation, in the case of infrastructure links, an AP may send to the BAC a message explicitly requesting a certain amount of bandwidth, (e.g., how many MHz of bandwidth), on behalf of the BSS. Alternatively, the AP may send the BAC a message specifying the QoS requirements, (e.g., average data rate for the links within the BSS), on behalf of the BSS, and the BAC may determine which channels need to be assigned to the BSS to satisfy the QoS requirements.

With respect to sensing triggered bandwidth allocation, this type of bandwidth allocation is triggered if the sensing toolbox senses the presence of PUs or strong interference from other SUs on the channels being actively used by the DSM system. In the case of the presence of PUs, the affected BSS or the STAs using direct links must stop using the channels within a certain amount of time and the BAC may try to move these devices to alternate channels. In the case of detecting strong interference from other SUs, the BAC may try to find alternate channels for the affected devices. This type of bandwidth allocation applies to both infrastructure links and direct links.

Described herein are the metrics that may be used to evaluate the quality of a channel come from two sources: the sensing toolbox, and the network, (i.e., BSS's). Example metrics that may be used are shown in Table 5 below.

TABLE 5

| metrics | Originator | Description |
| --- | --- | --- |
| SU_USAGE[k] | Sensing Toolbox | An array, SU usage (e.g., SNR) samples for channel k<br>Measured by the Sensing Toolbox<br>Measured during silent periods<br>For active channels, alternate channels |
| avg_RSSI[k] | The AP using channel k | Each device (STA or AP) reports the RSSI value (measured not in silent periods) for channel k to the AP<br>The AP computes the average (with more weight on the RSSI value from the AP)<br>For active channels only |
| min_RSSI[k] | The AP using channel k | Each device (STA or AP) reports the RSSI value (measured not in silent periods) for channel k to the AP<br>The AP computes the minimum<br>For active channels only |
| avg_frame_loss_rate[k] | The AP using channel k | Each device (STA or AP) reports the frame_loss_rate value (measured not in silent periods) for channel k to the AP<br>The AP computes the average (with more weight on the frame_loss_rate value from the AP)<br>For active channels only |
| max_frame_loss_rate[k] | The AP using channel k | Each device (STA or AP) reports the frame_loss_rate value (measured not in silent periods) for channel k to the AP<br>The AP computes the maximum<br>For active channels only |
| avg_queue_size[k] | The AP using channel k | Each device (STA or AP) reports the queue_size value for channel k to the AP<br>The AP computes the average<br>For active channels only |
| max_queue_size[k] | The AP using channel k | Each device (STA or AP) reports the queue_size value for channel k to the AP<br>The AP computes the maximum<br>For active channels only |

With respect to network performance degradation triggered bandwidth allocation, the devices in the network, (i.e., APs and the STAs), may monitor the network performance statistics such as delay and frame loss rates, and transmit the statistics to the BAC. The BAC may then determine whether the performance degradation is caused by interference from other SUs. If the answer is yes, the BAC may try to find alternate channels for the affected devices. This type of bandwidth allocation applies to both infrastructure links and direct links.

With respect to the initial bandwidth allocation, sensing triggered bandwidth allocation and network performance degradation triggered bandwidth allocation, an objective may be to try to assign up to M_AGG channels for each AP, where M_AGG, (default value=4), is the maximum channels that an AP may use. A channel reported as occupied by PUs by the sensing toolbox or as being in poor channel condition may not be considered for bandwidth allocation. If the BAC may find enough available channels, the BAC may choose the best M_AGG*N vacant channels, where N is the number of APs. Otherwise, the BAC may try to evenly divide the available channels among the APs. If the option for supporting channel independent silent periods is enabled, for each AP, a number of channels in the upper band and the number of channels in the lower band may be made as equal as possible. This may minimize the fluctuation in the QoS to be experienced by the BSS's. When channel independent silent periods may be used, there may be one or more channels which are undergoing data transmission while one or more other channels are undergoing a silent period.

The worst values for the respective metrics are defined as follows:

$$\min\_RSSI[k] = \min\{RSSI(k, i) | i = AP, STAs \text{ that assigned to use channel } k\} \quad \text{Equation (1)}$$

$$\max\_frame\_loss\_rate[k] = \max\{frame\_loss\_rate(k, i) | i = AP \text{ or } STAs \text{ that assigned to use channel } k\} \quad \text{Equation (2)}$$

$$\max\_queue\_size[k] = \max\{queue\_size(k, i) | i = AP, STAs \text{ that assigned to use channel } k\} \quad \text{Equation (3)}$$

These statistics may be an indication of the quality of the channels.

When performing the averaging, the value reported by the AP may be weighted as ½, and the STAs as a whole may be weighted as the remaining ½. The weighting scheme may account for the fact that the AP is more important than an individual STA. Assuming symmetric on each infrastructure link, half of the packets may be received by the AP and half of the packets may be received by the STAs, (excluding the AP). For a BSS, let the number of STAs, (excluding the AP), be M. As an example, for a given channel k, the avg_RSSI[k] may be computed as:

$$\text{avg\_RSSI}[k] = \frac{1}{2} RSSI(AP) + \frac{1}{2}\sum_{i=1}^{L} RSSI(STA_i)/L \qquad \text{Equation (4)}$$

where the RSSI values are converted to linear scale if they are not yet, and the AP and the $STA_i$ are assigned to use channel k, and L≤M is the number of STAs that have reported their RSSI value in the last reporting period T_CH_QUAL_RPT_NWK. The RSSI(AP) and $RSSI(STA_i)$ are reported periodically, at a period of T_CH_QUAL_RPT_NWK.

Similarly, the BAC may compute the average statistics for the frame loss rate and the queue size. Therefore:

$$\text{avg\_frame\_loss\_rate}[k] = \frac{1}{2}\text{frame\_loss\_rate}(AP) + \frac{1}{2}\sum_{i=1}^{M}\text{frame\_loss\_rate}(STA_i)/M \qquad \text{Equation (5)}$$

where the weighting here accounts for the fact that the AP may serve as the gateway of the STAs, and under the symmetric traffic assumption, the AP may send the same number of packets as the STAs do. As for the queue_size statistics:

$$\text{avg\_queue\_size}[k] = \frac{1}{2}\text{queue\_size}(AP) + \frac{1}{2}\sum_{i=1}^{M}\text{queue\_size}(STA_i)/M \qquad \text{Equation (6)}$$

where queue_size may be used to indirectly estimate the queuing delay to be experienced by the MAC frames. Again, under the symmetric traffic assumption the number of frames sent by the AP may be equal to the number of frames sent by all the STAs, and therefore the queue_size of the AP is weighted as ½, and the queue_size of the STAs are weighted together as ½.

The network-reported channel quality metrics, (all the metrics in Table 5 except SU_USAGE), may be sent in the CH_STATUS_INDICATON message by the APs to the BAC.

Described herein is how to determine the need for bandwidth allocation. A parameter per metric per channel may be defined assuming that a channel is used by at most one AP. Specifically, for channel k, the BAC may compute:

$$\text{avg\_RSSI\_index}[k]=(\text{avg\_RSSI}[k]/\max_{j\in A}\{\text{avg\_RSSI}[j]\}) \qquad \text{Equation (7)}$$

where A is the set of channels that are assigned to the APs (i.e., the set of all active channels), and $$\text{min\_RSSI\_index}[k]=\text{min\_RSSI}[k]/\max_{j\in A}\{\text{min\_RSSI}[j]\} \qquad \text{Equation (8)}$$

and $$RSSI\_INDEX[k]=a_1*\text{avg\_RSSI\_index}[k]+(1-a_1)*\text{min\_RSSI\_index}[k] \qquad \text{Equation (9)}$$

where $a_1$ is a weight between 0 and 1. RSSI_index[k] evaluates how good channel k is in terms of the RSSI values taking into account both the average behavior and the worst behavior, where $$SIG\_WEAKNESS\_INDEX[k]=1-RSSI\_index[k] \qquad \text{Equation (10)}$$

which gives a higher value if the RSSI index has a lower value.

Similarly, the BAC computes FRAME_LOSS_RATE_INDEX[k].

$$\text{avg\_frame\_loss\_rate\_index}[k]=(\text{avg\_frame\_loss\_rate}[k]/\max_{j\in A}\{\text{avg\_frame\_loss\_rate}[j]\}) \qquad \text{Equation (11)}$$

where, again, A is the set of channels that are assigned to the APs (i.e., the set of all active channels), and $$\text{max\_frame\_loss\_rate\_index}[k]=\text{max\_frame\_loss\_rate}[k]/\max_{j\in A}\{\text{max\_frame\_loss\_rate}[j]\} \qquad \text{Equation (12)}$$

and $$FRAME\_LOSS\_RATE\_INDEX[k]=a_2*\text{avg\_frame\_loss\_rate\_index}[k]+(1-a_2)*\text{max\_frame\_loss\_rate\_index}[k] \qquad \text{Equation (13)}$$

where $a_2$ is a weight between 0 and 1. The higher the frame loss rate, the greater the FRAME_LOSS_RATE_INDEX[k] is. Alternatively, the frame loss rate may be converted to the expected number of transmissions (ETX) first and then the computation may be carried out. Specifically, let p be the frame loss rate, then the expected number of transmissions (ETX) is defined as 1/(1−p) and use the average ETX and the maximum ETX for the FRAME_LOSS_RATE_INDEX computation instead.

Define Q_SIZE_INDEX[k] as follows:

$$\text{avg\_queue\_size\_index}[k]=(\text{avg\_queue\_size}[k]/\max_{j\in A}\{\text{avg\_queue\_size}[j]\}) \qquad \text{Equation (14)}$$

where, A is the set of channels that are assigned to the APs (i.e., the set of all active channels), and $$\text{max\_queue\_size\_index}[k]=\text{max\_queue\_size}[k]/\max_{j\in A}\{\text{max\_queue\_size}[j]\} \qquad \text{Equation (15)}$$

and $$Q\_SIZE\_INDEX[k]=a_3*\text{avg\_queue\_size\_index}[k]+(1-a_3)*\text{max\_queue\_size\_index}[k] \qquad \text{Equation (16)}$$

where $a_3$ is a weight between 0 and 1. The higher the queue sizes, the greater the Q_SIZE_INDEX[k] is.

The need for bandwidth allocation for channel k is defined as:

$$BA\_NEED\_NWK[k]=w_1*SIG\_WEAKNESS\_INDEX[k]+w_2*FRAME\_LOSS\_RATE\_INDEX[k]+w_3*Q\_SIZE\_INDEX[k] \qquad \text{Equation (17)}$$

where $w_1$, $w_2$, $w_3$ are between 0 and 1, and sum to 1. The larger the value of BA_NEED_NWK[k], the greater the need for channel k to have a new bandwidth allocation is.

Figure 7A:
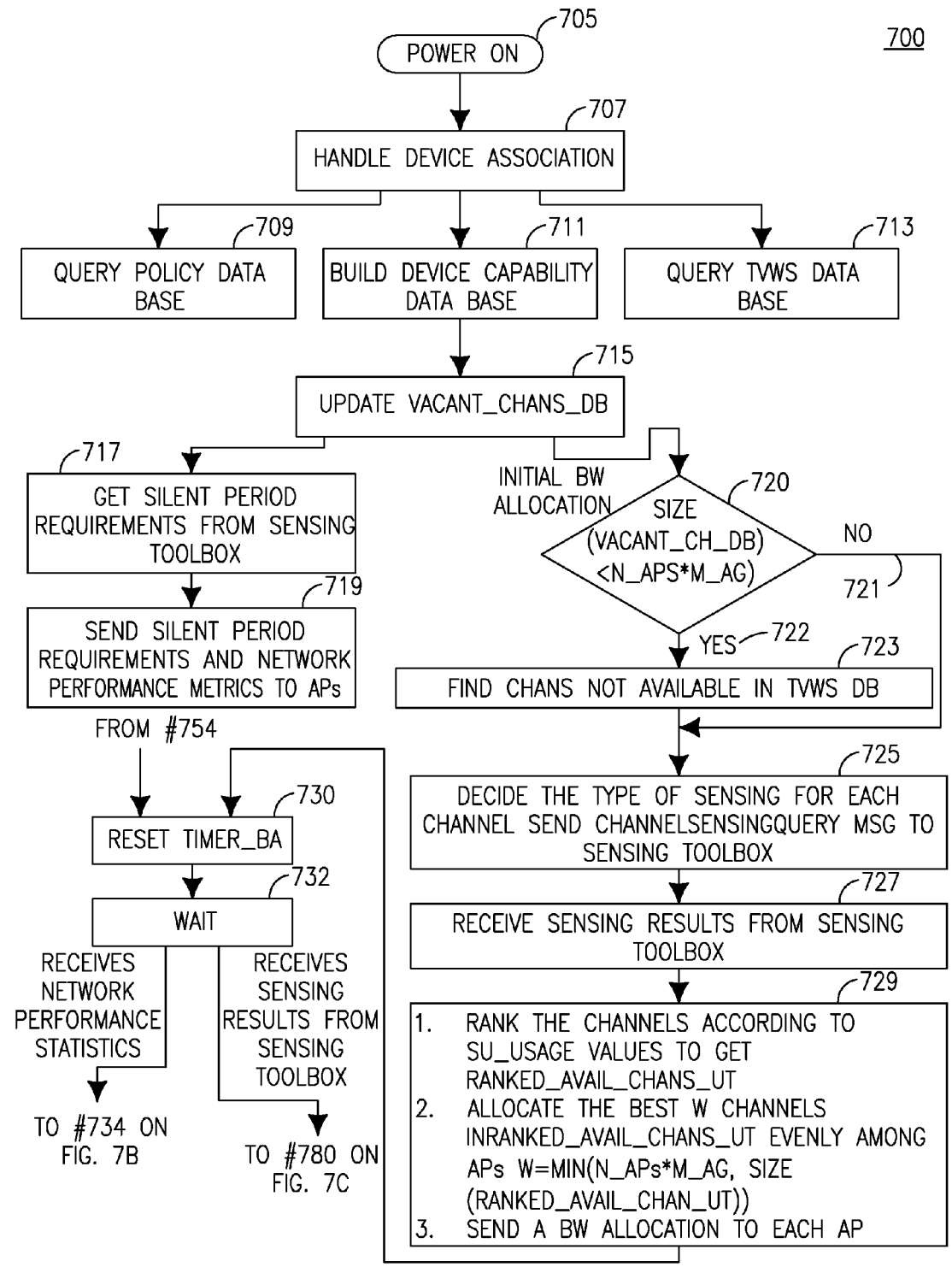
FIGS. 7A-7C show an example flow chart of a bandwidth allocation algorithm.
Figure 7B:
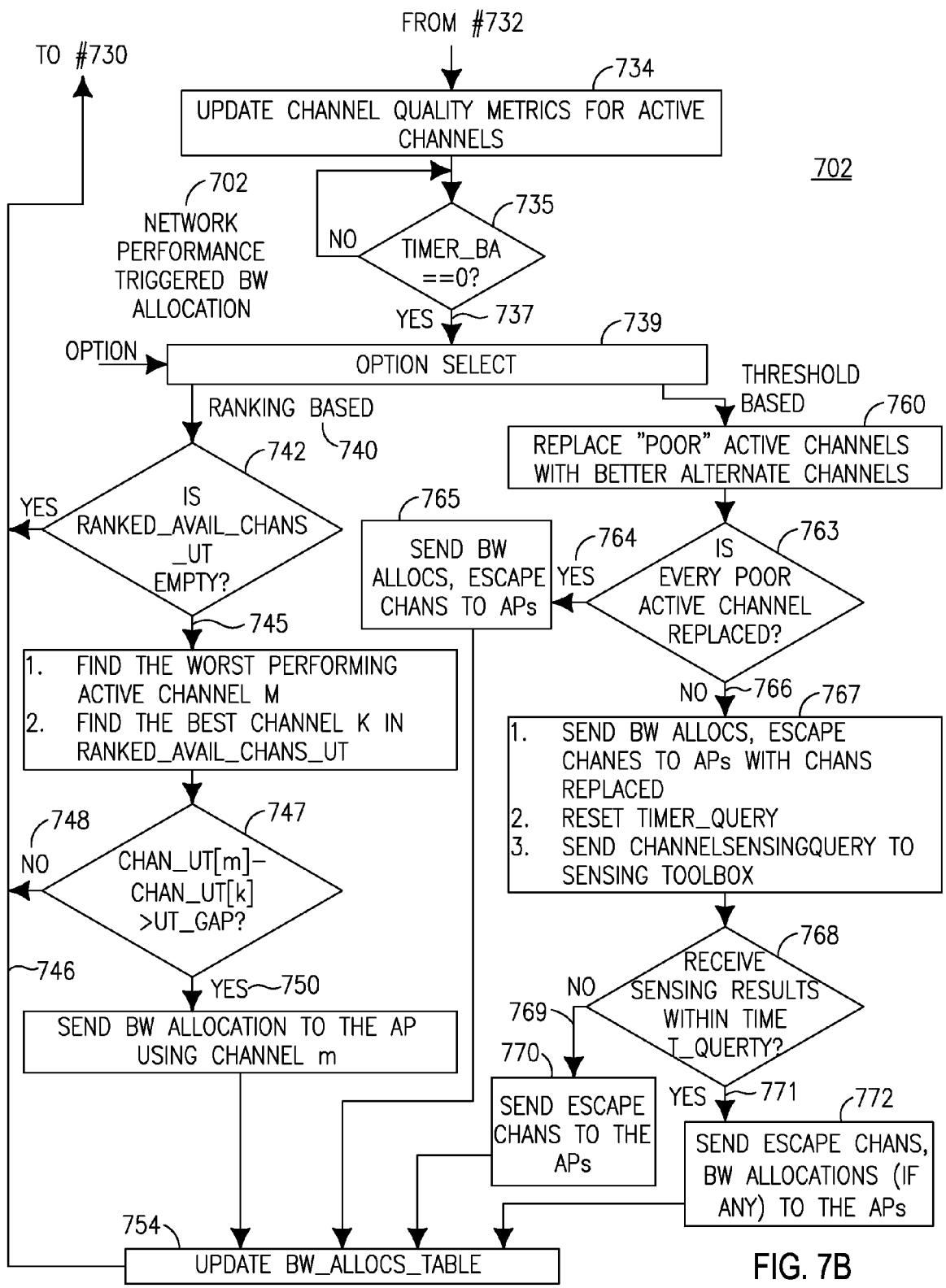
Figure 7C:
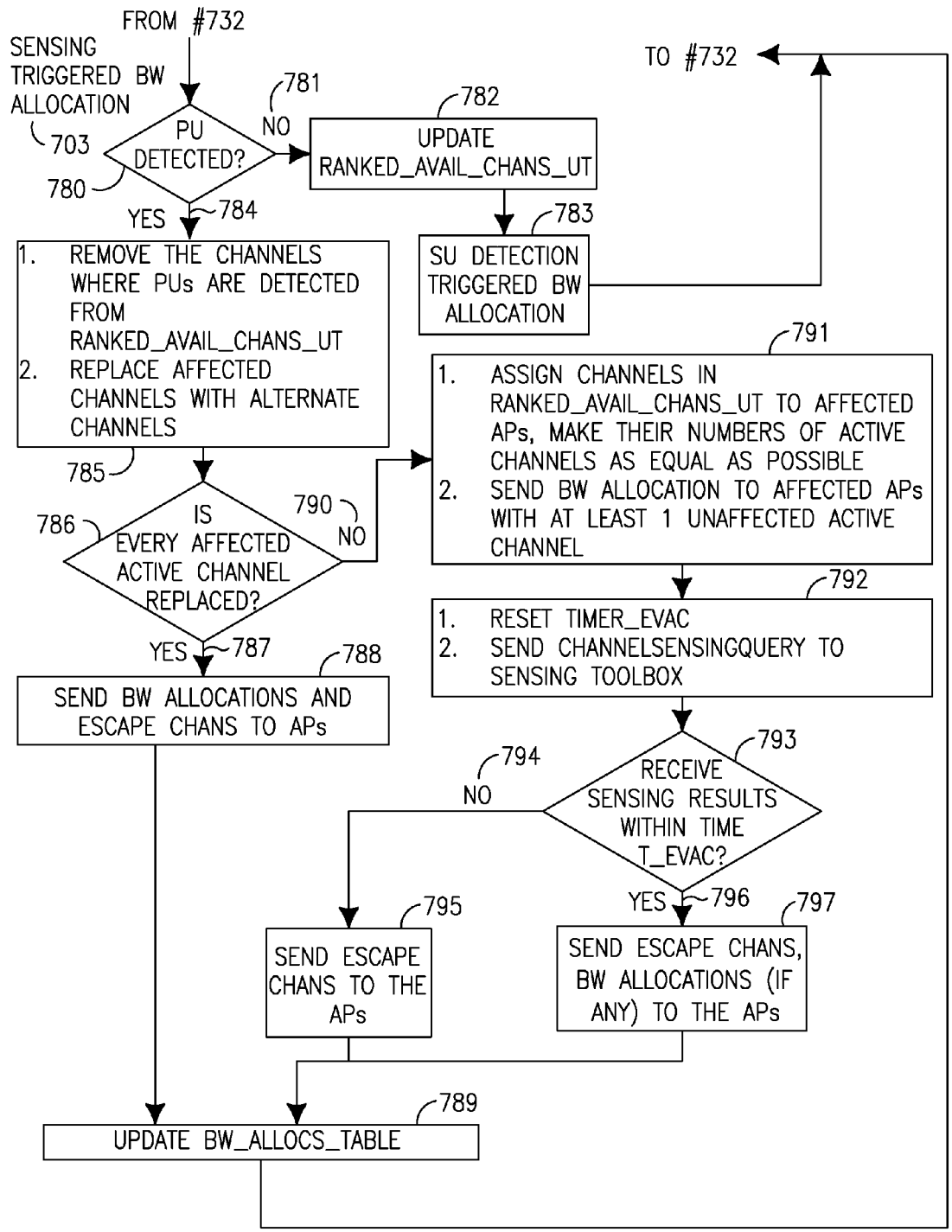

FIG. 7 shows an example flowchart 700 illustrating initial bandwidth allocation 701, network triggered bandwidth allocation 702 and sensing triggered bandwidth allocation 703. FIGS. 8A and 8B show an example table with descriptions of the notation being used in FIGS. 7A-7C. Once the DSM engine is powered on (705), (the DSM engine may be implemented as a standalone server, part of a base station, a network entity or some other like entity0), the BAC of the DSM engine may perform DSM client or device association (707). The BAC may query the policy database (709), build a device capability database (711), and query a TVWS database (713). This information may be used by the BAC to update the vacant channel database, (i.e., VACANT_CHANS_DB) (715). The BAC may get silent period requirements from the sensing toolbox (717) and send silent period requirements and network performance metrics to the APs (719). The DSM engine may need to recheck the TVWS database when the DSM engine moves by a certain distance or a certain amount of time has elapsed.

The initial bandwidth allocation method 701 may determine if the size (VACANT_CH_DB)<N_APS*M_AG) (720) If sufficient bandwidth is not vacant (721), then the BAC may find channels that are not available in the TVWS database (723). If sufficient bandwidth is vacant (722) or after the TVWS database has been queried, then the BAC may decide the type of sensing for each channel and transmit ChannelSensingQuery message to the sensing toolbox (725). The BAC may then receive the sensing results from the sensing toolbox (727). The BAC may then rank the channels according to SU_USAGE values to obtain a RANKED_AVAIL_CHANS_UT (729) The best W channels in RANKED_AVAIL_CHANS_UT may be allocated evenly among the APs and bandwidth allocation may be transmitted to each AP. The term "W" may be equal to the minimum of (N_APS*M_AG), size (RANKED_AVAIL_CHANS_UT). A timer TIMER_BA is then reset (730).

In the network performance triggered bandwidth allocation method 702, after a specified wait period (732) and the BAC has received network performance statistics, the BAC may update channel quality metrics for the active channels (734). The BAC then determines if the timer has timed out (735). If the timer has timed out (737), then the BAC performs either rank based allocation (740) or threshold based allocation (760) depending on the option selected (739). The option may be configured by a DSM engine operator or user. Otherwise, the process waits until the timer times out (736).

In the event rank based allocation has been selected, then the BAC may determine if RANKED_AVAIL_CHANS_UT is empty (742). If there are no channels available (744), then the timer is reset (730). If there are ranked available channels (745), then the BAC may find the worst active channel m and the best channel k in RANKED_AVAIL_CHANS_UT (746). The BAC may then determine if CHAN_UT[m]−CHAN_UT[k]>UT_GAP (747). If the inequality fails (748), then the timer is reset (730). If the inequality is holds (750), then the BAC may transmit bandwidth allocation information to the AP using channel m (752), update the BW_ALLOC_TABLE (754) and reset the timer (730).

In the event threshold based has been selected, then the BAC may then replace "poor" active channels with alternate channels (762). A determination may be made as to whether every poor active channel has been replaced (763). If every poor channel has been replaced (764), then the BAC may transmit bandwidth allocations and escape channels to the APs (765). Since the BAC may replace the poor channels with newly allocated ones, then the BAC may send one message to the AP. On receiving this message, the AP has to escape from the poor channels, (i.e., the escape channels), and then start using the newly allocated channels. The BW_ALLOC_TABLE may be updated (754) and the timer may be reset (730). If every poor channel has not been updated (766), then the BAC may transmit bandwidth allocations and escape channels with the channels replaced to the APs (767). The TIMER_QUERY timer may be reset, and the ChannelSensingQuery may be transmitted to the sensing toolbox. A determination may then be made as to whether the sensing results have been received within the time T_QUERY (768). If the sensing results have not been received (769), then the escape channels may be sent to the APs (770), the BW_ALLOC_TABLE may be updated (754) and the timer may be reset (730). If the sensing results have been received with the time T_QUERY (771), then the BAC may transmit the escape channels and bandwidth allocations, if any, to the APs (772, may update the BW_ALLOC_TABLE (754) and reset the timer (730).

In the sensing triggered bandwidth allocation method 703, after a specified wait period (732) and if the BAC has received sensing results from the sensing toolbox, the BAC may determine if a PU has been detected (780). If a PU has not been detected (781), then RANKED_AVAIL_CHANS_UT may be updated (782), SU detection triggered bandwidth may be triggered (783) and the BAC may go into another wait cycle (732).

If a PU has been detected (784), the BAC may remove the channels corresponding to where the PUs were detected from RANKED_AVAIL_CHANS_UT and replace affected channels with alternate channels (785). The BAC may then determine if every affected active channel was replaced (786). If every affected active channel was replaced (787), then the BAC may transmit bandwidth allocations and escape channels to the APs (788), update the BW_ALLOC_TABLE (789), and go into another wait cycle (732). If every affected active channel was not replaced (790), the BAC may assign channels in RANKED_AVAIL_CHANS_UT to affected APs, make the number of active channels as equal as possible among the APs, and transmit bandwidth allocation to affected APs with at least one unaffected active channel (791). The timer TIMER_EVAC may be reset and a ChannelSensingQuery may be sent to the sensing toolbox (792). The BAC may the determine if sensing results were received within the time T_EVAC (793). If the sensing results were not received within the time T_EVAC (794), then the BAC may transmit the escape channels to the APs (795), update the BW_ALLOC_TABLE (789) and go into another wait cycle (732). If the sensing results were received within the time T_EVAC (796), then the BAC may transmit escape channels and bandwidth allocation, if any, to the APs (797). The BW_ALLOC_TABLE (789) may then be update and another wait cycle may be entered (732).

Described herein is the initialization process (705-719) for the bandwidth allocation methods shown in FIG. 7A-7C. For device (AP) association, when the DSM engine is first powered up, it may periodically broadcast a Hello message. When an AP hears the Hello message, the AP may send an Association_Request(deviceType, location) message to the BAC located at the CMF. The information deviceType indicates whether the AP is a fixed device or a personal/portable device, and the location is the location recorded by the AP via some location method such as global positioning system (GPS). When the BAC receives the Association_Request message from an AP, the BAC may realize that the BAC may need to do initial bandwidth allocation 701 for that AP.

With respect to building/accessing the databases, once the APs are associated with the DSM engine, the BAC may build a device capability database, from which the BAC derive the channels, (i.e., CH_DEV_DB), on which the devices are capable of using. In addition, the BAC may query the policy database and the TVWS database, and get the channel lists CH_POL_DB and CH_TVWS_DB. The BAC may then compute the channels available to the devices:

$$\text{VACANT\_CH\_DB} = \text{CH\_DEV\_DB} \cap \text{CH\_POL\_DB} \cap \text{CH\_TVWS\_DB} \qquad \text{Equation (18)}$$

With respect to the pass silent period requirements and network performance metrics, the BAC may send a query to the sensing toolbox to get the silent period requirements, and pass them to the APs. The BAC may also pass the metrics for estimating the network performance to the APs.

Described herein are details regarding initial bandwidth allocation 701 (720-730). The BAC may test whether size (VACANT_CH_DB)<N_APS*M_AG holds, i.e., whether there are insufficient candidate channels ready for the sensing toolbox to check. If size(VACANT_CH_DB) <N_APS*M_AG, the BAC may add the channels considered unavailable by the TVWS database to the list of candidate channels. For these unavailable channels, the sensing toolbox may need to first sense for PUs. If no PU is detected on a channel, the sensing toolbox may then sense for SUs. For the channels in VACANT_CH_DB, the sensing toolbox may sense for SUs.

The BAC may receive the sensing results from the sensing toolbox in the ChannelSensingResult message shown in Table 3. The BAC may first remove the channels reported to have PUs from the candidate channels. The BAC may then rank the remaining candidate channels in ascending order of SU_UT values, and get RANKED_AVAIL_CHANS_UT. The BAC may assign the best W channels to the APs (BSS's), where:

$$W=\min(\text{N\_APS*M\_AG}, \text{size}(\text{RANKED\_AVAIL\_CHANS\_UT}))$$ Equation (19)

The assignments are made as even as possible among different APs. In addition, if the BAC needs to support channel independent silent period, (i.e., INDEP_CH_SILENT_EN==1), then for any AP, the BAC may try to make the number of assigned channels in the upper band as close to the number of assigned channels in the lower band as possible. This may be done as described herein below.

Let the set of the best W channels be $C_W$. Let U={k|channel k∈$C_W$, channel k is in the upper band}, and L={k|channel k∈$C_W$, channel k is in the lower band}. The procedure consists of two steps. First, assign a channel in U to each AP if U has more than N channels, or assign a channel in U to each of the APs until the channels in U run out. Then remove the assigned channels from U. Second, assign a channel in L to each AP if L has more than N channels, or assign a channel in L to each of the APs starting from the APs with one fewer channel if applicable, until the channels in L run out. Then remove the assigned channels from L.

Repeat these two steps until each AP receives M_AGG channels or U and L both become empty.

If primary carrier sense multiple access (CSMA) is used, the BAC may also specify which channel is the primary channel for an AP that receives a bandwidth allocation of one or more channels. The criterion used for primary channel selection may be: select the channel with the least SU_UT value from the channels assigned to an AP as the primary channel. The BAC may send the bandwidth allocations to the APs, which includes information about the roles of channels.

The BAC may reset the TIMER_BA timer, (i.e., lets TIMER_BA=T_NWK_BA), and the TIMER_BA timer starts counting down toward 0. The purpose of the use of the TIMER_BA is to prevent changing the bandwidth allocations too frequently, which is not desirable because there is service disruption and communication overhead associated with each change in the bandwidth allocation.

The BAC may then wait for two types of incoming information: one for network performance statistics, and the other for sensing results from the sensing toolbox. If it receives network performance statistics, it enters the procedure of network performance triggered BW allocation 702, and if it receives sensing results from the sensing toolbox, it enters the procedure of sensing triggered BW allocation 703.

Described herein are details regarding network performance triggered bandwidth allocation 702. When the BAC receives network performance statistics, it may update various channel quality metrics listed in Table 5. The BAC may wait until the timer TIMER_BA has counted down to 0. The BAC may then branch into one of two bandwidth allocation schemes. The selection is controlled by the "Option" variable.

In practice, the channel quality metrics may not be reliably reported from the DSM clients to the APs due to a number of reasons. For example, if a strong interferer suddenly shows up on all the channels being used by a DSM client and an AP, all the communications between the two may stop. As a result, the metrics, such as the RSSI value, the frame loss rate, and the queue size may not be delivered from the DSM client to the AP. A similar situation may happen between the APs and the BAC if wireless links are used for the communications between them.

To handle such situations, consecutive misses of the expected channel quality metrics reports are considered as the worst case and the concerning channels are treated as the channels that need a new bandwidth allocation most. This may be termed T_CH_QUAL_RPT_NWK_RPT_MISS_COUNT. The details are shown in Table 6.

TABLE 6

1. TIMER_CH_QUAL[k]=0
2. On receiving a channel quality metric report for channel k
3.    Reset TIMER_CH_QUAL[k]=0
4.    TIMER_CH_QUAL[k] counts up
5. end
6. If TIMER_CH_QUAL[k] ≥ T_CH_QUAL_RPT_NWK * RPT_MISS_COUNT
7.    BA_NEED_NWK[k] = 1
8.    avg_RSSI[k]=min{avg_RSSI[m] | m is a channel for which the AP has a valid channel quality metric report}
9.    avg_frame_loss_rate[k]= max{avg_frame_loss_rate[m] | m is a channel for which the AP has a valid channel quality metric report}
10.    avg_queue_size[k]= max{avg_queue_size[m] | m is a channel for which the AP has a valid channel quality metric report}
11. end In Line 2 of the above procedure, the channel quality metric report may be sent in a dedicated message or be piggybacked with a data frame or a management frame toward the AP.
In Lines 8-10, a channel m is said to have a valid channel quality metric if TIMER_CH_QUAL[m] < T_CH_QUAL_RPT_NWK * RPT_MISS_COUNT
In the case where an expected channel quality metric report is missing and the above condition holds, the AP may use the information from the last channel quality metric report in processing the channel quality metrics sent from all DSM Clients.
Other forced metric assignments may be added after Line 10.

Described herein is the ranking-based approach for network performance triggered bandwidth allocation 702. In this approach, the active channels may be ranked according to the need for bandwidth allocation as indicated by the network performance statistics. The BAC may check whether the best alternate channel is better than the worst performing active channel, (the channel that needs a new bandwidth allocation most), or not. If the answer is yes, the BAC may use the best alternate channel to replace the worst performing active channel, and a new bandwidth allocation may be generated. Otherwise, the BAC takes no action.

The metric used to compare the quality of the best alternate channel and the worst performing active channel may be CHAN_UT, which is based on the sensing results received from the sensing toolbox and the decision criteria (e.g., threshold) at the BAC applied to the sensing results.

In particular, the BAC may check whether the array RANKED_AVAIL_CHANS_UT\CH_ACT is empty, where CH_ACT is the set of active channels. If it is, the BAC may exit the ranking based bandwidth allocation procedure, reset the TIMER_BA and enter the "Wait" state for new events. If it is not empty, the BAC may find the worst performing active channel m:

$$m = \operatorname{argmax}_{k \in A} \{BA\_NEED\_NWK[k]\}$$ Equation (20)

where A is the set of all active channels. The BAC may also find the best channel k from RANKED_AVAIL_CHANS_UT.

The BAC may compare the CHAN_UT statistics of channel m and channel k. If channel m is worse than channel k by a predefined margin, a channel replacement may be justified. Specifically, if:

$$\text{CHAN\_UT}[m] - \text{CHAN\_UT}[k] > \text{UT\_GAP} \quad \text{Equation (21)}$$

then the BAC may replace channel m with channel k, send a new bandwidth allocation to the AP that has been using channel m, and update the BW_ALLOC_TABLE, which records the latest bandwidth allocation for each AP. If CHAN_UT[m]−CHAN_UT[k]≤UT_GAP, (i.e., this means that the quality of channel m is not much worse than that of channel k by a hysteresis value UT_GAP and there may be no channel switching), the BAC may exit the ranking based bandwidth allocation procedure, reset the TIMER_BA and enter the "Wait" state for new events.

If primary CSMA is used, the BAC may also need to update the roles of channels for an AP that may receive a bandwidth allocation. The criterion used for primary channel selection may be: select the channel with the least SU_UT value from the channels assigned to an AP as the primary channel. The BAC may send the bandwidth allocations to the APs, which includes an update on the roles of channels if needed.

Described herein is the threshold-based approach for network performance triggered bandwidth allocation 702. In this approach, thresholds are applied to the network performance statistics and active channels with poor conditions are identified. The BAC may then try to find alternate channels that are better than the poor performing active channels, and replace the latter with the former.

In particular, there are different ways to define "poor performing". For example, we may use the rule:

a channel k is poor performing if (avg_RSSI[k]>RSSI_TH) and (avg_frame_loss_rate[k]>LOSS_RATE_TH).

The above rule says that the received signal is strong, but the frame loss rate is high. This is an indication that there is some external interference that does not follow certain medium access rule such as the backoff rule in the Institute of Electrical and Electronics Engineers (IEEE) 802.11 standard. Alternatively, if we want to avoid contending with well-behaving secondary systems, (e.g., some 802.11 type of wireless network that uses backoff in accessing the wireless medium), we may use the rule:

a channel k is poor performing if (avg_frame_loss_rate[k]>LOSS_RATE_TH).

The need for bandwidth allocation may be factored in from the traffic demand perspective into the decision. One way to measure the need may be to use the amount of data waiting in the queue. Therefore, the following rule:

a channel k is poor performing if (avg_RSSI[k]>RSSI_TH) and (avg_frame_loss_rate[k]>LOSS_RATE_TH) and (avg_queue_size[k]>QUEUE_TH).

Alternatively, we may use the following rule to account for contention from well-behaving secondary systems:

a channel k is poor performing if (avg_frame_loss_rate[k]>LOSS_RATE_TH) and (avg_queue_size[k]>QUEUE_TH)

The BAC may use the CHAN_UT to evaluate whether an alternate channel is better than an active channel. As before, a margin on the comparison may be imposed, as shown in Equation (21).

Different methods may be used in replacing the poor active channels with alternate channels. As an example, the number of poor channels that may be replaced may be maximized. Such maximization comes up because of the constraints in Equation (21). Let the poor performing channels be CH_P. Sort the CHAN_UT values of the channels in CH_P in ascending order, and get sequence $a_1, a_2, \ldots a_u$, where u=size(CH_P) and each $a_i$ corresponds to a poor active channel. Similarly, let the alternate channels be CH_ALT. Then CH_ALT=RANKED_AVAIL_CHANS_UT\CH_ACT, where CH_ACT is the set of alternate channels. That is, the alternate channels are the channels in RANKED_AVAIL_CHANS_UT but not in CH_ACT. Sort the CHAN_UT values of the channels in CH_ALT, and get sequence $b_1, b_2, \ldots b_v$, where v=size(CH_ALT) and each $b_i$ corresponds to an alternate channel. See algorithm in Table 7.

TABLE 7

| |
| --- |
| 1. H=u |
| 2. for i=v down to 1 |
| 3.   for j=H down to 1 |
|     If $(a_j - b_i > \text{UT\_GAP})$ then |
| 5.     Replace $a_j$ with $b_i$ |
| 6.     H = j |
| 7.   end |
| 8. end |
| 9. end |

The BAC may then check whether all poor active channels have been replaced by a better alternate channel. If this is the case, the BAC may make bandwidth allocations and decide the escape channels and sends the information to the APs, and update the BW_ALLOC_TABLE. If this is not the case, the BAC may send bandwidth allocations and the escape channels information only to the APs with poor active channels successfully replaced. The BAC may then handle other APs with poor active channels.

The BAC may reset the TIMER_QUERY timer to T_QUERY. The TIMER_QUERY timer may then start counting down. The BAC may send a ChannelSensingQuery message to the sensing toolbox, specifying channels not in CH_TVWS_DB to be sensed by the sensing toolbox. The sensing toolbox may sense the presence of PUs first. If PUs are not detected, the sensing toolbox may then sense for the presence of other SUs.

If the BAC receives the sensing results before the TIMER_QUERY reaches zero, the BAC may send the bandwidth allocations, if any, and the escape channel information to the APs. The bandwidth allocation may be carried out using the same algorithm shown above, with the available channels newly reported by the sensing toolbox for CH_ALT, and the remaining poor active channels for CH_P. Otherwise, the BAC may only send the escape channel information to the APs. The BAC may then update BW_ALLOC_TABLE. Similar to the case of ranking-based approach, the BAC may need to update the channel roles when a bandwidth allocation is made. The same criterion may be used here.

Described herein is sensing triggered bandwidth allocation (703). As shown in FIGS. 5A-5C, there are three scenarios in which the BAC receives sensing results from the sensing toolbox: 1) in response to the ChannelSensingQuery message; 2) when the sensing toolbox detects the presence of PUs; and 3) periodically for continuous monitoring of the active channels and the alternate channels.

When the BAC receives sensing results, the BAC may first check if the sensing results indicate the detection of PUs. If this is not the case, the BAC may process other information, (such as SU detection results), in the sensing results and update the list RANKED_AVAIL_CHANS_UT. The BAC may then enter the "SU detection Triggered BW allocation" procedure: the BAC may perform a new bandwidth allocation if the CHAN_UT values are too high for some active channels, and the algorithm may be similar to the network performance triggered bandwidth allocation algorithm 702 described herein. However, this procedure, "SU detection Triggered BW allocation", may not be recommended in practice, because it may be difficult for the BAC to determine whether a channel is suitable for a BSS based only on the information from the sensing toolbox. For example, even if the CHAN_UT is high, (indicating significant interference from other SU systems), the STAs and the AP using that channel may still be able to communicate when the distances between the STAs and the AP are very short.

The BAC may then go back to the "Wait" state for new events. On the other hand, if PUs are detected, the BAC may remove the channels where PUs are detected from the list RANKED_AVAIL_CHANS_UT.

The BAC may then perform bandwidth allocation by replacing the active channels affected by the PU detection with channels from RANKED_AVAIL_CHANS_UT. A number of methods may be used for the replacement. If the BAC does not make a bandwidth allocation, the affected AP has to stop using the affected channel, resulting in complete loss of network performance. Therefore, it may be beneficial that the BAC allocate a new channel(s) to affected APs. If the allocated channel is not good, the network may send feedback to the BAC, triggering the network performance triggered bandwidth allocation procedure 702. Therefore, the lack of optimality in the bandwidth allocation is not an issue.

The BAC may check whether every affected active channel has been replaced. If this is the case, the BAC may send the bandwidth allocations and the escape channel information to the APs that are affected by the detection of the PUs, and update the BW_ALLOC_TABLE. On the other hand, if this is not the case, the BAC may assign the alternate channels in RANKED_AVAIL_CHANS_UT to the affected APs, trying to make the numbers of active channels of different APs as equal as possible. There are a number of options for the BAC to choose when to notify the APs of the new bandwidth allocations and the escape channel information. For example, the BAC may first send bandwidth allocation and escape channel information to the APs that have at least one unaffected active channel, and then try to get new channels from the sensing toolbox before sensing such information to other APs. The benefit of this method is that, if all the active channels of an AP are affected by the PU detection, and if the BAC sends the escape channel information to the AP, the AP may stop communication completely and the STAs under that AP may have to start an AP discovery process, which is time consuming. Therefore, if the sensing toolbox may find alternate channels quickly, (within T_EVAC), then such AP discovery process may be avoided without violating the spectrum access policies.

After sending the bandwidth allocations and the escape channel information to the APs with at least one unaffected active channel, the BAC may reset the timer TIMER_EVAC to T_EVAC, and the timer TIMER_EVAC starts counting down. The value of T_EVAC is the time budget for the BAC and the sensing toolbox to find new alternate channels, and its value is determined by the spectrum access policy and the system design, (i.e., how much time is budgeted for the system to evacuate from the affected channels). If the BAC does not receive the expected sensing results from the sensing toolbox before TIMER_EVAC reaches zero, the BAC may send the escape channel information to the concerning APs. On the other hand, if the BAC receives sensing results in time, the BAC may perform bandwidth allocation, and send the bandwidth allocations (if any) along with the escape channel information to the concerning APs. The BAC may then update the BW_ALLOC_TABLE.

Similar to the case of network performance triggered bandwidth allocation 702, the BAC may need to update the channel roles when a bandwidth allocation is made. The same criterion may be used here.

Described herein are example call flows for initial bandwidth allocation, network performance degradation triggered bandwidth allocation, PU detection triggered bandwidth allocation and network performance degradation triggered bandwidth allocation. In the example call flows, the AP may be an Access Point of an IEEE 802.11 WLAN, a base station that may serve a WTRU in a cellular network or a hybrid device that may serve both types of networks, and the client may be a station (STA) in an IEEE 802.11 WLAN or a WTRU in a cellular network. In all the example call flows, message_name (argument1, argument2, . . . ) is used to denote that: 1) the message is named message_name; and 2) the information carried in the message is argument1, argument2, . . . .

When it is determined that there are not enough available channels, (by querying the TVWS database), the BAC entity may access the TVWS database and check whether the device is also capable of sensing whether or not the device is a hybrid (mode) device. If the device is a hybrid device, the BAC entity may use the sensing toolbox to determine whether an unavailable channel, (as indicated by the TVWS database), is free of PUs. For example, this action may be triggered in the call flow shown in FIG. 9A-9C by the following condition: IF (supported mode==sensing capable) and (elected channels<requested # channels) THEN Elect other Channels from the NON-available channels in TVWS-DB (apply policy rules).

Figure 9A:
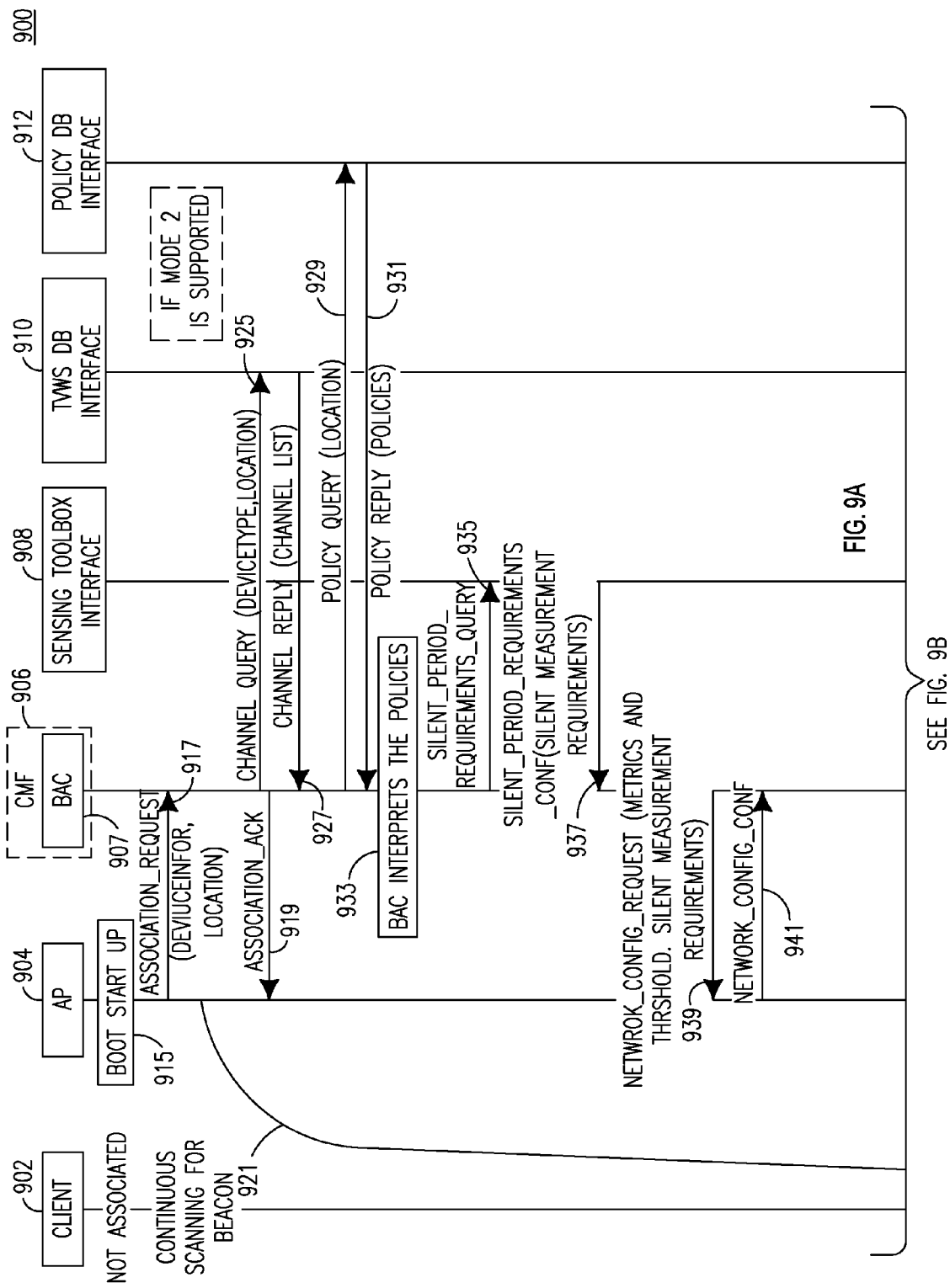
FIGS. 9A-9C show an example call flow of initial bandwidth allocation.
Figure 9B:
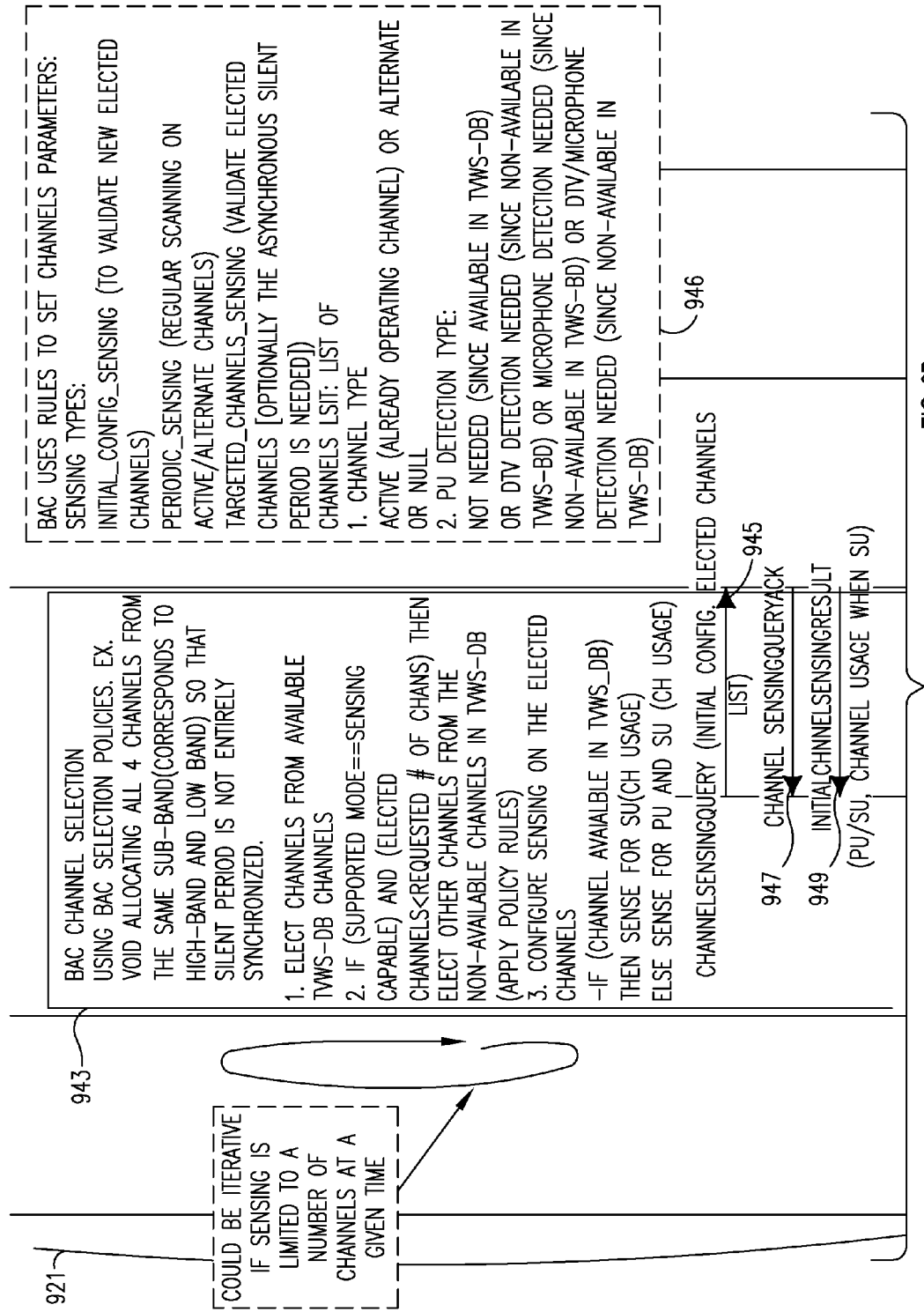
Figure 9C:
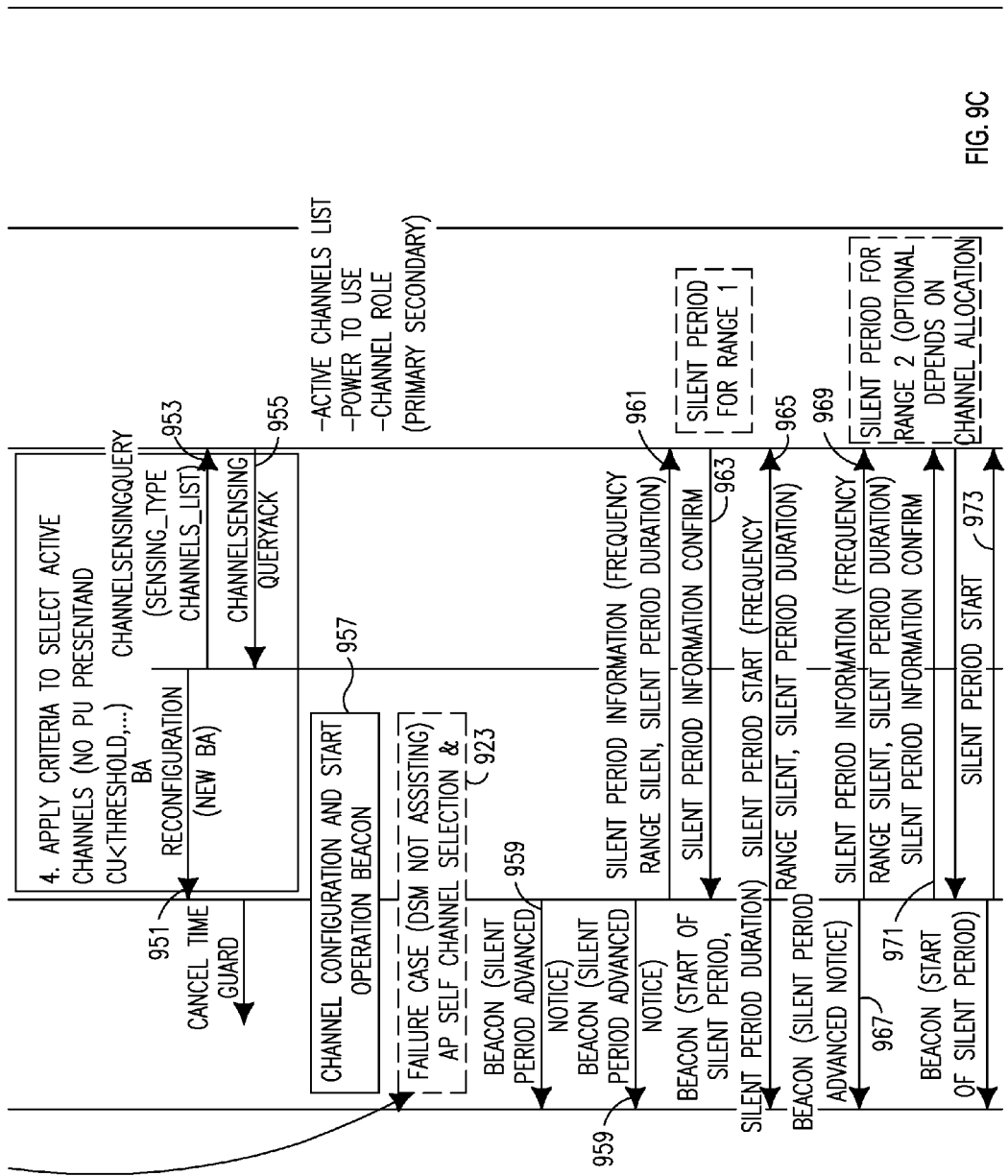

FIGS. 9A-9C show an example initial bandwidth allocation call flow 900 between a DSM client 902, AP 904, a CMF 906 including a BAC 907, a sensing toolbox interface 908, a TVWS database interface 910 and a policy database interface 912. Although only one AP 904 and one DSM client 902 are shown, there may be multiple APs and DSM clients.

After a boot startup phase (915), AP 904 may send an Association_Request (deviceType, location) message to the BAC 907 located at the CMF 906 (917). The information "deviceType" indicates whether the AP 904 is a fixed device or a personal/portable device, and the information "location" is the location recorded by the AP 904 via some location method such as GPS. When the BAC 907 receives the Association_Request message from an AP, the BAC 907 may determine that the BAC 907 may need to do initial bandwidth allocation for the AP 904. In the event that the DSM system, (i.e., the BAC 907 and related entities), fails to assist the AP 904 (921), then the AP 904 may perform AP self channel selection (923). This may be a failure case where the DSM cannot assist. This failure case may happen, for example, when communication between the AP 904 and the DSM engine is interrupted. In this case, the AP 904 cannot be assisted and the AP 904 may then operate on its own.

In the event that the DSM system may assist, the BAC 907 may reply with an Association_Ack message acknowledging the successful reception of the Association_Request message (919). The BAC 907 may then send a Channel_Query(deviceType, location) message to the TVWS database 910 (925). This message may be sent if mode 2 devices are supported. The TVWS database 910 may reply with a Channel_Reply (Channel_List), where Channel_List is the list of channels that are free of PUs, according to the information in the TVWS database 910 (927). The BAC 907 may send a Policy_Query(location) message to the policy database 912 (929). The policy database 912 may reply with a Policy_Reply(Policies) message to the BAC 907 (931). Policies are the spectrum access policies for the location specified in the Policy_Request(location) message.

The BAC 907 may interpret the policies, and decide on the channels for which spectrum sensing may be performed (933). The BAC 907 may send a SILENT_PERIO-D_REQUIREMENTS_QUERY message to the sensing toolbox 908 (935). The purpose of this message is to get the requirements of the silent period configuration. The sensing toolbox 908 may reply with a message SILENT_PERIO-D_REQUIREMENTS_CONF to the BAC 907 (937). This message may contain the silent period requirements, and additional details. The BAC 907 may send a Network_Config_Request (metrics and thresholds, silent period requirements) to the AP 904 (939). The information in the SilentPeriodRequirementsQueryConf may be sent from the BAC 907 to the Silent Period Management Entity, (not shown but which exists on every AP), via the message Network_Config_Request. The AP 904 may use the minimum duty cycle specified in the message. Each AP 904 may reply with a Network_Config_CONF message, acknowledging the successful reception of the Network_Config_Request message (941).

The BAC 907 may then perform channel selection (943), which may be an iterative process. Using BAC selection policies, such as avoiding allocation of all 4 channels from the same sub-band, (corresponds to high band and low band), so that silent period is not synchronized, the BAC 907 may elect channels from the available TVWS database channels. If sensing is supported and the elected channels are less than the number of requested channels, then elect other channels from the non-available channels in the TVWS database 910. The BAC 907 may then configure sensing on the elected channels. If the channel is available in the TVWS database 910, then configure sensing for SU channel usage. Otherwise if the channel is not available, configure sensing for PU and SU channel usage.

The BAC 907 may send a ChannelSensingQuery (init_config_sensing, Elected channels) message to the sensing toolbox 908 (945). This message contains information on the channels and the sensing methods that may need to be applied to the channels. The BAC 907 may use rules (946) to set channel parameters. In the context of initial channel allocation at AP power-on, the sensing type may be set to "initial_config_sensing". The elected channel list may include for each channel (channel number), a "channel type" equal to NULL, (in the context of initial channel allocation at AP power-on), and a "PU_detection type" set "Not_needed" if the channel is available in the TVWS database. Otherwise it may be set to "DTV detection needed" or "Microphone detection needed" if, respectively, the TVWS database has communicated the type of PU in that channel through the Channel_Reply message. Otherwise, it may be set to "DTV/Microphone detection needed". The sensing toolbox 908 may reply with a ChannelSensingQueryACK message to acknowledge the reception of the ChannelSensingQuery message (947). The sensing toolbox may then carry out spectrum sensing over the channels specified by the BAC 907 and return the sensing results to the BAC 904 via the ChannelSensingResult message (949).

The BAC 907 may then apply specified or predetermined criteria to select active channels. There are a number of ways to do the initial bandwidth allocation. In the initial bandwidth allocation process, the channels to be assigned to an AP 904 are determined, and the roles of the channels are also determined. That is, the primary channel is identified, and the secondary channels are identified. The criterion for selecting a channel as a primary channel may include, for example, "Select the channel with the least channel utilization (CHAN_UT) value from the channels assigned to an AP as the primary channel." Specifically, the channel utilization (in percent) of channel n, (where n is an integer), may be defined as $CHAN\_UT[n]=100*size(X)/size(SU\_USAGE[n])$, where $X=\{x|x\ SU\_USAGE[n], x>SU\_USAGE\_TH\}$, SU_USAGE [n] is a set of samples, (such as signal to noise ratio (SNR) values), measured for channel n, and SU_USAGE_TH is a threshold to determine the values that are considered as "busy" or "idle."

The BAC 907 may then send a BA_Reconfiguration message to each AP 904 (951), a ChannelSensingQuery message to the sensing toolbox to notify the latter of the channels that need to be monitored and the type of sensing for each of the channels (953). The sensing toolbox 908 may send a ChannelsSensingQueryAck message to the BAC 907 to confirm receipt of the ChannelSensingQuery message (955).

The AP 904 may then start operations and send beacons for the clients 902 to discover the AP 904 (959). The AP 904 may send beacons with advance notices for silent periods to the clients 902 (959). The AP 904 may send silent period information to the sensing toolbox 908 (961), which in turn may confirm receipt of the silent period information (963). A silent period may then start for a first range, for example (965). This may repeated for a second range (967, 969, 971 and 973).

Figure 10A:
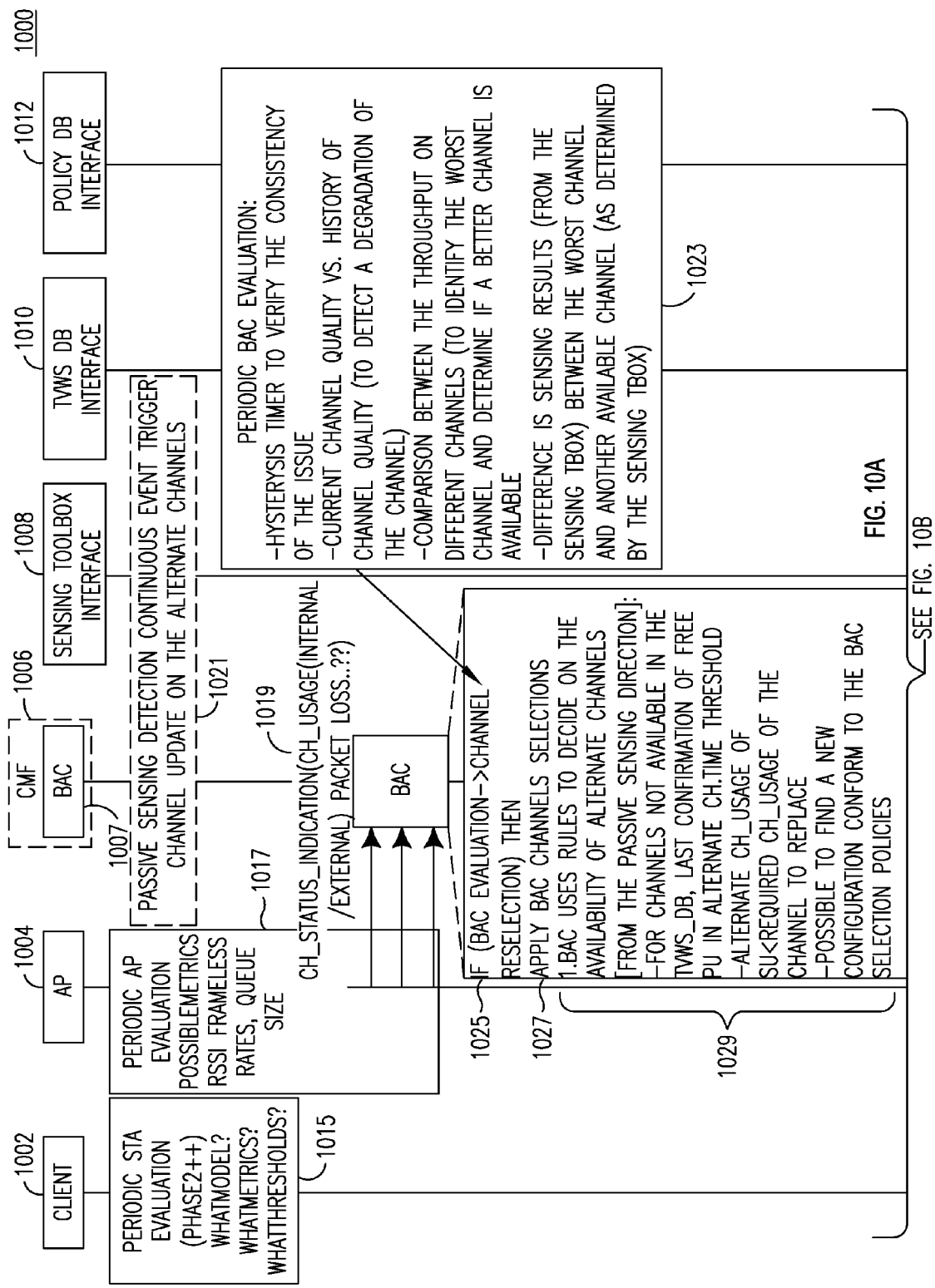
Figure 10C:
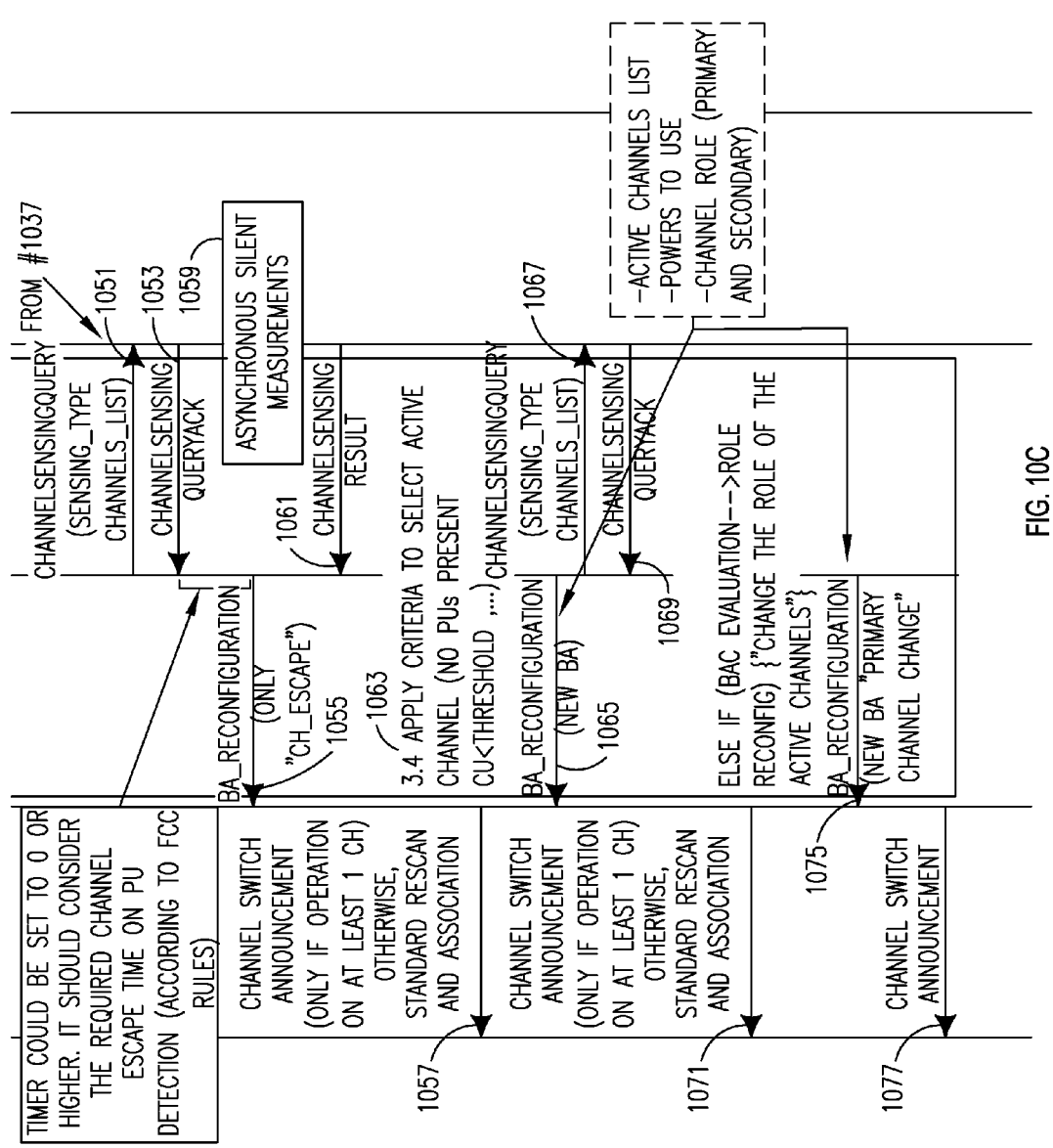

FIGS. 10A-10C show an example network performance degradation triggered bandwidth allocation call flow 1000 between a DSM client 1002, AP 1004, a CMF 1006 including a BAC 1007, a sensing toolbox interface 1008, a TVWS database interface 1010 and a policy database interface 1012. Although only one AP 1004 and one DSM client 1002 are shown, there may be multiple APs and DSM clients. A bandwidth allocation algorithm may be triggered when the network performance degrades to a certain level.

The DSM client (or STA) 1002 may report network performance metrics (1015) to their respective associated APs 1004. The APs 1004 may also monitor the network performance metrics (1017). In a single Basic Service Set (BSS), the AP 1004 computes statistics from the network performance metrics. The statistics may include the Received Signal Strength Indicator (RSSI) value, the frame loss rate, the queue size, the backoff time and the like. The statistics may be the weighted sum of a metric collected from all devices in a BSS or the maximum or minimum of a metric collected from all devices in a BSS. The AP 1004 may then send the statistics in a CH_STATUS_INDICATION message to the BAC 1007 (1019). The BAC 1007 may keep receiving a CH_STATUS_INDICATION from all APs 1004. The CMF 1006, BAC 1007 and sensing toolbox 1008 may perform passive sensing detection and continuous event trigger channel update on the alternate channels (1021).

The BAC 1007 may perform a periodic evaluation or check as to whether there is a need to make new bandwidth allocations to the APs 1004 (1023). The periodic evaluation may include a hysteresis timer to verify the consistency of the issue. It may also include a comparison between a current channel quality versus a history of channel quality to detect a degradation of the channel in question. A comparison between the throughput on different channels may be performed to identify the worst channel and determine if a better channel is available. It may involve determining the difference in sensing results, (from the sensing toolbox 1008), between the worst channel and another available channel as determined by the sensing toolbox 1008. The period may be controlled by a timer called TIMER_BA.

If the BAC evaluation process determines that channel reselection may be needed (1025), then the BAC 1007 may perform channel selection (1027). The BAC 1007 may use rules to decide on the availability of alternate channels from passive sensing detection (1029). The rules to select an alternate channel are as follows. If the channel is not available in the TVWS database, (i.e., it is assigned to a primary user (PU)), the sensing result may not contain a PU detection on that channel. Otherwise the channel is available in the TVWS database for secondary users (SU), and the channel utilization of the channel sensing result should be lower than a threshold. From the available alternate channels, the BAC 1007 may select new active channels (1031). The selection process may give priority to available TVWS database channels. As stated herein above, the bandwidth allocation algorithm (i.e., channel selection) may take a number of different approaches. An example bandwidth allocation algorithm may use a ranking based approach. The active channel that needs a new bandwidth allocation is identified through a ranking method. The best alternate channel is then compared to this active channel. If the CHAN_UT value of the former is better than (less than) the latter by a predefined margin, the former will replace the latter. Otherwise, there will be no new bandwidth allocation at this point. Another example bandwidth allocation algorithm may use a threshold based approach. A number of channels that may need new bandwidth allocations are identified through a thresholding method. The best alternate channels are then used to replace these active channels. An alternate channel may replace an active channel if the CHAN_UT value of the alternate channel is better than (less than) than that of the active channel by a predefined margin.

Depending on the number of currently available alternate channels and the number of active channels that need a new bandwidth allocation, the BAC entity 1007 may immediately send a BA_Reconfiguration message (1033), or send a ChannelSensingQuery message (1035) to the sensing toolbox 1008 to find more alternate channels and then perform new bandwidth allocations. The BA_Reconfiguration message (1033) may include an active channels list, power to use, and channel role (i.e., primary or secondary). If a BA_Reconfiguration message is sent, the BAC entity will also send a ChannelSensingQuery message to the sensing toolbox 1008 to notify the latter of the changes in the channels that need to be monitored and the changes in the type of sensing for the channels. The BAC 1007 may use rules (1037) to set channel parameters.

When an AP 1004 receives the BA_Reconfiguration message, the AP 1004 may initiate a Channel_Switch_Anouncement message to the DSM clients 1002 that the AP 1004 may be serving (1039). If the channel quality is adequate, the DSM clients may be able to successfully receive this message and switch channels. On the other hand, if the channel quality is inadequate to support successful delivery of this message, the DSM clients 1002 may time out and restart an AP discovery process. The DSM client 1002 may reply with a Channel_Switch_Anouncement_ACK message to the AP 1004 when the DSM client 1002 receives the Channel_Switch_Anouncement message. If the AP 1004 receives a Channel_Switch_Anouncement_ACK message from all DSM clients 1002, it may stop broadcasting the Channel_Switch_Anouncement message before reaching a pre-defined limit or time, (i.e, a time guard).

The BAC 1007 may then determine if additional channels may need to be reconfigured (1041). This may be an iterative process until four channels may be found (1043). The BAC 1007 may elect channels from the available TVWS database channels (1045). If sensing is supported and the elected channels are less than the number of requested channels, then elect other channels from the non-available channels in the TVWS database 1010 (1047). The BAC 1007 may then configure sensing on the elected channels (1049). If the channel is available in the TVWS database 1010, then configure sensing for SU channel usage. Otherwise if the channel is not available, configure sensing for PU and SU channel usage.

The BAC 1007 may send a ChannelSensingQuery (init_config_sensing, Elected channels) message to the sensing toolbox 1008 (1051). This message may contain information on the channels and the sensing methods that may need to be applied to the channels. The BAC 1007 may use rules (1037) to set channel parameters. In the context of bandwidth reallocation where the sensing toolbox is requested to sense specific elected channels, the sensing type may be set to "Targeted_channels_sensing". The elected channel list may include for each channel (channel number), a "channel type" equal to Alternate, a "PU_detection type" set "Not_needed" if the channel is available in the TVWS database. Otherwise it should be set to "DTV detection needed" or "Mircophone detection needed" if, respectively, the TVWS database has communicated the type of PU in that channel through the Channel_Reply message. Otherwise, it should be set to "DTV/Microphone detection needed". The sensing toolbox 1008 may reply with a ChannelSensingQueryACK message to acknowledge the reception of the ChannelSensingQuery message (1053). The BAC 1007 may send a BA_Reconfiguration message with "CH_escape" (1055) to the AP 1004. The timer may be sent to 0 or higher and may consider the channel escape time on PU detection. The timer is another guard timer so that the AP 1004 stops operating on the channel within a 2 seconds period. This may be needed in the case of a bandwidth allocation to replace a channel where a PU is detected and that channel needs to be replaced within 2 seconds, (according to the FCC ruling), after the detection. When an AP 1004 receives the BA_Reconfiguration message, the AP 1004 may send a Channel_Switch_Anouncement message to the DSM clients 1002 that the AP 1004 may be serving (1057).

The sensing toolbox 1008 may carry out asynchronous silent measurements (1059) as described herein below and return the sensing results to the BAC 1004 via a ChannelSensingResult message (1061).

The BAC 1007 may then apply specified or predetermined criteria to select active channels (1063). This may include, for example, no PUs present, channel usage (CU) less than threshold and other criteria. For example, default threshold of CU may be 50%. The threshold may also depend on parameters like, if the traffic load on the channel to replace is high, the CU threshold on the Alternate channel should be low and vice versa. The BAC 1007 may then send a BA_Reconfiguration message to each AP 1004 (1065), a ChannelSensingQuery message to the sensing toolbox 1008 to notify the latter of the channels that need to be monitored and the type of sensing for each of the channels (1067). The sensing toolbox 1008 may send a ChannelsSensingQueryAck message to the BAC 1007 to confirm receipt of the ChannelSensingQuery message (1069). The AP 1004 may send a Channel_Switch_Anouncement message to the DSM clients 1002 that the AP 1004 may be serving (1071).

The BAC 1007 may need to perform a role change. This may be implemented by using the following (1073): "Select the channel with the least CHAN_UT value from the channels assigned to an AP as the primary channel." The BAC 1007 may then send a BA_Reconfiguration message to each AP 1004 with the new BA "Primary channel change" content (1075). The AP 1004 may send a Channel_Switch_Anouncement message to the DSM clients 1002 that the AP 1004 may be serving (1077).

Figure 11B:
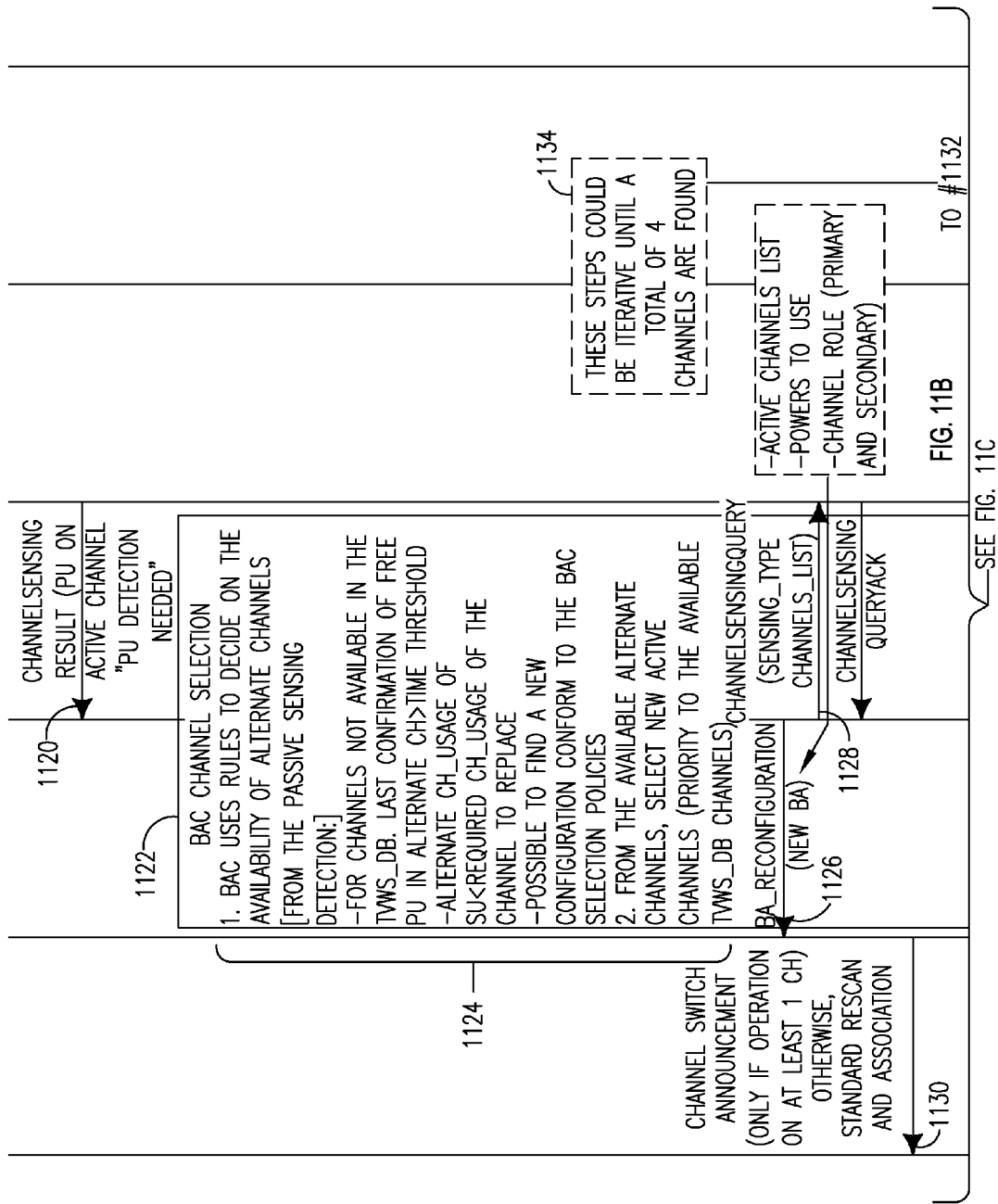

FIGS. 11A-11C show an example PU detection triggered bandwidth allocation call flow 1100 between a DSM client 1102, AP 1104, a CMF 1106 including a BAC 1107, a sensing toolbox interface 1108, a TVWS database interface 1110 and a policy database interface 1112. Although only one AP 1104 and one DSM client 1102 are shown, there may be multiple APs and DSM clients. A bandwidth allocation procedure may be triggered by the sensing results reported by the sensing toolbox 1108.

In one triggering example, PUs are detected on active channels. The sensing toolbox 1008 may continuously send sensing results for active channels and alternate channels via the ChannelSensingResult message to the BAC 1107 (1116) as part of passive sensing detection processing (1114). The BAC 1107 may maintain valid alternate channels and update the channel utilization (as described herein above for CHAN_UT for each active channel and alternate channel (1118). This may include alternate channels not having PUs and alternate channels having SUs but channel usage (CU) less than a predetermined threshold, (where CU averaging over time may be implemented). The BAC 1107 may apply the rules and perform reconfiguration processing as described herein for new alternate channels with priority to the available TVWS database channels. A ChannelSensingQuery (ChannelList) may be sent by the BAC 1107 to the sensing toolbox 1108 and a ChannelSensingResult may be sent by the sensing toolbox 1108 to the BAC 1107 to maintain valid alternate channels.

If the BAC 1107 receives a ChannelSensingResult message that reports the detection of PUs on some active channels (1120), the bandwidth allocation procedure may be triggered (1122).

Depending on the number of currently available alternate channels and how many active channels are affected by the PU detection (1124), the BAC 1107 may immediately send a BA_Reconfiguration message (1126), or send a ChannelSensingQuery message (1128) to the sensing toolbox 1108 to find more alternate channels and then perform new bandwidth allocation. In the case a ChannelSensingQuery message is sent, a timer TIMER_EVAC may be used to ensure prompt actions to be taken by BAC entity in the event the Sensing Toolbox is not able to provide new alternate channels in time.

The AP 1104 may initiate a Channel_Switch_Anouncement message to the DSM Client 1102 that the AP 1104 is serving when the AP 1104 receives the BA_Reconfiguration message (1130). If the channel quality is good enough for transmitting this message, the DSM clients 1102 may successfully switch channels. On the other hand, if the channel quality is not good enough to support successful delivery of this message, the DSM clients 1102 may timeout and restart an AP discovery process.

The BAC 1107 may then determine if additional channels may need to be reconfigured (1132). This may be an iterative process until four channels may be found (1134). The BAC 1107 may elect channels from the available TVWS database channels (1136). If sensing is supported and the elected channels are less than the number of requested channels, then elect other channels from the non-available channels in the TVWS database 1110 (1138). The BAC 1107 may then configure sensing on the elected channels (1140). If the channel is available in the TVWS database 1110, then configure sensing for SU channel usage. Otherwise if the channel is not available, configure sensing for PU and SU channel usage.

The BAC 1107 may send a ChannelSensingQuery (Sensing_Type, Channels_List) message to the sensing toolbox 1108 (1142). This message may contain information on the channels and the sensing methods that may need to be applied to the channels. The BAC 1107 may use rules (1144) to set channel parameters. In the context of bandwidth reallocation where the sensing toolbox may be requested to sense specific elected channels, the sensing type may be set to "Targeted_channels_sensing". The elected channel list may include for each channel (channel number), a "channel type" equal to Alternate, and a "PU_detection type" set "Not_needed" if the channel is available in the TVWS database. Otherwise it may be set to "DTV detection needed" or "Microphone detection needed" if, respectively, the TVWS database has communicated the type of PU in that channel through the Channel_Reply message. Otherwise, it may be set to "DTV/Microphone detection needed".

The sensing toolbox 1108 may reply with a ChannelSensingQueryACK message to acknowledge the reception of the ChannelSensingQuery message (1146). The BAC 1107 may send a BA_Reconfiguration message with "CH_escape" (1148) to the AP 1104. A timer, (i.e., a guard timer as described herein above), may be sent to 0 or higher and may consider the channel escape time on PU detection. When an AP 1104 receives the BA_Reconfiguration message, the AP 1104 may send a Channel_Switch_Anouncement message to the DSM clients 1102 that the AP 1104 may be serving (1150).

The sensing toolbox 1108 may carry out asynchronous silent measurements (1152) as described herein below and return the sensing results to the BAC 1104 via a ChannelSensingResult message (1154).

The BAC 1107 may then apply specified or predetermined criteria to select active channels (1156). This may include, for example, no PUs present, channel usage (CU) less than threshold and other criteria. For example, default threshold of CU may be 50%. The threshold may also depend on parameters like, if the traffic load on the channel to replace is high, the CU threshold on the Alternate channel should be low and vice versa. The BAC 1107 may then send a BA_Reconfiguration message to each AP 1104 (1158), and a ChannelSensingQuery message to the sensing toolbox 1108 to notify the latter of the channels that need to be monitored and the type of sensing for each of the channels (1160). The sensing toolbox 1108 may send a ChannelsSensingQueryAck message to the BAC 1107 to confirm receipt of the ChannelSensingQuery message (1162). The AP 1104 may send a Channel_Switch_Anouncement message to the DSM clients 1102 that the AP 1104 may be serving (1164).

Again, in the bandwidth allocation process, the BAC 1107 may need to perform the role changes of the channels, if necessary. If the channel for which the detection of PUs is reported is currently serving as the primary channel, the BAC 1107 may need to find the best channel from the channels that the concerning AP 1104 may use as the new primary channel. Again, the following rule may be used: "Select the channel with the least CHAN_UT value from the channels assigned to an AP as the primary channel."

Figure 12A:
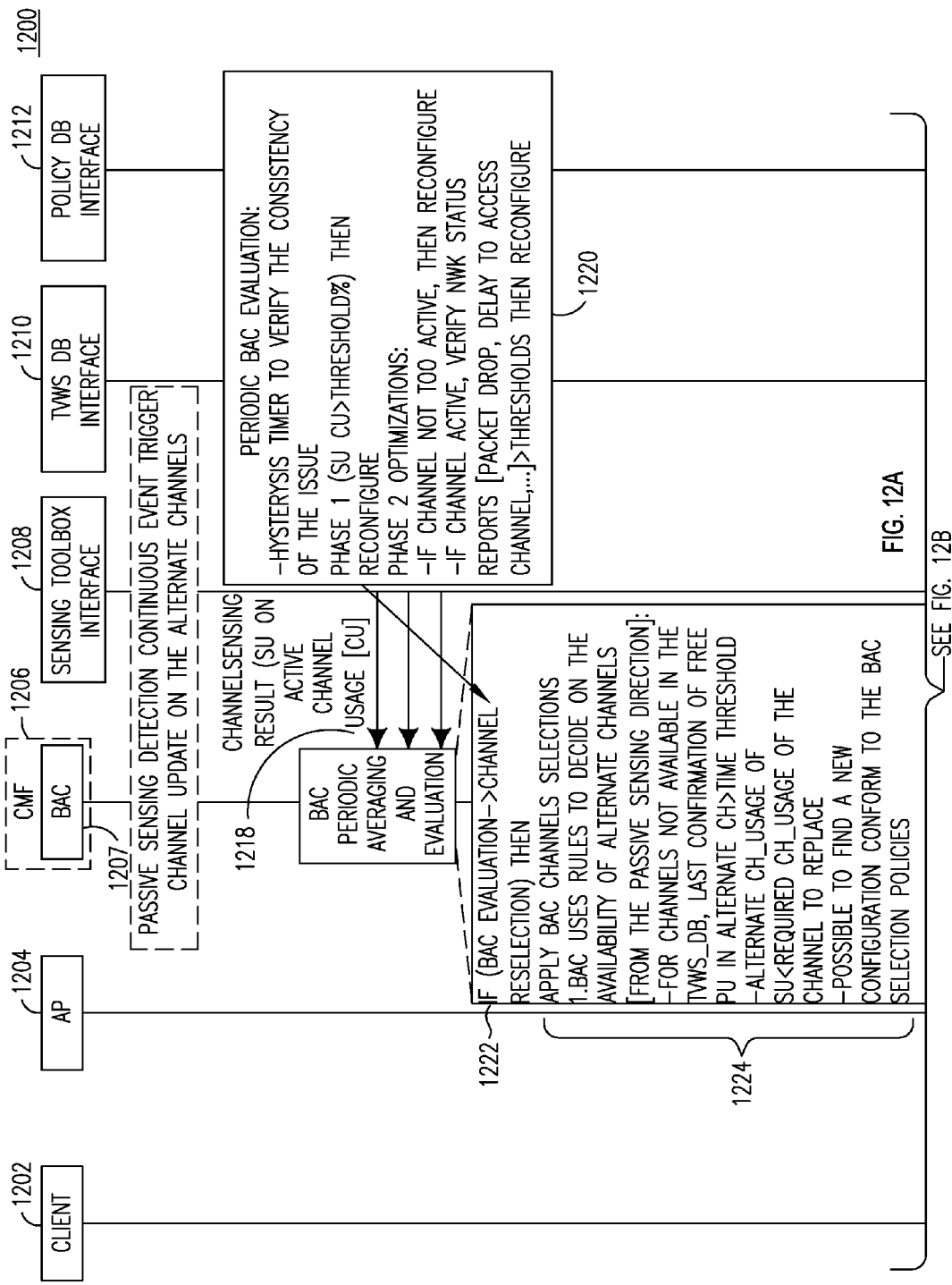
FIGS. 12A-12C show an example call flow of secondary user (SU) detection triggered bandwidth allocation algorithm.
Figure 12B:
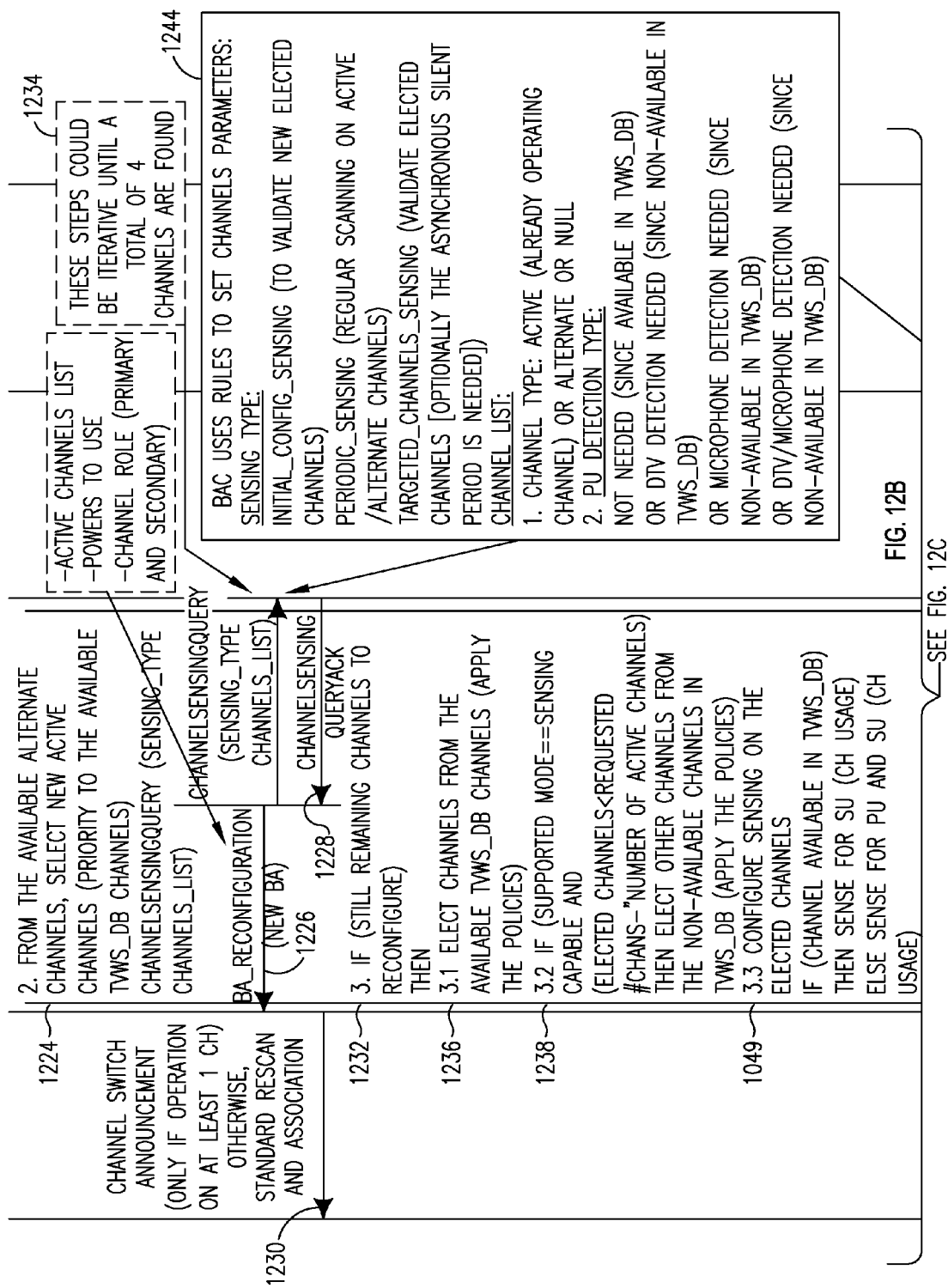
Figure 12C:
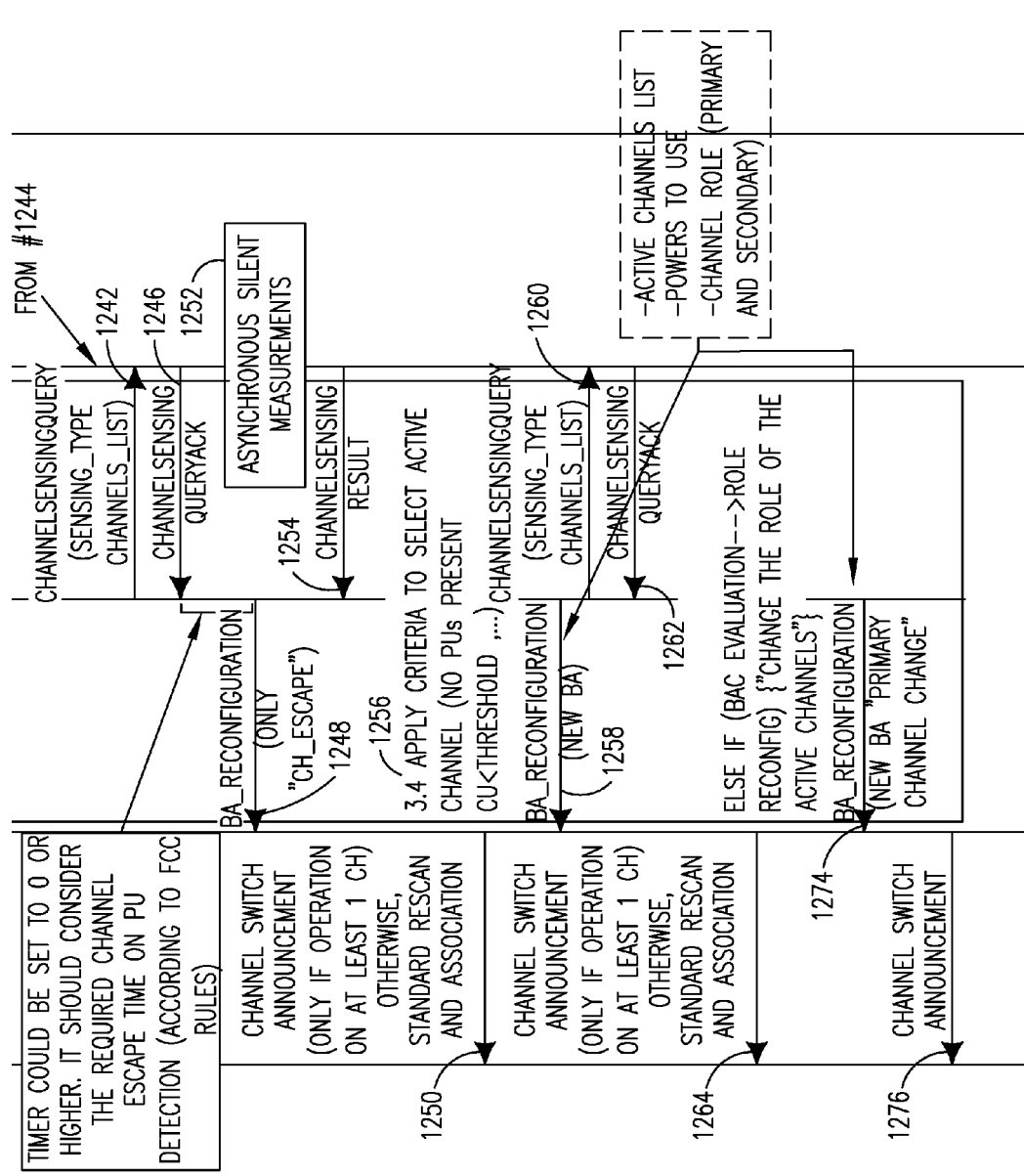

FIGS. 12A-12C show an example SU detection triggered bandwidth allocation call flow 1200 between a DSM client 1202, AP 1204, a CMF 1206 including a BAC 1207, a sensing toolbox interface 1208, a TVWS database interface 1210 and a policy database interface 1212. Although only one AP 1204 and one DSM client 1202 are shown, there may be multiple APs and DSM clients. A bandwidth allocation procedure may be triggered by the sensing results reported by the sensing toolbox 1208. In this case, SUs with the potential of disrupting current DSM communications are detected on active channels. The procedure is similar to that of PU detection triggered bandwidth allocation shown in FIGS. 11A-11C, where the differences are in the trigger and the delay requirements.

A passive sensing detection process (1216) may be continuously running between the CMF 1206, BAC 1207 and sensing toolbox 1208. The sensing toolbox 1208 may continuously send the sensing results for active channels and alternate channels via the ChannelSensingResult message to the BAC 1207 (1218). The BAC 1207 updates the channel utilization as described herein for each active channel and alternate channel. The BAC may perform periodic averaging and evaluating of the sensing results.

The evaluation results of the BAC 1207 determine whether bandwidth allocation may be triggered (1220). For example, if the BAC 1207 detects high channel utilization for some active channels, the bandwidth allocation procedure (1224) may be triggered. This is different from PU detection triggered bandwidth allocation, in which the triggered may be determined by the ChannelSensingResult message. Here, the BAC 1207 has the freedom to determine what value constitutes "high" channel utilization. In particular, the periodic BAC evaluation process may use a hysteresis timer to verify the consistency of the issue, (the hysteresis timer may allow for confirmation that the channel degradation is persistent over this hysteresis time and is not a spike). The evaluation process may include an evaluation which determines if SU channel utilization is greater than a threshold. In the event the threshold is exceeded, the reconfiguration may be triggered and the bandwidth allocation procedure may be initiated (1222).

Figure 11D:
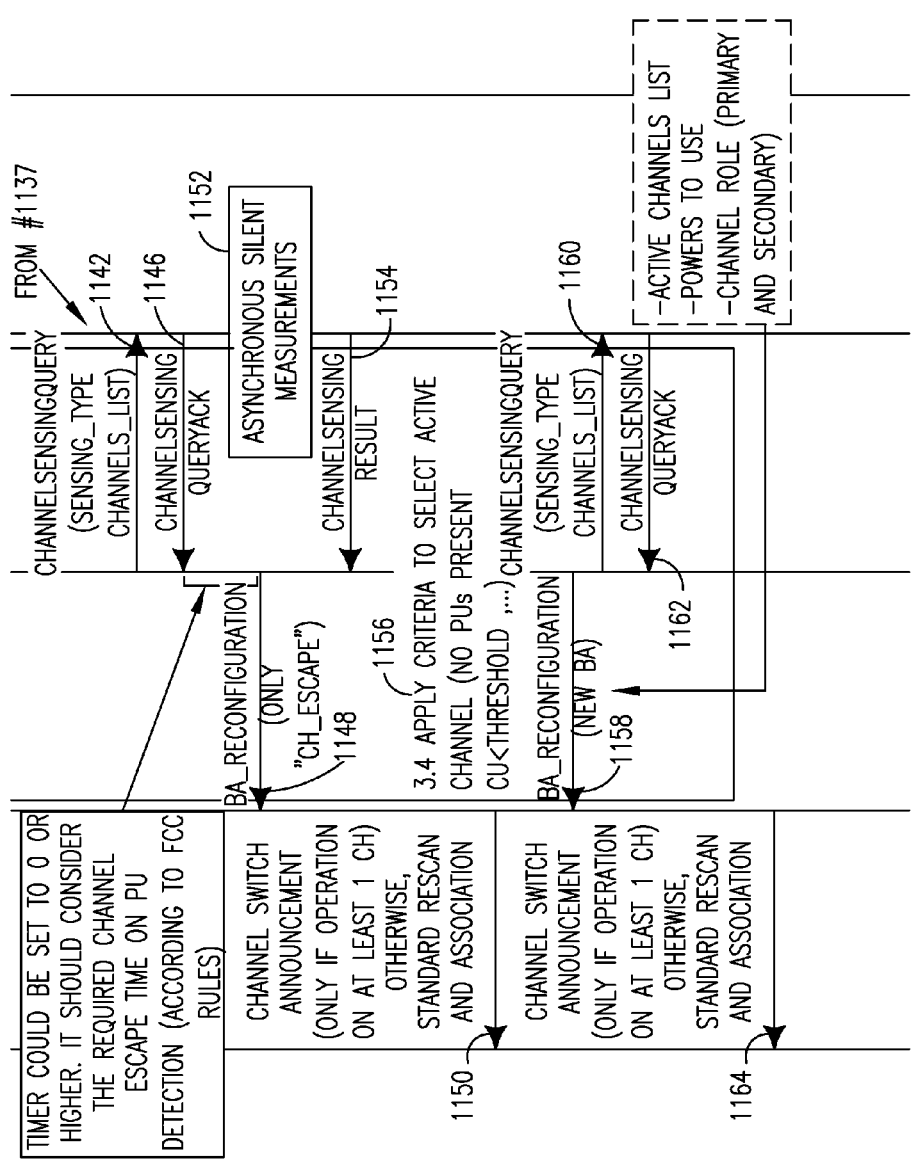

The bandwidth allocation process 1222 is otherwise similar to that of FIGS. 10 and 11. Depending on the number of currently available alternate channels and how many active channels may be affected by the SU detection (1224), the BAC 1207 may immediately send a BA_Reconfiguration message (1226), or send a ChannelSensingQuery message (1228) to the sensing toolbox 1208 to find more alternate channels and then perform new bandwidth allocation. If a ChannelSensingQuery message is sent, a timer TIMER_QUERY will be used to ensure that prompt actions are taken by the BAC 1207 in the event the sensing toolbox 1208 may not be able to provide new alternate channels in time. The timer TIMER_QUERY is different from the timer TIMER_EVAC used in PU detection triggered bandwidth allocation. The value of the timer TIMER_EVAC may be determined by both spectrum access policies and the system design, whereas the value of the timer TIMER_QUERY may be determined by system design.

The AP 2104 may initiate a Channel_Switch_Anouncement message to the DSM Client 1202 that the AP 1204 is serving when the AP 1204 receives the BA_Reconfiguration message (1230). If the channel quality is good enough for transmitting this message (at or above a threshold), the DSM Clients will successfully switch channels. On the other hand, if the channel quality is inadequate to support successful delivery of this message (below the threshold), the DSM Clients will timeout and restart an AP discovery process.

The BAC 1207 may then determine if additional channels may need to be reconfigured (1232). This may be an iterative process until four channels may be found (1234). The BAC 1207 may elect channels from the available TVWS database channels (1236). If sensing is supported and the elected channels are less than the number of requested channels, then elect other channels from the non-available channels in the TVWS database 1210 (1238). The BAC 1207 may then configure sensing on the elected channels (1240). If the channel is available in the TVWS database 1210, then configure sensing for SU channel usage. Otherwise if the channel is not available, configure sensing for PU and SU channel usage.

The BAC 1207 may send a ChannelSensingQuery (Sensing_Type, Channels_List) message to the sensing toolbox 1208 (1242). This message may contain information on the channels and the sensing methods that may need to be applied to the channels. The BAC 1207 may use rules (1244) to set channel parameters. In the context of bandwidth reallocation where the sensing toolbox is requested to sense specific elected channels, the sensing type may be set to "Targeted_channels_sensing". The elected channel list may include for each channel (channel number), a "channel type" equal to Alternate, and a "PU_detection type" set "Not_needed" if the channel is available in the TVWS database. Otherwise it may be set to "DTV detection needed" or "Mircophone detection needed" if, respectively, the TVWS database has communicated the type of PU in that channel through the Channel_Reply message. Otherwise, it may be set to "DTV/Microphone detection needed".

The sensing toolbox 1208 may reply with a ChannelSensingQueryACK message to acknowledge the reception of the ChannelSensingQuery message (1246). The BAC 1207 may send a BA_Reconfiguration message with "CH_escape" (1248) to the AP 1204. A timer may be sent to 0 or higher and may consider the channel escape time on PU detection. When an AP 1204 receives the BA_Reconfiguration message, the AP 1204 may send a Channel_Switch_Anouncement message to the DSM clients 1202 that the AP 1204 may be serving (1250).

The sensing toolbox 1208 may carry out asynchronous silent measurements as described herein below (1252) and return the sensing results to the BAC 1204 via a ChannelSensingResult message (1254). The BAC 1207 may then apply specified or predetermined criteria to select active channels (1256). This may include, for example, no PUs present, CU less than a threshold and other criteria. For example, default threshold of CU may be 50%. The threshold may also depend on parameters like, if the traffic load on the channel to replace is high, the CU threshold on the Alternate channel should be low and vice versa. The BAC 1207 may then send a BA_Reconfiguration message to each AP 1204 (1258), and a ChannelSensingQuery message to the sensing toolbox 1208 to notify the latter of the channels that need to be monitored and the type of sensing for each of the channels (1260). The sensing toolbox 1208 may send a ChannelsSensingQueryAck message to the BAC 1207 to confirm receipt of the ChannelSensingQuery message (1262). The AP 1204 may send a Channel_Switch_Anouncement message to the DSM clients 1202 that the AP 1204 may be serving (1264).

Again, in the bandwidth allocation process, the BAC 1207 may need to do role reconfiguration (1272). If the channel for which strong SU interference is reported is currently serving as the primary channel, the BAC 1207 may need to find the best channel from among the channels that the associated AP 1204 may use as the new primary channel. As above, the following rule may be used: "Select the channel with the least CHAN_UT value from the channels assigned to an AP as the primary channel." The BAC 1207 may then send a BA_Reconfiguration message to each AP 1204 with the new BA "Primary channel change" content (1275). The AP 1204 may send a Channel_Switch_Anouncement message to the DSM clients 1202 that the AP 1204 may be serving (1276).

Figure 13:
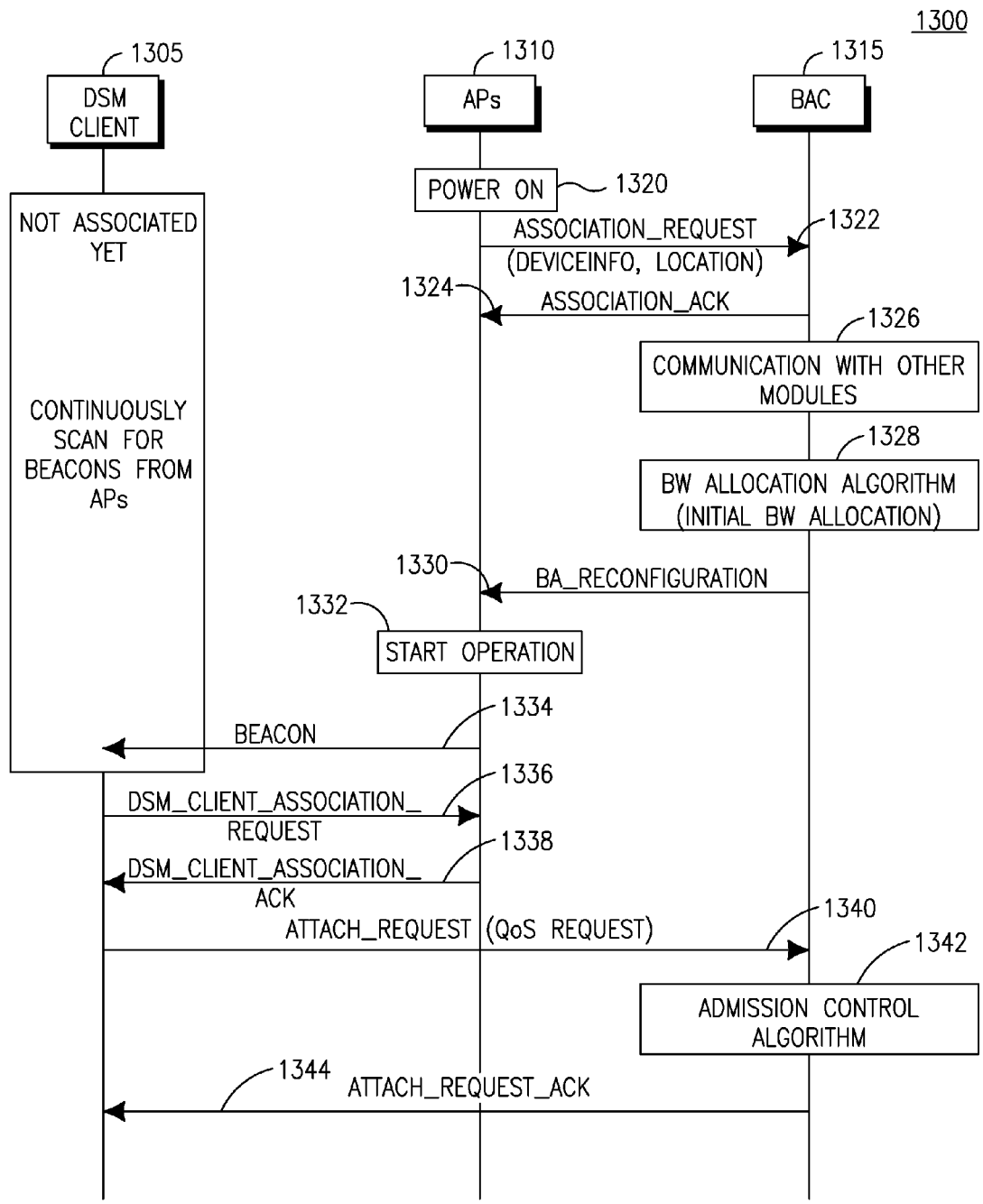
FIG. 13 is an example admission control procedure.

FIG. 13 shows an example admission control flowchart 1300 between DSM clients 1305, APs 1310 and a BAC 1315. In many scenarios, there is a need to control the number of DSM clients 1305 that the DSM system may admit. For example, if there are too many DSM clients 1305 admitted to the DSM system, then some of the DSM clients, (e.g., with voice applications), may not achieve the expected QoS. The BAC 1310 may determine whether or not to admit a DSM client 1305 based on the capacity, (number of available channels, and the like), of the system and the demands from the DSM clients 1305. This process is called admission control.

After turning on (1320), the APs 1310 first associate with the BAC 1315 by exchanging the Association_Request message (1322) and the Association_Ack message (1324). The BAC 1315 may then communicate with other modules (1326) such as with TVWS database 1210 and the policy database 1212, perform the initial bandwidth allocations for the APs (1328) and send the allocation information to the APs 1310 (1330). The APs 1310 may then start operations (1332) and broadcast beacons to the DSM clients (1334). During the above process, the DSM clients 1305 may be continuously scanning for beacons (1336).

The DSM clients 1305 may discover the AP 1310 and send the DSM_Clicent_Association_Request message to an AP 1310 (1336). The AP may reply with a DSM_Clicent_Association_ACK message (1338). At this point, the DSM client 1305 may be associated with an AP and may send an Attach_Request message to the BAC 1315 via the relay offered by the AP 1310 (1340). In this message, the DSM client 1305 may specify its QoS requirements. The BAC 1315 may run an admission control algorithm and decide whether to accept or reject the request (1342), and reply with an Attach_Request_ACK message containing the decision (1344). The admission control algorithm may use a number of methods for making an admission decision. For example, the BAC 1315 may simply impose a limit on the number of DSM clients 1305 that it may support, and any admission request arriving after the limit is reached may be rejected.

Figure 15:
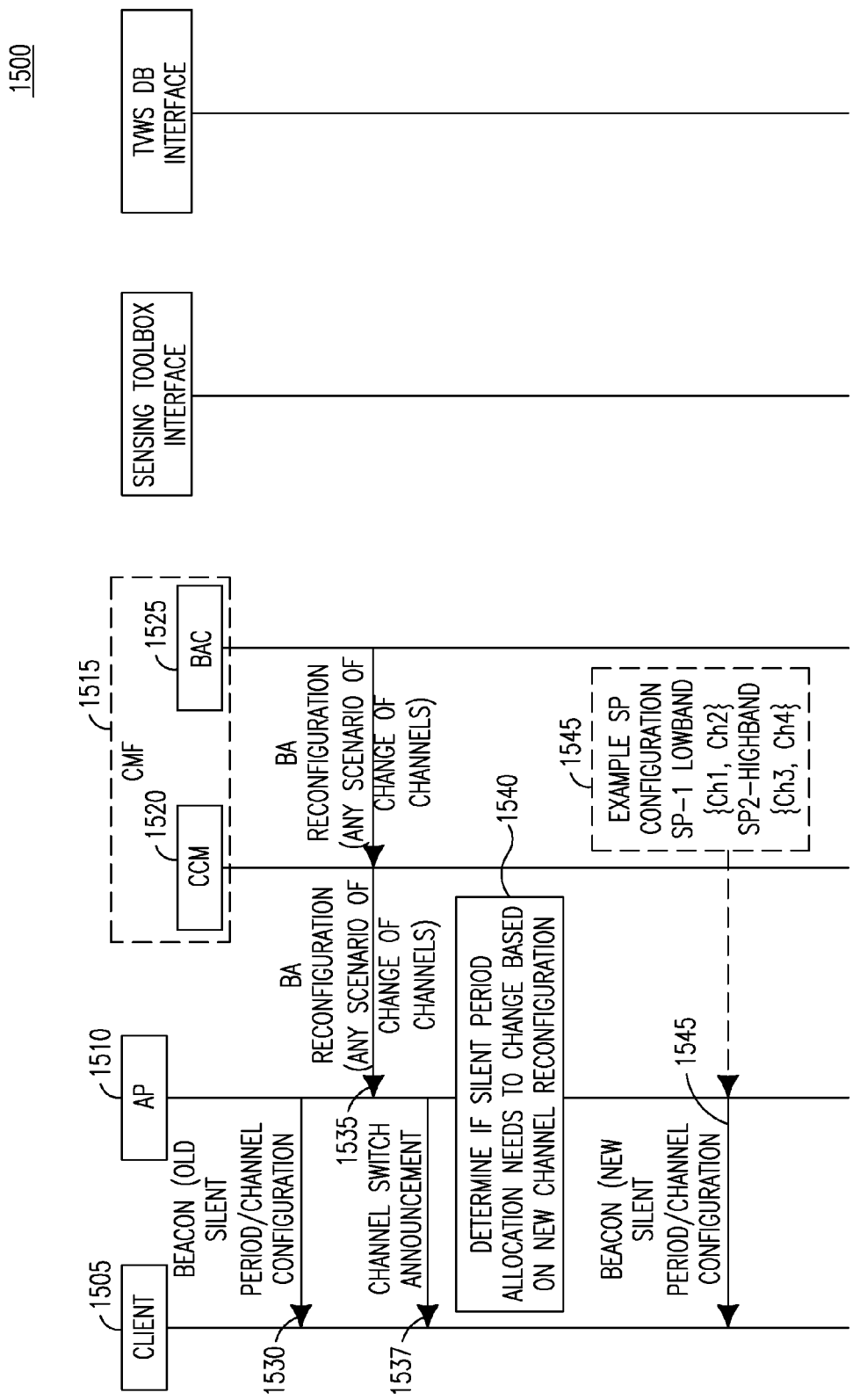
FIG. 15 is an example silent period procedure.

Described herein is a silent period procedure 1500 with regard to FIG. 15. The silent period procedure may be described with respect to a client 1505, AP 1510 and a CMF 1515, where the CMF 1515 may include a control channel management entity (CCM) 1520 and BAC 1525. Silent periods may be used by the DSM system to create times where sensing may be performed by the AP 1510 or the clients/WTRUs 1505 or both. During a silent period, the AP 1510 and its attached WTRUs 1505 may abstain from any transmission so that sensing may be performed to identify other users (primary or secondary) without having to take into account the presence of the networks own traffic. Silent periods require signaling between the AP 1510 and attached WTRUs 1505 to synchronize the start and duration of the silent periods. Silent periods may be configured and communicated by the AP 1510 in a periodic fashion, in which case the silent period occurs according to some regular interval. A beacon may be used to signal the silent period configuration to each client 1505 (1530). As shown in FIG. 15, when the CMF 1515 decides to change the channels, the silent period allocation may need to change based on the new channels configured by the CMF 1515. This may be communicated by a BA_Reconfiguration message (1535) and channel switch announcement (1537). The AP 1510 may take this decision and determine applicability of allocation change to silent period configuration (1540). The AP 1510 may signal the new silent period information to the client 1505 by modifying the corresponding information in the beacon (1545).

Figure 16:
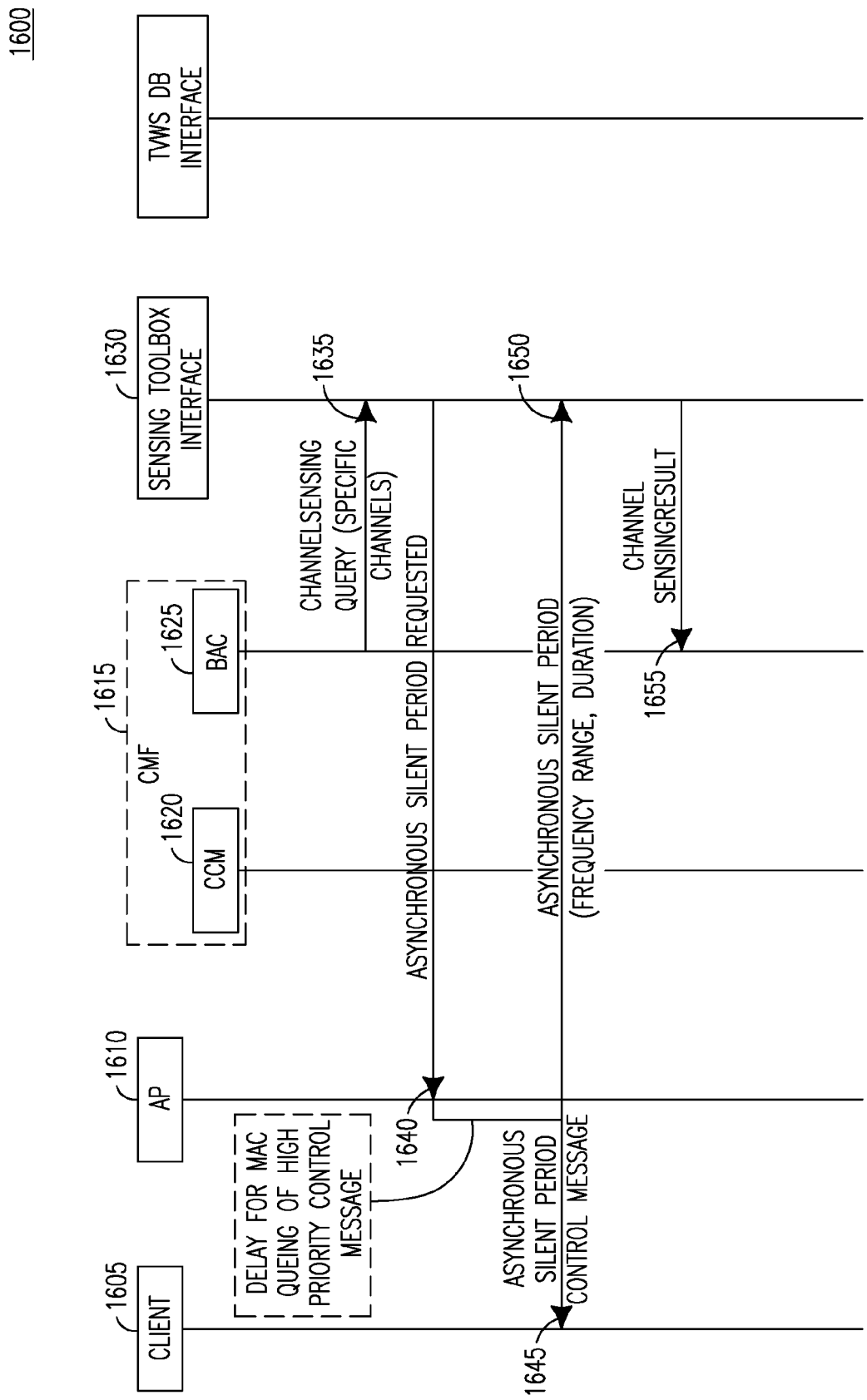
FIG. 16 is an example asynchronous silent period procedure.

In addition to periodic silent periods, asynchronous silent period procedures 1600 may be used as shown in FIG. 16. The asynchronous silent period procedure may be described with respect to a client 1605, AP 1610, a CMF 1615, where the CMF 1615 may include a control channel management entity (CCM) 1620 and BAC 1625, and a sensing processor (SP) 1630. In this case, the AP 1610 may configure an asynchronous or immediate silent period, which may be used in the event that the BAC 1625 issues a ChannelSensingQuery on a specific set of channels (1635), thus requiring the SP 1630 to perform immediate sensing of the current utilized channels and to transmit a asynchronous silent period request message to the AP 1610 (1640). The AP 1610 may inform the clients 1605 of the presence of an asynchronous silent period through an Asynchronous Silent Period Control Message, which could be sent as a MAC-layer control message of in the beacon itself (1645). An asynchronous silent period information message may be sent to the SP 1630 with the frequency, range and duration (1650). The silent period, in this case, would take effect immediately following reception of this message. The sensing results may be sent to the BAC 1625 (1655).

Described herein is alternate channel monitoring. When a TV channel on which a DSM device is operating suddenly becomes unavailable due to the detection of PUs or strong interference from other SU systems, the DSM system may go through the process of spectrum sensing to find an alternate transmission channel. However, this process may take excessive amount of time. In the worst case, the DSM system needs to sense the presence of PUs on all possible TV channels (except the one on which PUs are just detected). During this period of time, the affected DSM devices either stop using that channel (in the case of PU detection) or experience very bad channel conditions (in the case of strong SU interference). This may cause severe service disruption to the DSM system.

Instead of starting to search for an alternate channel after the detection of PUs or strong SU interference, the DSM system may monitor other channels and identify alternate channels before the detection of PUs or strong interference. Thus, when PUs are detected on one of the current channels being used by some DSM devices, the DSM system may immediately select one of the alternate channels. This way, the service disruption to the DSM system will be significantly reduced.

Referencing the architecture shown in FIG. 2, to enable alternate channel monitoring in the background, the BAC 244 in the DSM engine 210, may identify the candidate channels for alternate channels, and pass the information to the sensing toolbox 240 through a ChannelSensingQuery message, where the sensing toolbox 240 may be defined as part of the DSM engine 210 that coordinates and analyzes sensing over the network devices capable of sensing. The sensing toolbox 240 may then check the candidate channels when it is not performing active channel sensing, and pass the sensing results for these channels periodically to the BAC 244 via a ChannelSensingResult message.

Figure 14:
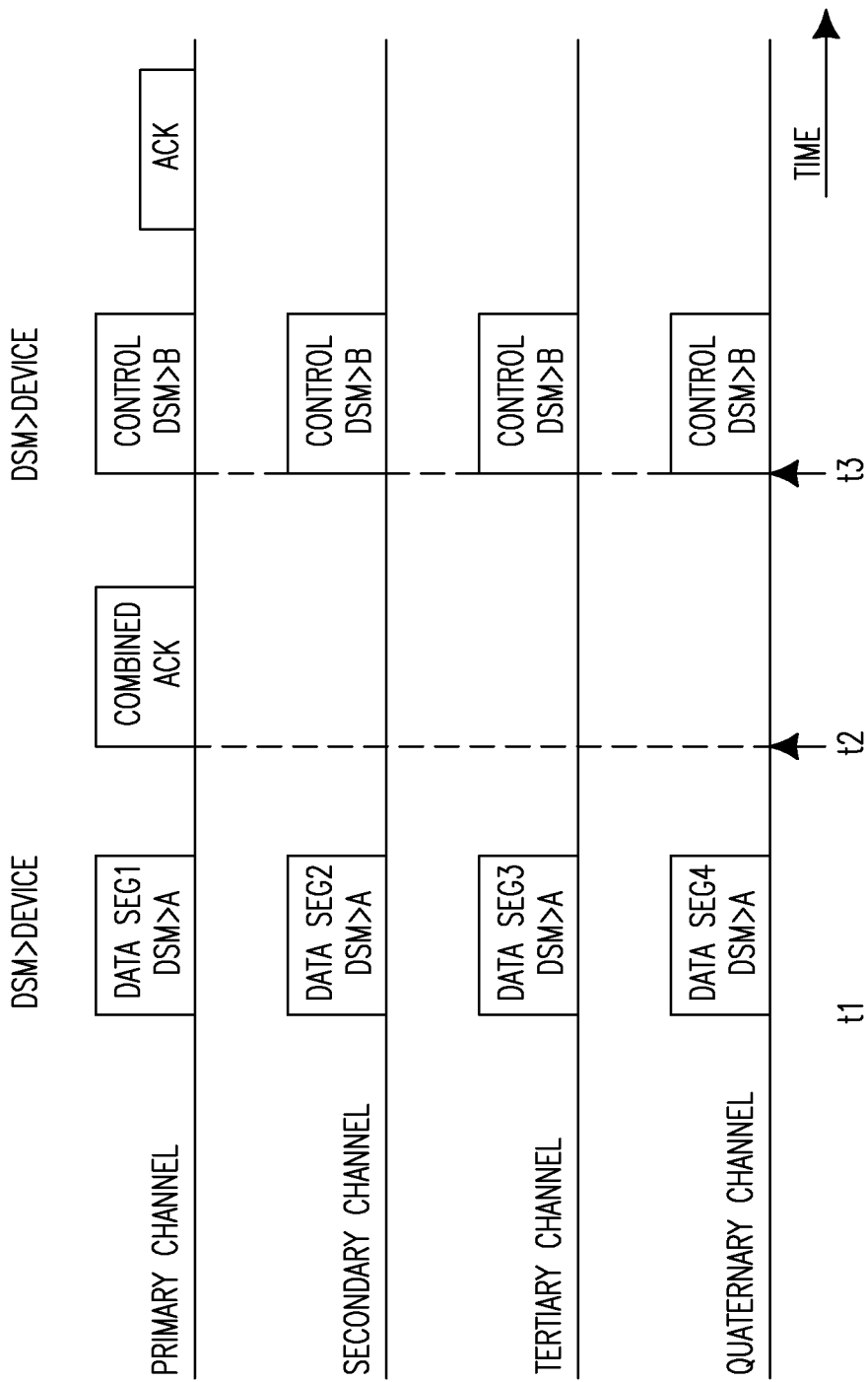
FIG. 14 is an example of combined acknowledgement message use.

In cases where a device may use multiple channels simultaneously, a channel may be assigned as the primary channel which supports critical tasks including, but not limited to, the transmission of ACK frames for data transmissions on all the channels. This is illustrated in FIG. 14, where DSM→Device means that the corresponding time interval is for communication from the DSM engine to a DSM client device, DSM→A means that the communication is from the DSM engine to a particular DSM client which is called device A, DSM→B means that the communication is from the DSM engine to a particular DSM client which is called device B. In an embodiment, at time t1, 4 data frames may be sent from the DSM engine to device A on 4 channels. At time t2, device A may reply to the DSM engine with a combined acknowledgment (ACK) transmitted on a primary channel. This combined ACK may acknowledge the 4 data transmissions that occurred at time t1. If the combined ACK is lost due to poor channel conditions, all the data transmissions that occurred at time t1 will be wasted. From this example, it is clear that the primary channel is more important than other channels. Therefore, for optimal DSM system performance, the BAC may need to assign the best available channel as the primary channel, where the best channel is the channel with quality metrics meeting or exceeding at least one threshold.

However, as the PU activity and interference from other SU systems may change over time, a channel initially having the best quality, may degrade over time. Thus, the ranking of channels based on their respective channel qualities may change over time. Therefore, in an embodiment, a dynamic bandwidth allocation algorithm changes the role (primary channel or not) of the channels as required (as channel quality varies).

Although features and elements are described above in particular combinations, one of ordinary skill in the art may appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of dynamic spectrum management (DSM), comprising:
   allocating, by a server, at least one channel from a dynamic white space spectrum to at least one device;
   assigning, by the server, a channel as a primary channel on a condition that multiple channels are allocated, wherein the assigned primary channel has channel qualities above a threshold and has a least channel utilization among the multiple channels;
   monitoring, by the server, alternate channels for bandwidth allocation based on an occurrence of a triggering event; and
   sending, by the server, a reconfiguration message indicating one or more of the alternate channels to be used by the at least one device and a respective maximum power transmission level for each of the one or more of the alternate channels.

2. The method of claim 1, further comprising:
   dynamically, by the server, re-assigning one of the multiple channels as the primary channel on a condition that channel quality for a previously assigned primary channel falls below a threshold.

3. The method of claim 1, further comprising:
   electing, by the server, non-available channels from the dynamic white space spectrum on a condition that a number of elected channels is less than a number of requested channels and that the at least one device is a hybrid device, wherein a hybrid device can access the dynamic white space spectrum, determine location and is sensing capable.

4. The method of claim 1, further comprising:
   associating, by the server, devices with a dynamic spectrum management engine;
   building, by the server, a device capability database based on associated devices; and
   receiving, by the server, channel information from a dynamic white space spectrum database, policy information from a policy database, silent configuration information from a sensing processor and channel sensing information from the sensing processor.

5. The method of claim 1, wherein the triggering event is a network performance degradation trigger, the method further comprising:
   ranking, by the server, active channels according to network performance statistics; and
   replacing, by the server, a worst performing active channel with a best alternate channel on a condition that for a given metric, the best alternate channel is better than the worst performing active channel.

6. The method of claim 5, wherein the given metric is channel utilization.

7. The method of claim 1, wherein the triggering event is a network performance degradation trigger, the method further comprising:
   identifying, by the server, poor performing active channels by comparing network performance statistics against predetermined thresholds; and
   replacing, by the server, the poor performing active channels with alternate channels performing better than the poor performing active channels.

8. The method of claim 7, wherein the network performance statistics is at least one of received signal strength, frame rate, or traffic demand.

9. The method of claim 1, wherein the triggering event is a primary user detection trigger, the method further comprising:
   receiving, by the server, a report from a sensing processor that a primary user has been detected on an allocated channel.

10. The method of claim 1, wherein the triggering event is a secondary user detection trigger, the method further comprising:
    determining, by the server, that an allocated channel has a predetermined level of channel utilization.

11. The method of claim 1, wherein four channels are allocated to the at least one device.

12. The method of claim 1, wherein available channels are allocated evenly among devices.

13. The method of claim 1, further comprising:
    re-checking, by the server, channel information on a condition that the server has moved by a predetermined distance.

14. The method of claim 1, further comprising:
    applying, by the server, an admission control policy to requests for attachment to the server.

15. A dynamic spectrum management (DSM) system, comprising:
    at least one transceiver to communicate over wireless links;
    a DSM engine in communication with the at least one transceiver to allocate at least one channel from a dynamic white space spectrum to at least one device;
    the DSM engine to assign a channel as a primary channel on a condition that multiple channels are allocated, wherein the assigned primary channel has channel qualities above a threshold and has a least channel utilization among the multiple channels;

the DSM engine to monitor alternate channels for bandwidth allocation based on an occurrence of a triggering event; and the DSM engine to send a reconfiguration message indicating one or more of the alternate channels to be used by the at least one device and a respective maximum power transmission level for each of the one or more of the alternate channels.

16. The DSM system of claim 15, further comprising:

the DSM engine to assign a channel as a primary channel on a condition that multiple channels are allocated; and the DSM engine to dynamically re-assign one of the multiple channels as the primary channel on a condition that channel quality for a previously assigned primary channel falls below a threshold.

* * * * *